Dec. 5, 1967  R. E. BOGERT ETAL  3,355,983
CARD HANDLING MECHANISM
Filed Dec. 31, 1964  33 Sheets-Sheet 1

INVENTORS.
RALPH E. BOGERT
RAYMOND C. ZOPPOTH
BY

ATTORNEYS

INVENTORS.
RALPH E. BOGERT
RAYMOND C. ZOPPOTH
BY
ATTORNEYS

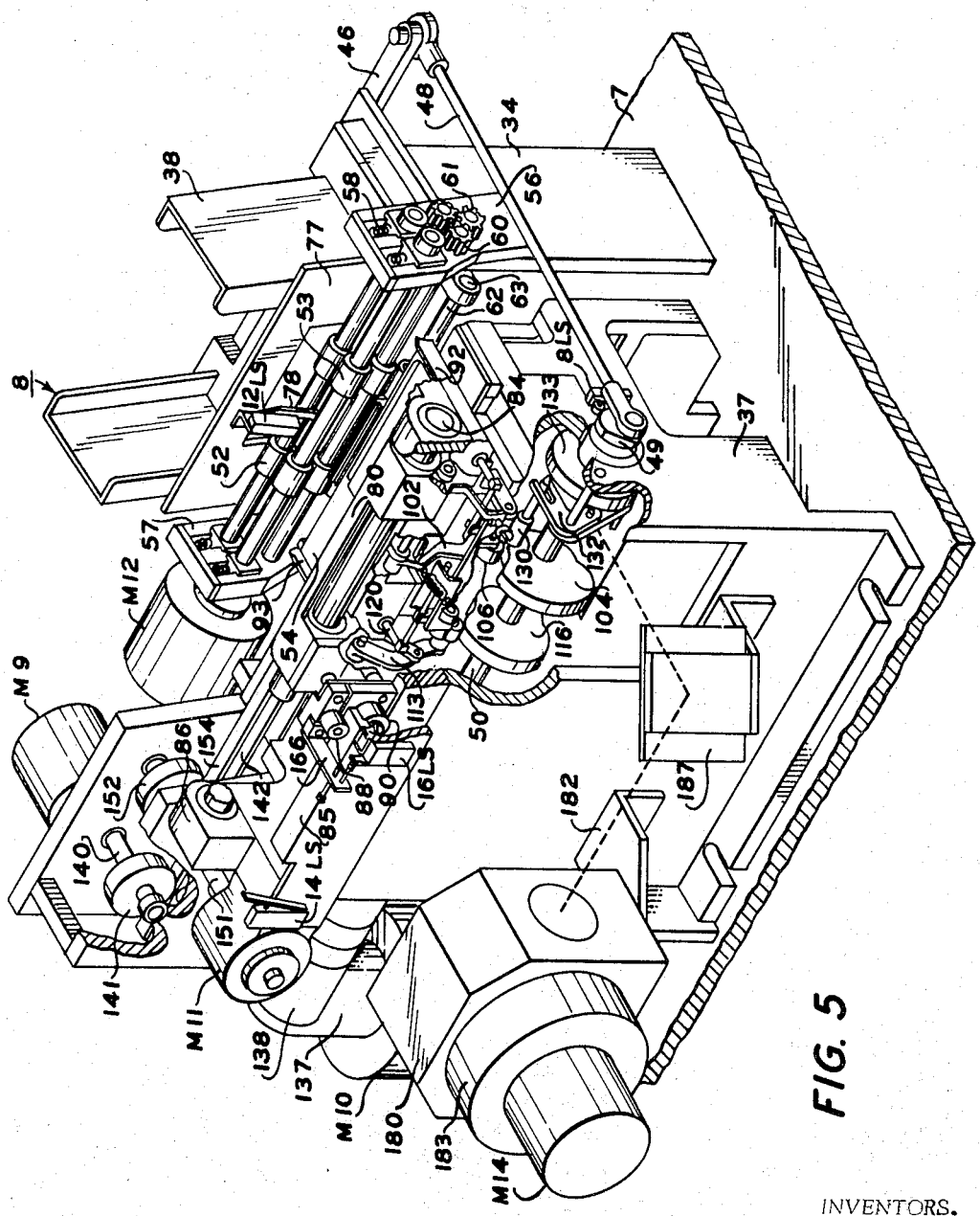

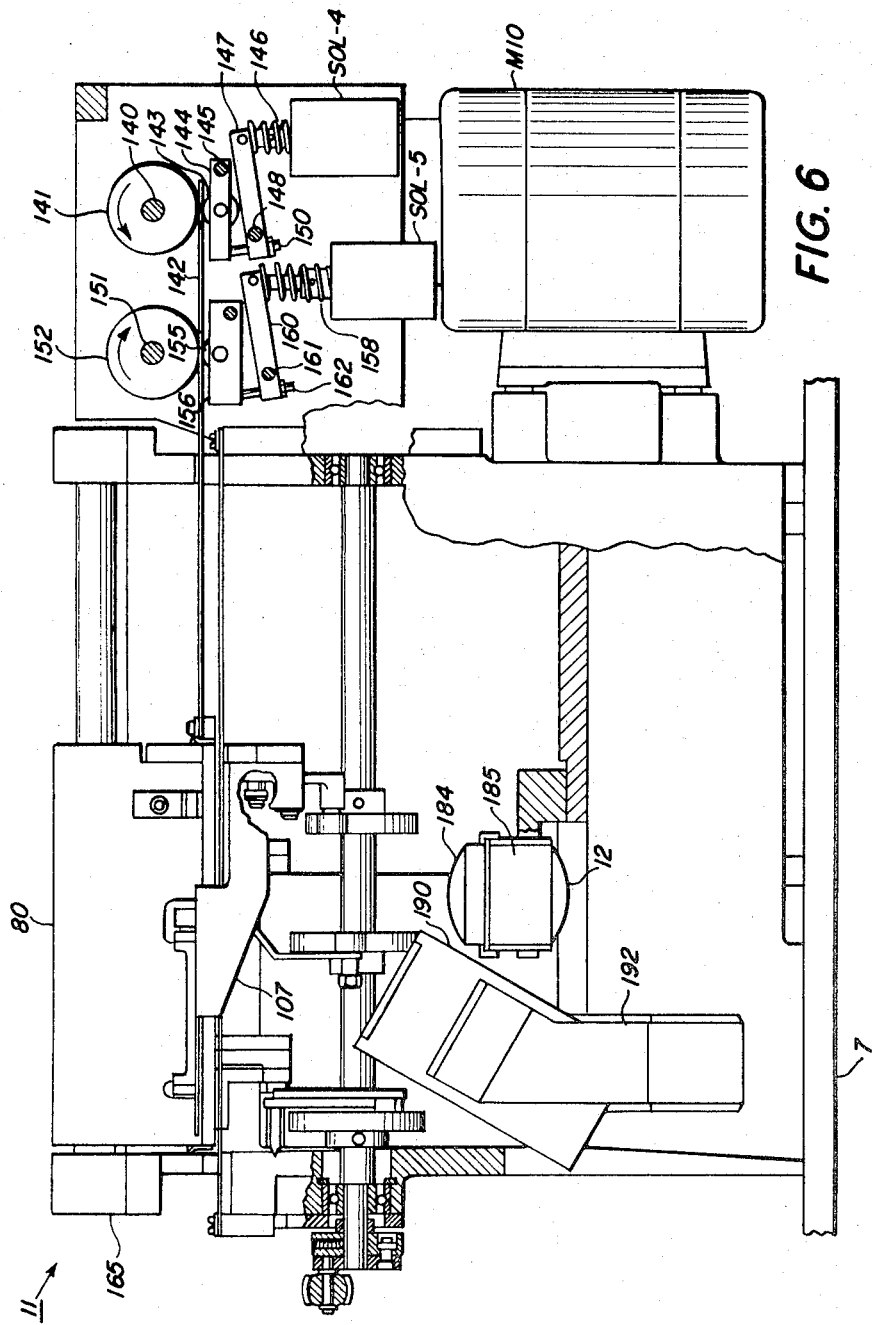

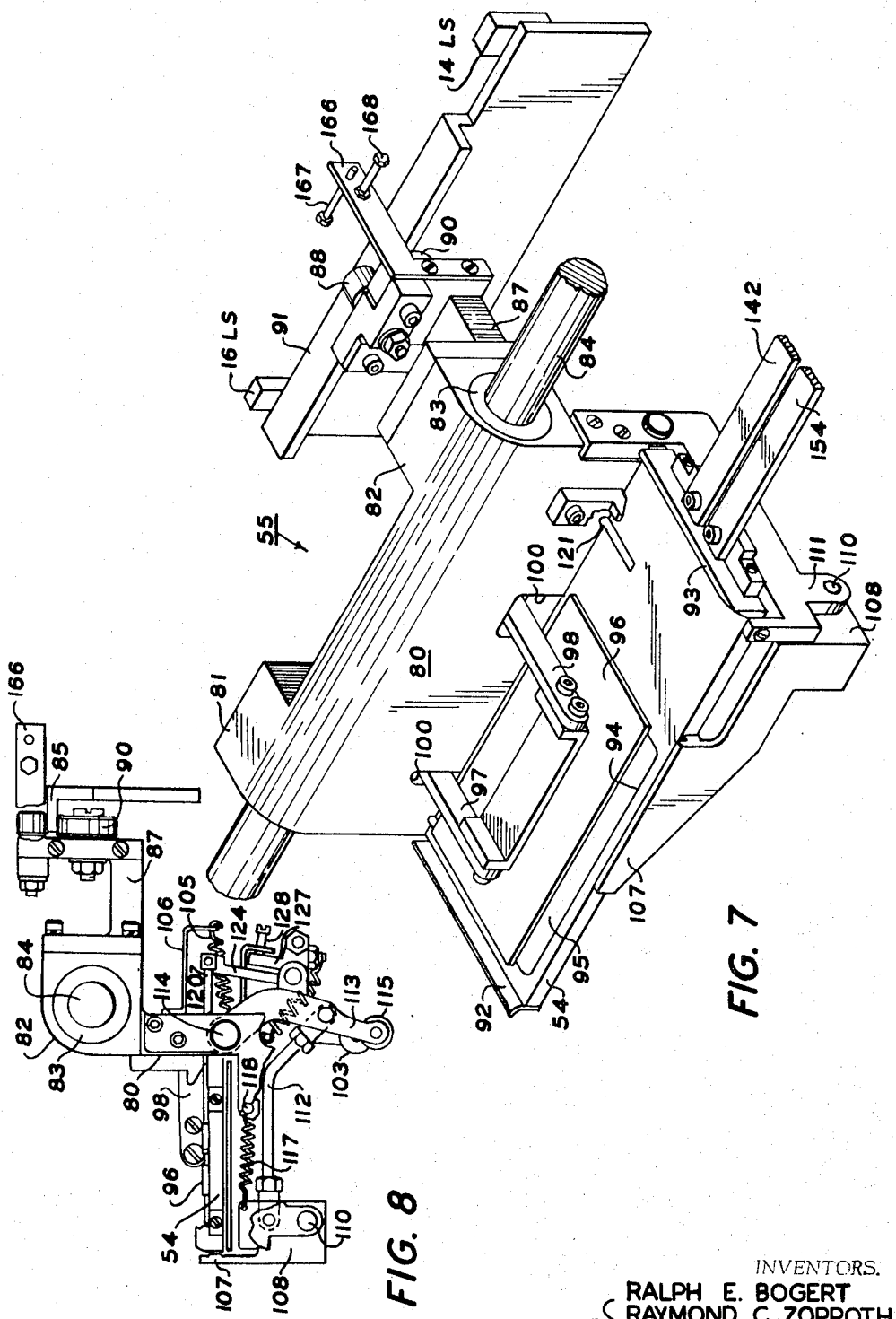

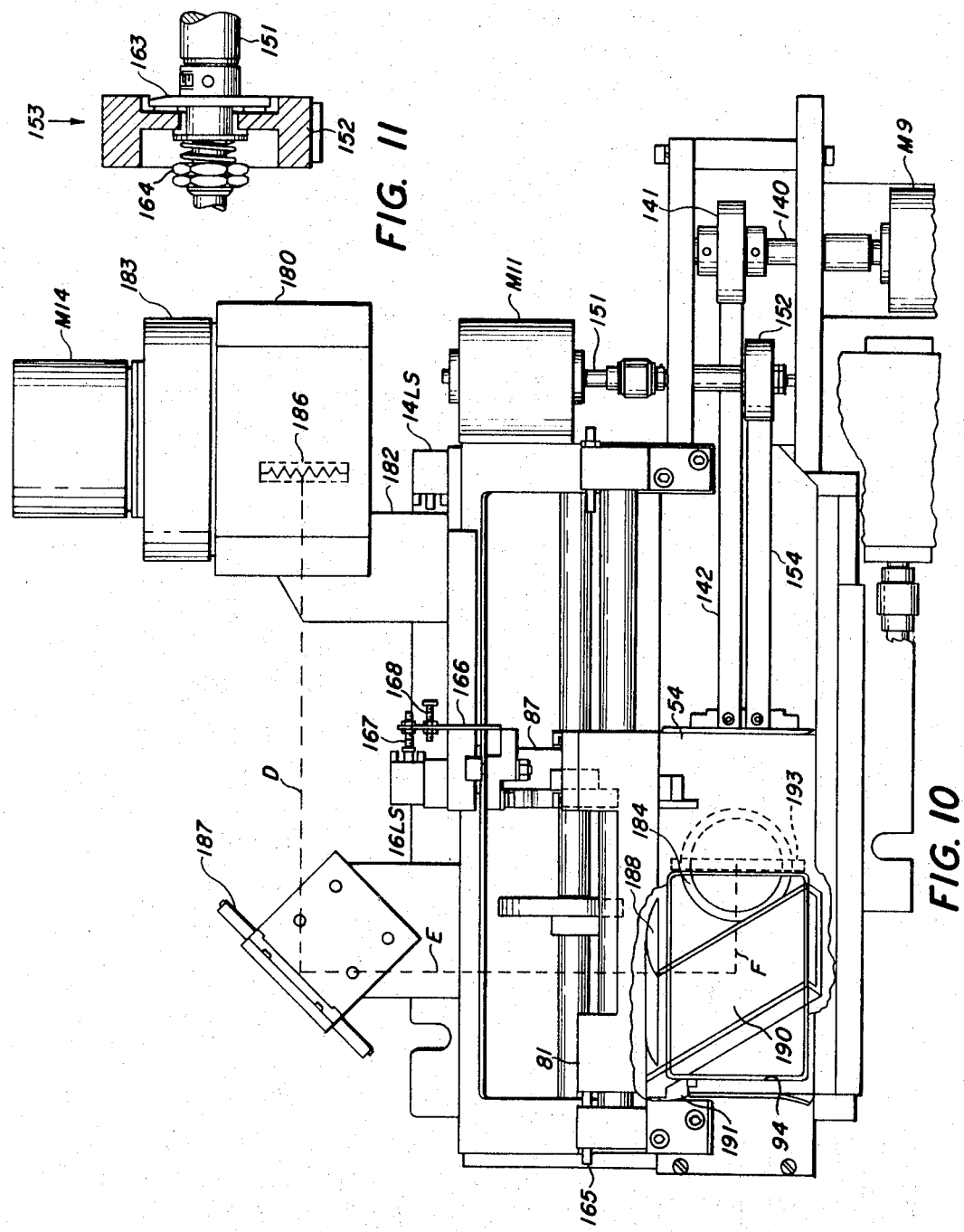

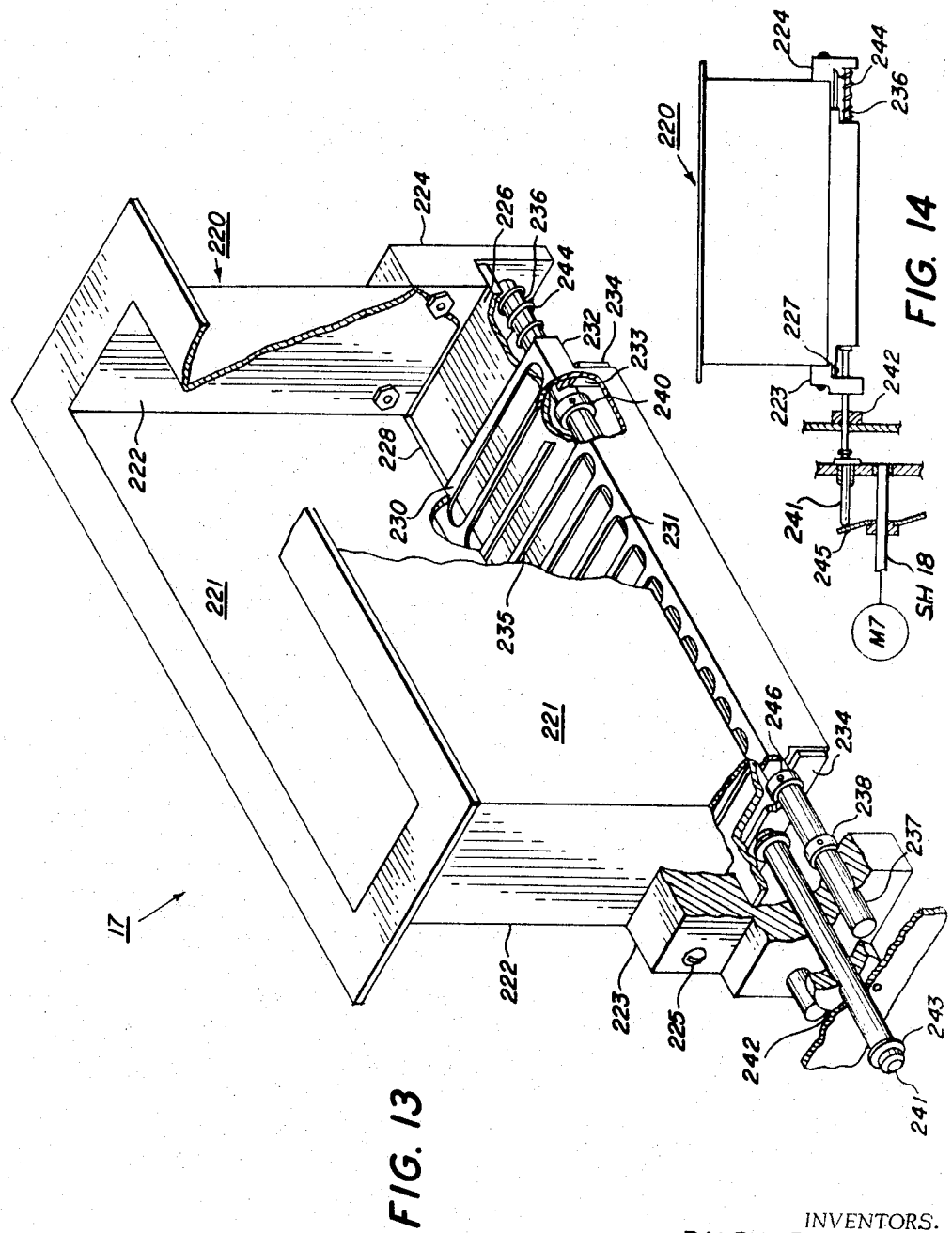

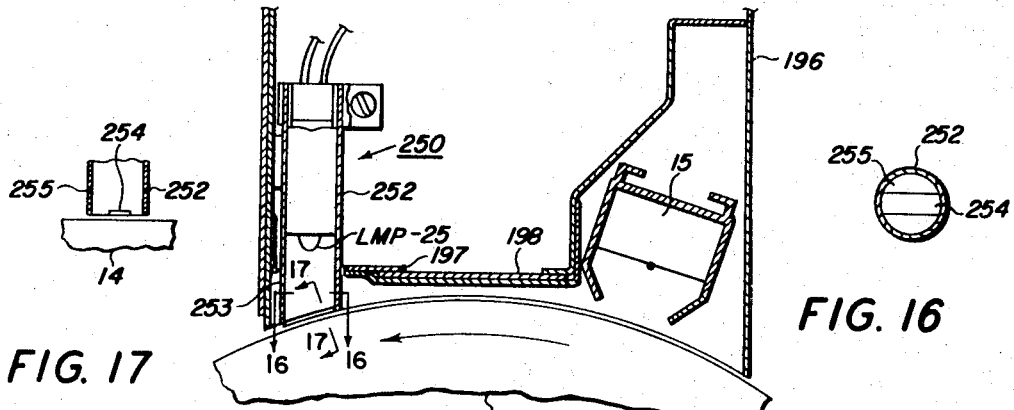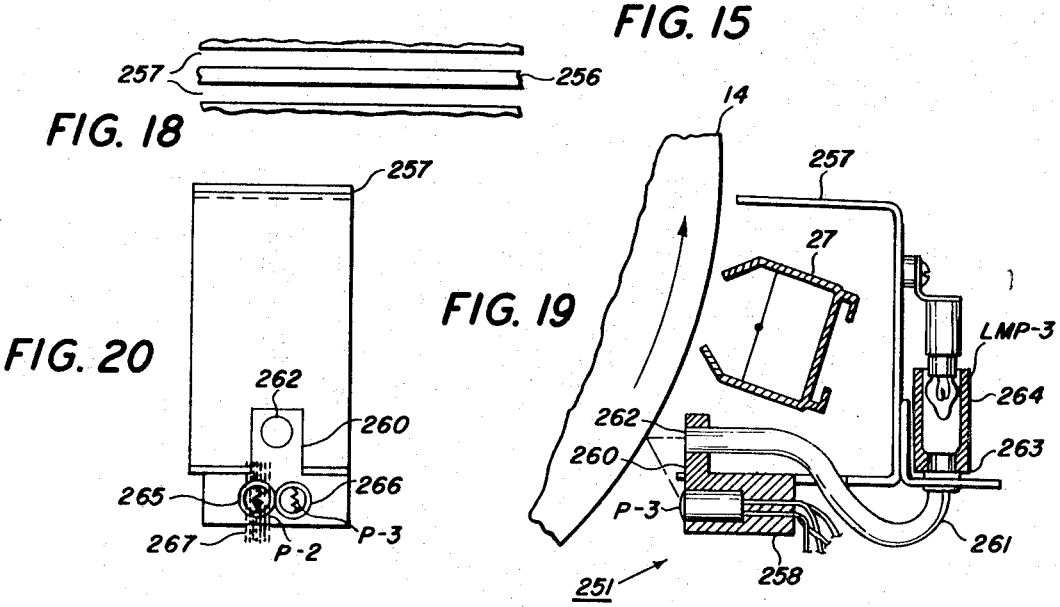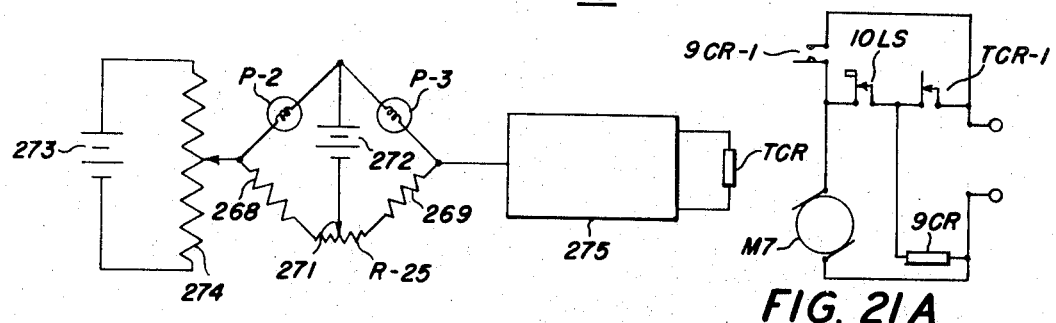

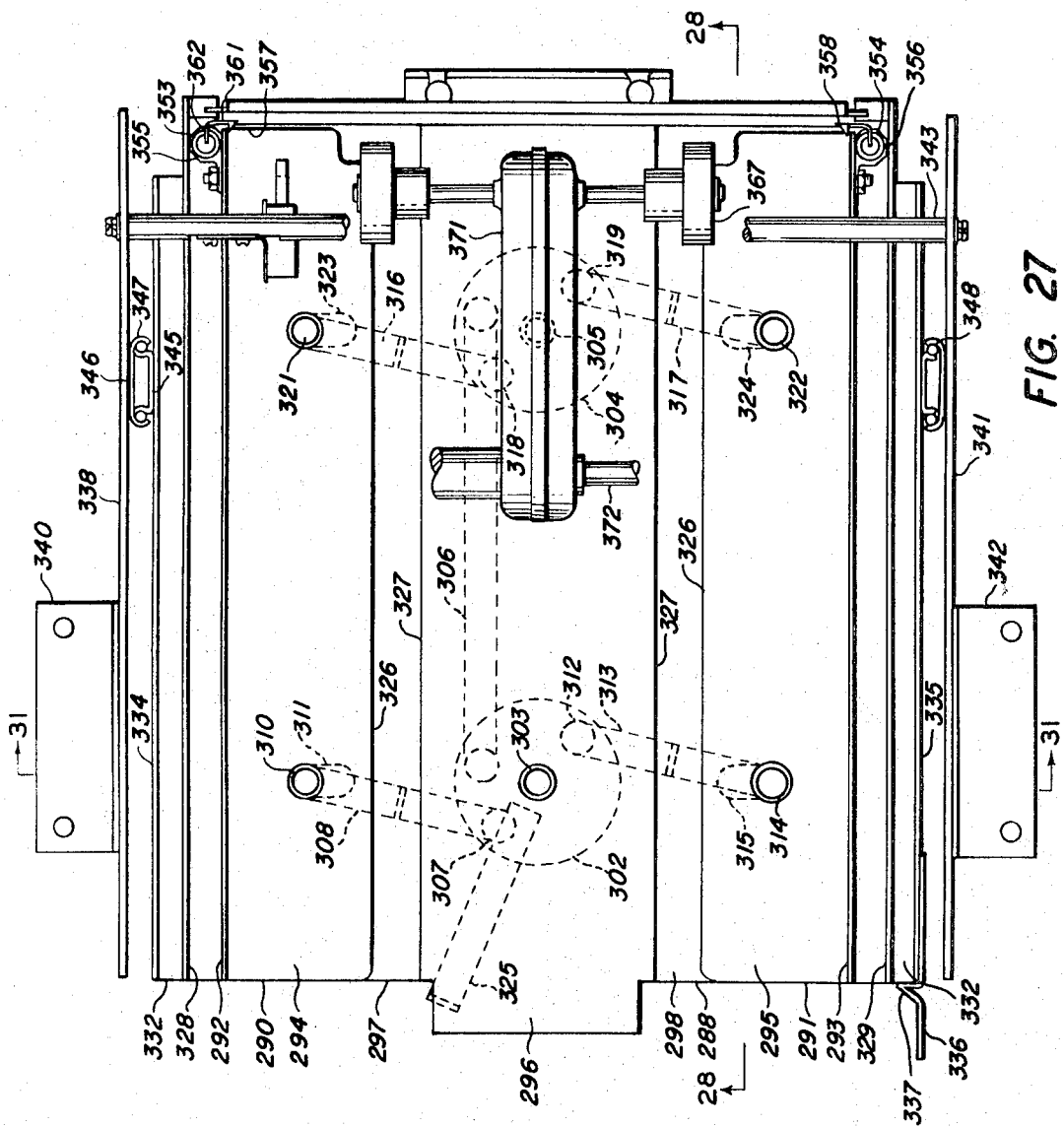

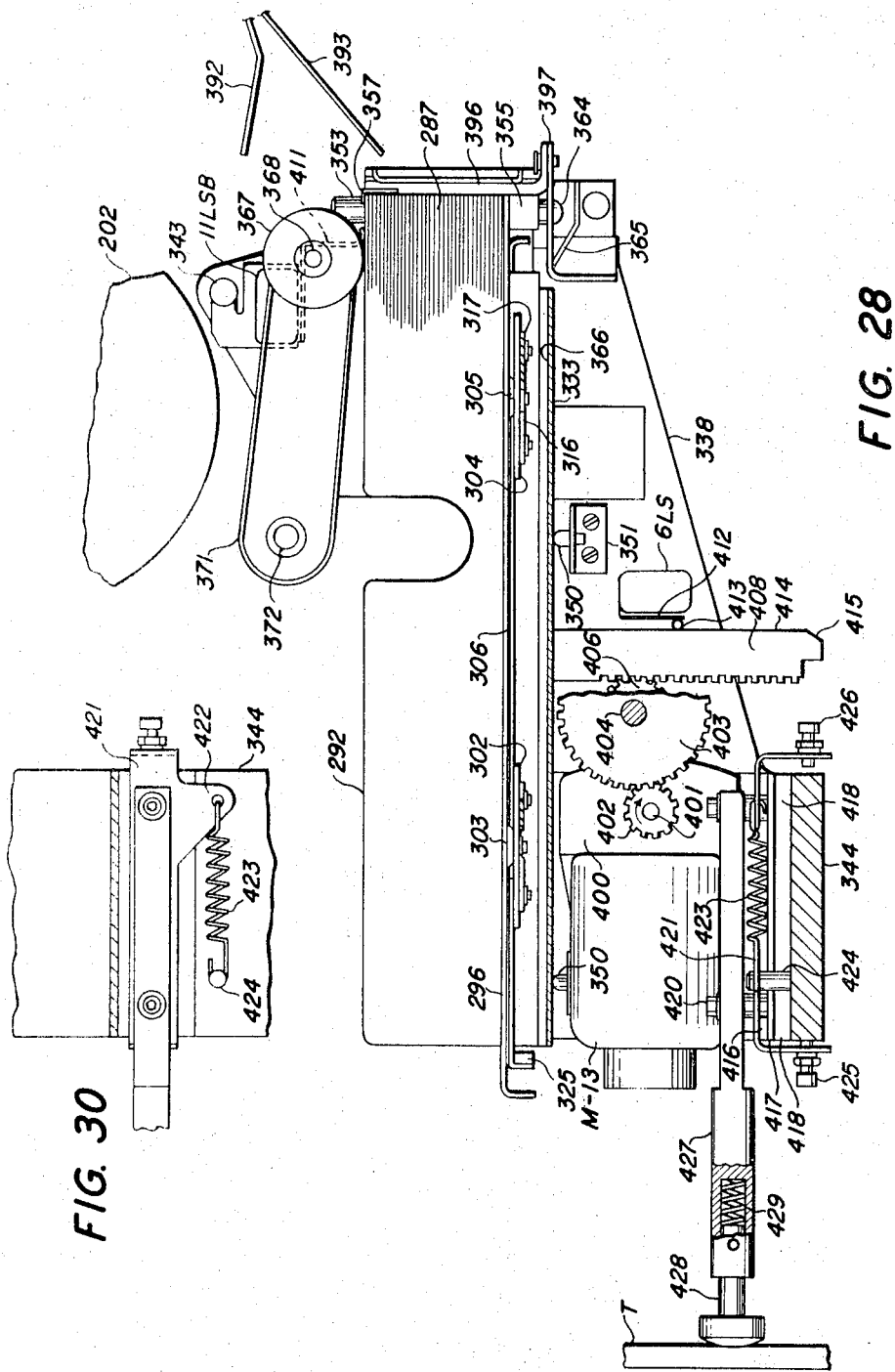

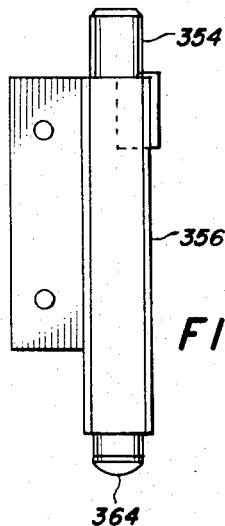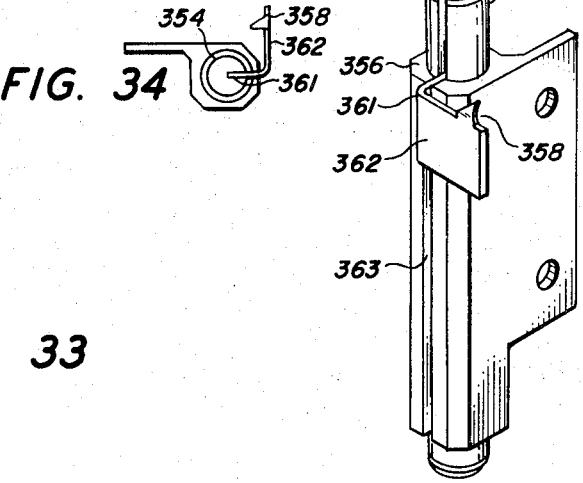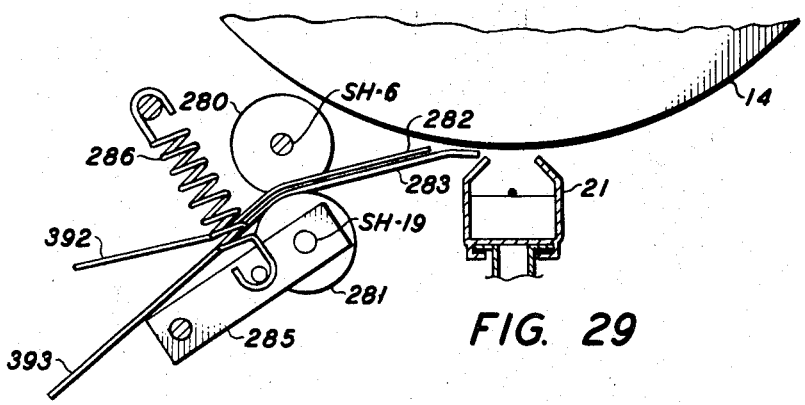

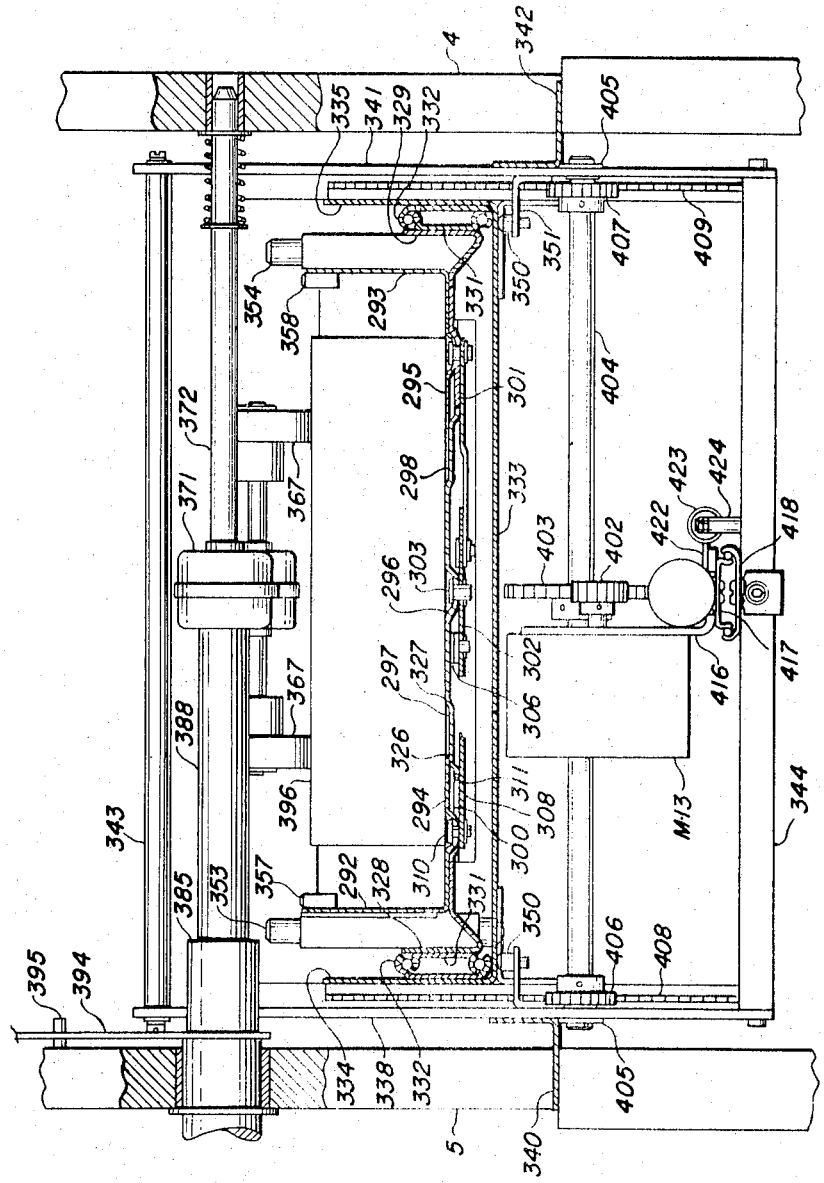

INVENTORS.
RALPH E. BOGERT
RAYMOND C. ZOPPOTH

ATTORNEYS

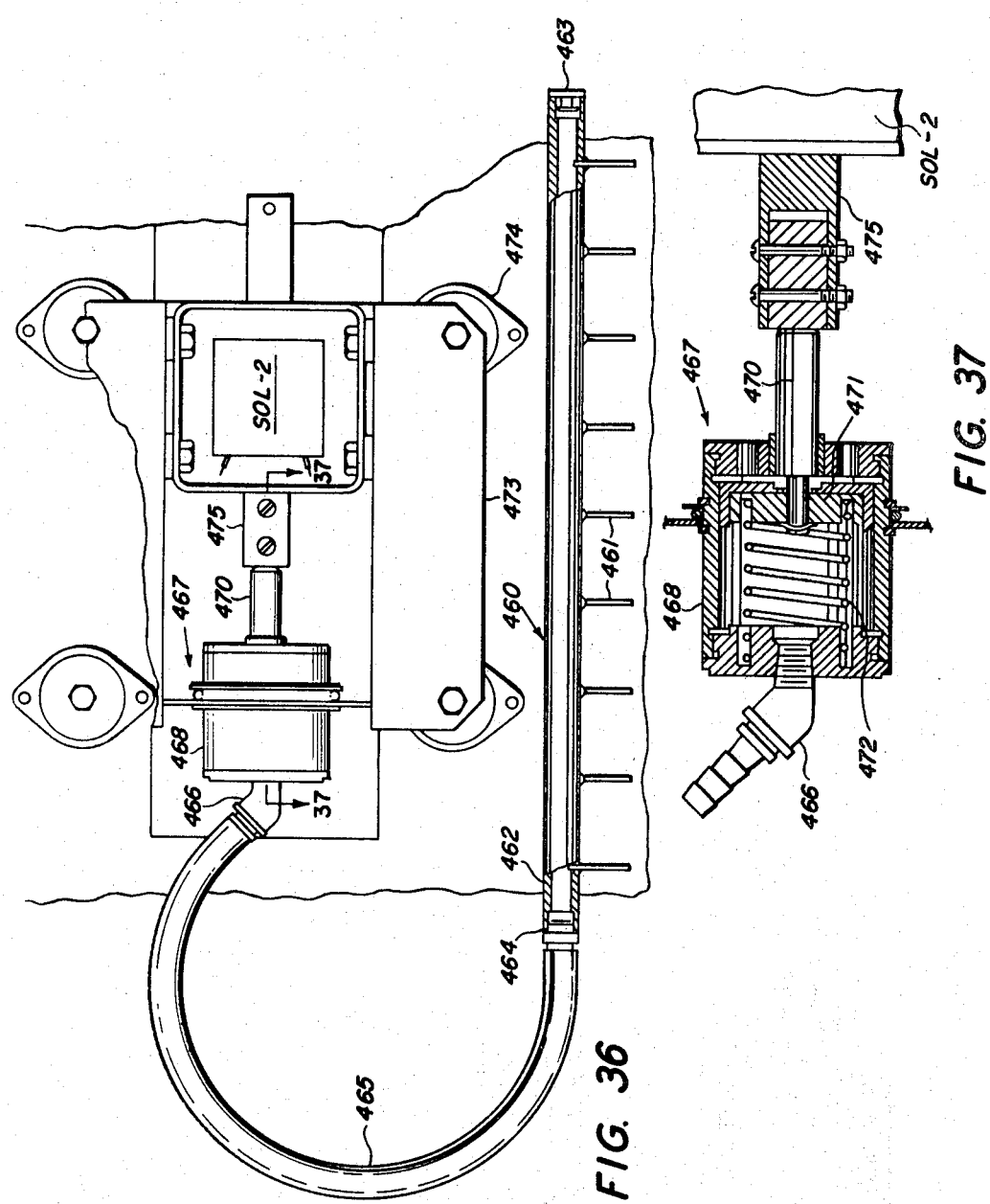

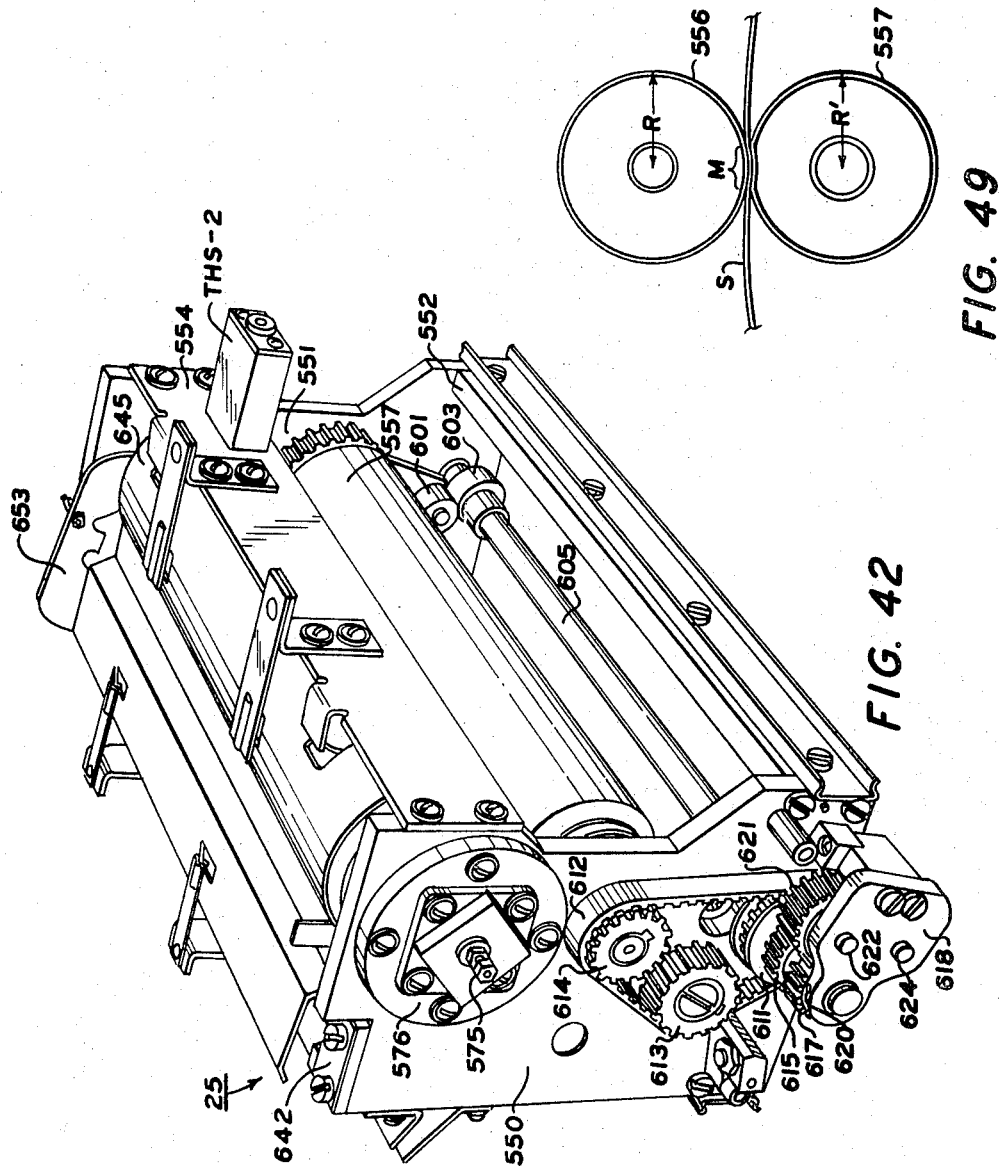

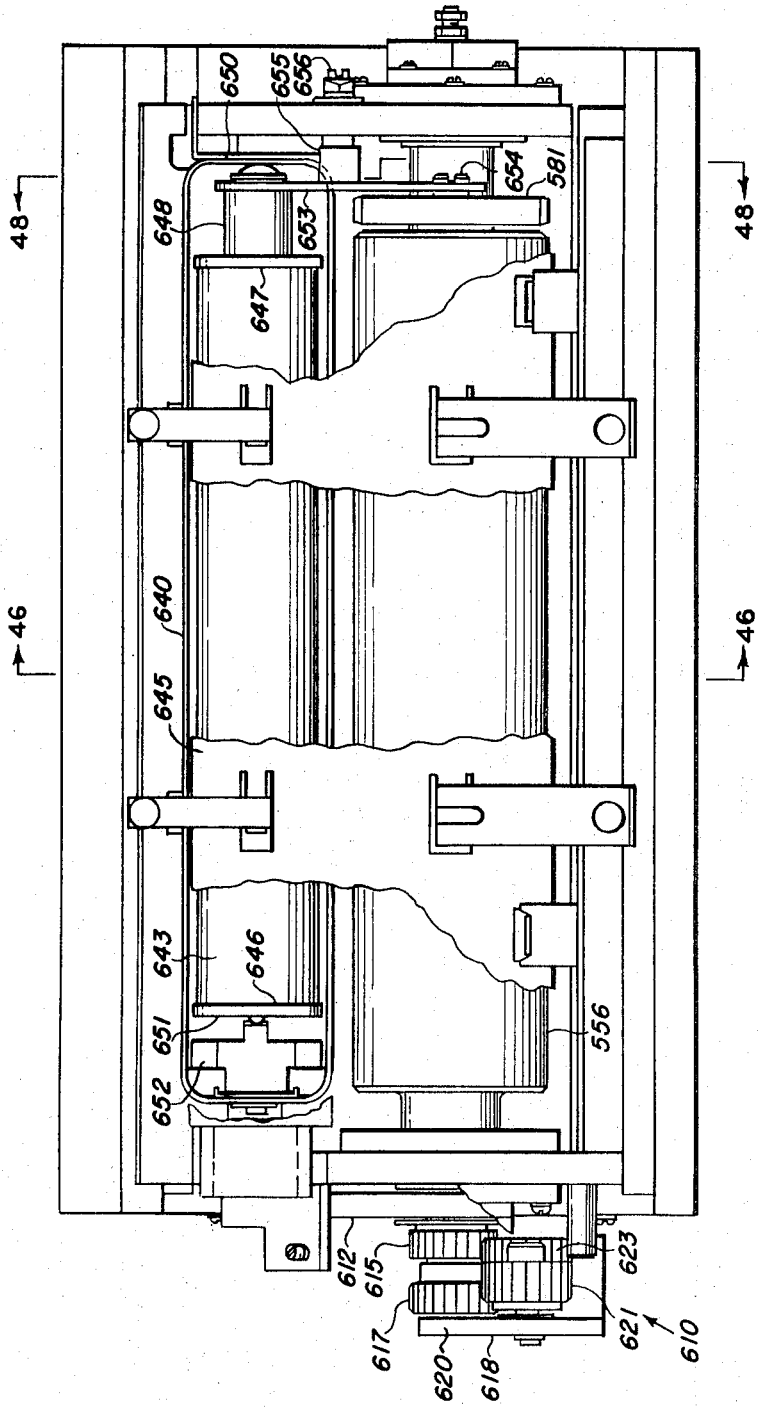

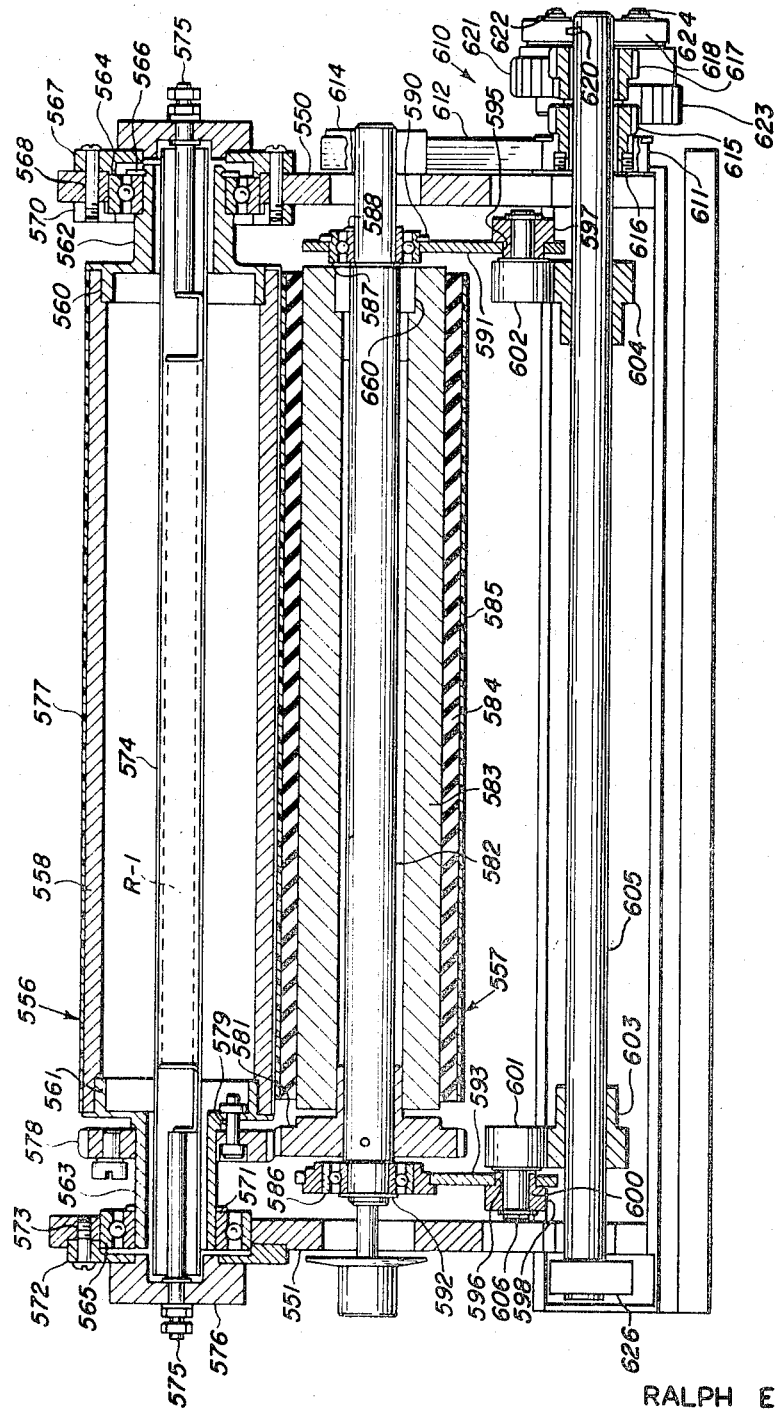

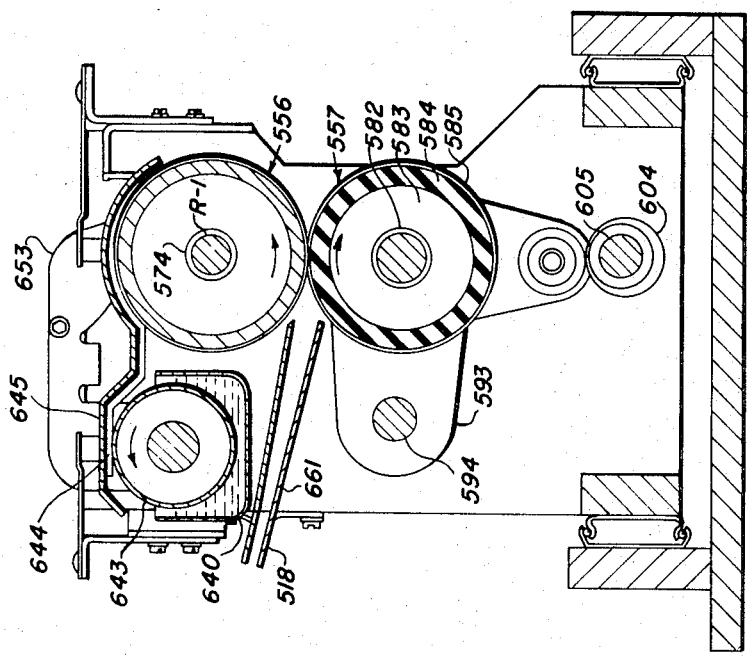
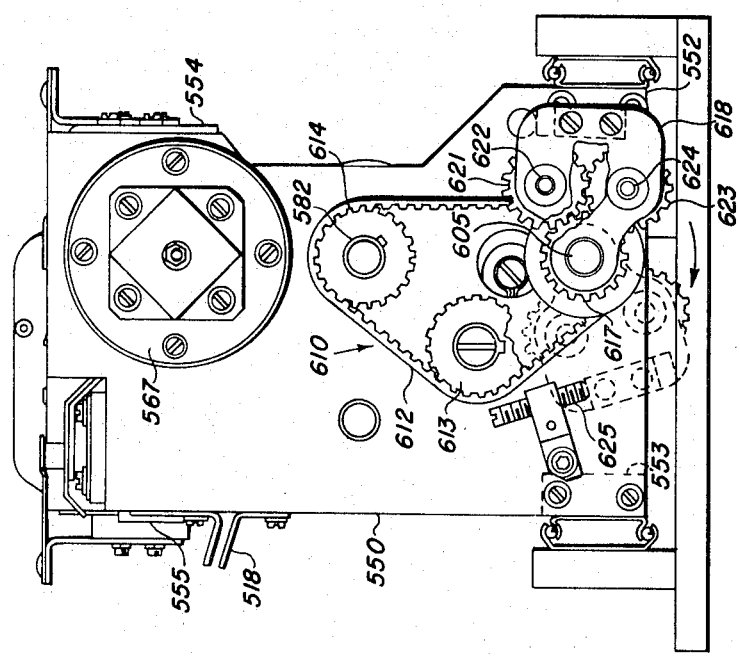

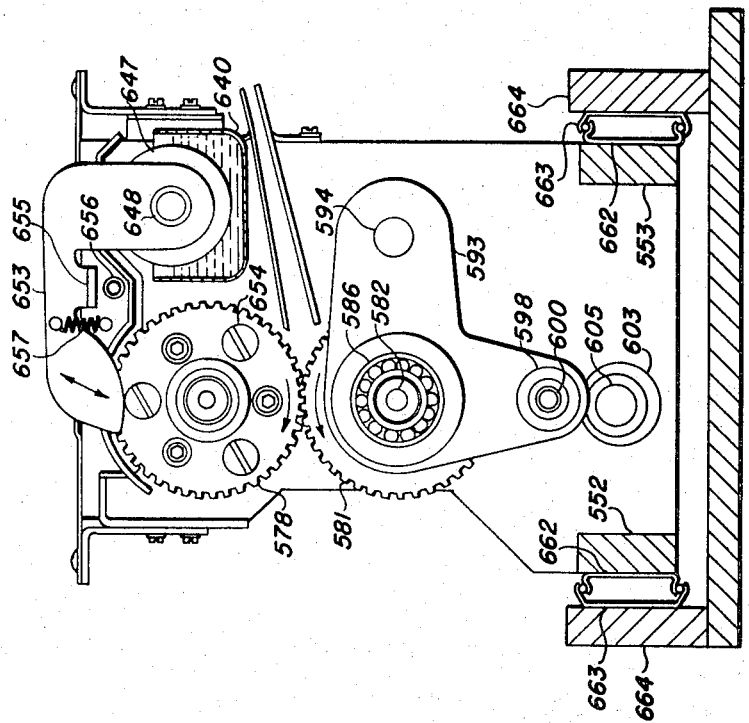
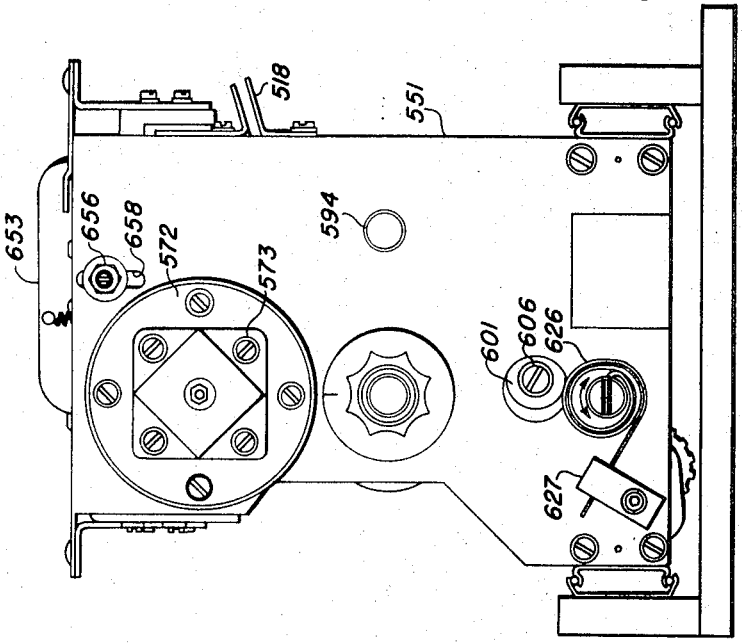

INVENTORS.
RALPH E. BOGERT
RAYMOND C. ZOPPOTH

ATTORNEYS

United States Patent Office 3,355,983
Patented Dec. 5, 1967

3,355,983
CARD HANDLING MECHANISM
Ralph E. Bogert, Ontario, and Raymond C. Zoppoth, Pittsford, N.Y., assignors to Xerox Corporation, Rochester, N.Y., a corporation of New York
Filed Dec. 31, 1964, Ser. No. 422,857
3 Claims. (Cl. 88—24)

ABSTRACT OF THE DISCLOSURE

An apparatus for producing enlarged reproductions upon sheets of paper of semi-micro data cards and including a card handling mechanism having a card carriage arranged to effect scanning of each card by an illumination system, a drive mechanism for reciprocally moving the card carriage across the illumination axis, and control means for maintaining automatic action between the card handling mechanism and a sheet handling mechanism.

---

This invention relates to improvements in automatic xerographic reproduction systems and, particularly, to improvements in systems of this type to facilitate the making of enlarged xerographic reproductions from minified text on micro-opaque cards.

In the process of xerography, for example, as disclosed in Carlson Patent 2,297,691, issued Oct. 6, 1942, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the light intensity that reaches them, and thereby creates an electrostatic latent image on or in the photoconductive layer. Development of the latent image is effected with an electrostatically charged, finely divided material, such as an electroscopic powder, which is brought into surface contact with the photoconductive layer and is held thereon electrostatically in a xerographic powder image pattern corresponding to the electrostatic latent image. Thereafter, the developed xerographic powder image is usually transferred to a support surface, such as, a sheet of copy paper to which it may be fixed by any suitable means.

Since the disclosure in Carlson, many improvements have been made in xerographic devices and techniques and new applications therefor within the scope of the basic Carlson invention. As a result, both manual and automatic machines for carrying out xerographic reproduction processes are in wide commercial use. The present invention constitutes a further improvement in automatic xerographic processing systems whereby such systems may more readily be employed in integrated and unitized data processing systems.

As is well known, in recent years, the steadily increasing size of various industries has required an enormous increase in the number and variety of business records that must be made, maintained, and be kept available for use. Prior to the advent of xerography, previously known conventional systems of record making and keeping were employed for this purpose. However, the increasing enormity of recording operations made this phase of a business increasingly expensive and burdensome to the point that it was becoming economically unfeasible to continue by conventional techniques.

As one facet of the record-keeping problem, the mere protection of the records of a business may be considered. As a safeguard against destruction of records by fire, flood, or other disaster, it became a common practice periodically to microfilm a concern's records and to store these microfilms at locations and under conditions to prevent their inadvertent destruction. Although this technique was effective to preserve the records for possible future reference, it merely added another expense to the record-keeping burden without, in any way, simplifying the handling or maintaining of records. This condition was inherent, first, since the primary purpose was to remove the microfilm records from everyday use and, second because of the relative inaccessibility of selected records contained on such microfilm.

Recently, there has been developed a system for making microfilm records whereby such records may be maintained under conditions of relative security from destruction and, at the same time, be available for day-to-day use. This system is generally known as a "unitized" microfilm system and comprises the basic steps of (1) copying onto microfilm original drawings, tracings, memoranda, reports, or other records likely to require reproduction at a later date, etc.; (2) mounting the individual microfilm frames into the apertures of microfilm data processing cards, which may be designated by coded perforations for use in conventional card-controlled machines; and (3) using such microfilm cards for the reproduction of the film information thereon. However, the use of aperture cards has required the added expense in the provision of apparatus for microfilming records and for mounting the microfilm frames on processing cards.

In the use of the conventional microfilm reproduction apparatus, the microfilm card comprises a conventional record card of the type widely used in record-controlled accounting and tabulating systems, but is provided with an aperture in which a microfilm frame may be inserted and permanently secured to the card. When a microfilm frame of data to be reproduced is so mounted in a microfilm card, the card may also be key punched with appropriate holes and notches representing certain descriptive terms defining, identifying, or relating to the microfilm picture and placed in an index file. Thereafter, these cards may be manually or machine sorted and otherwise processed when the index file is interrogated in accordance with conventional uses of such cards. It will be apparent then that the use of microfilm aperture cards requires the practice of many processing steps and the need for corresponding equipment to practice the process.

However, the use of such microfilm cards has made it possible to effect substantial savings in the reproduction of minified records when compared to other systems for the preservation of records. Nevertheless, from the standpoint of producing card information, microfilm systems require conventional photographic projection equipment to produce the microfilm information. This involved cumbersome, costly and time-consuming photographic developing techniques that detracted substantially from the overall efficiency of the system.

More recently there has evolved another form of information retrieval utilizing the standard EAM punch card and index system. Instead of implanting microfilm frames within apertures formed in cards, this new form of information storage requires merely printing in minified size the information or data from a document upon the opaque area of a card that would normally have contained the microfilm frame. In the use of this form, the information or data is reduced in size by 3× as distinguished from the conventional 15× or 20× for microfilm aperture cards thus enabling the operator to quickly and directly scan the data on the card for determining relevance for his purpose without the need for projectors, viewers, or the like. This advantage together with the particular advantage that these cards may be duplicated with greater ease than is the case for aperture cards thereby permitting more extensive dissemination of the information on a card renders this new form of information storage and retrieval a serious competitor of the aperture card system.

The present invention avoids the disadvantages of the microfilm reproduction processes by eliminating altogether the need for microfilm aperture cards while still utilizing the advantages of a punched-card index system and the standard processing cards for containing minified records, etc. As previously stated, a typical minified data or information card contemplated herein is the type which has printed thereon a typical record in miniature size formed thereon by a suitable printing process such as, for example, by xerography.

By means of the present invention it is possible to reproduce information from processing cards conveniently, economically, and at a rate of speed that contributes substantially to the utility and effectivenes of minified records system. This is effected by means of an improved automatic xerographic processing system wherein minified data cards may be fed seriatim to an optical scanning system and have their printed information projected onto the sensitized surface of a rotating xerographic drum after which an enlarged reproduction of the minified data area is quickly and accurately transferred to a desired support surface.

The principal object of the invention is to improve automatic xerographic processing systems for use in minified data processing systems. A further object of the invention is to improve automatic xerographic processing systems to facilitate the reproduction of copy from miniaturized records on standard data processing cards. A further object of the invention is to improve card handling apparatus to enable compatible operation of cards with xerographic processing systems.

A further object of the invention is to improve card handling apparatus to enable compatible operation of opaque cards with xerographic processing systems, independently of the longitudinal dimension of the minified data on the card.

These and other objects of the invention are attained by means of an improved xerographic processing system that is provided with card handling apparatus for feeding data processing cards containing minified data seriatim to a card carriage whereby they are transported past the optical axis of a projection system in timed relation to the movement of a sensitized xerographic plate whereby the image of the minified data is effective to form an electrostatic latent image on the xerographic plate in an enlarged configuration of the minified data area. Thereafter, the electrostatic latent image is developed by means of a cascade developing system to form a xerographic powder image of the image on the drum. In addition, a paper feeding device is arranged to present a sheet of transfer material into surface contact with the xerographic plate and the electrostatic force developed in the transfer of the xerographic powder image to the transfer sheet material is effective electrostatically to tack the transfer sheet material to the plate surface to ensure synchronism of movement therewith. After image transfer, the transfer sheet material is passed through a fusing apparatus wherein the xerographic powder image is permanently affixed to the sheet. The apparatus also includes means for controlling the operation of the card handling apparatus whereby a predetermined number of reproductions of each card may be made, as required. Furthermore, the card handling apparatus may be positioned relative to the axis of the optical system, as desired, whereby cards having different longitudinal dimensions may be processed without loss of time or waste of material.

A preferred form of the invention is shown in the accompanying drawings in which:

FIG. 5 is a perspective view of the card handling apparatus, as seen from the rear of the machine;

FIG. 6 is a front view, partly broken away of the drive mechanism utilized in the card handling apparatus;

FIG. 7 is an isometric view of the card carriage, as seen from the front of the machine;

FIG. 8 is a schematic sectional elevation of the card ejecting and card holding mechanisms of the card handling apparatus;

FIG. 10 is a plan view, partly broken away, of the card carriage in relation to the optical system for the machine;

FIG. 11 is a sectional view of a detail in FIG. 10;

FIG. 13 is an isometric view of the toner dispenser;

FIG. 14 is a front view of the toner dispenser and its actuating mechanism;

FIG. 15 is a sectional view of the stripe marker for the automatic toner dispensing circuit;

FIG. 16 is a sectional view of the stripe light mask taken along line 16–16 in FIG. 15;

FIG. 17 is a sectional view of the light mask taken along the line 17–17 in FIG. 15;

FIG. 18 is an illustration of a developed powder image of the stripe produced by the toner dispensing control system;

FIG. 19 is an enlarged view of the sensing head used to sense the density of the developed powder image;

FIG. 20 is a left hand view of the sensing head as it appears in relation to the xerographic drum surface;

FIG. 21 is a schematic wiring diagram of the sensing head apparatus;

FIG. 21a is a wiring diagram for controlling the dispenser motor;

FIG. 25 is a diagrammatic illustration of the cam positions for the programmer shown in FIG. 23;

FIG. 27 is a top view of the paper tray and paper feed mechanism;

FIG. 28 is a side sectional view of the paper feed mechanism and the paper level control mechanism taken along line 28–28 in FIG. 27, with some parts removed;

FIG. 29 is a sectional view of the paper register rollers;

FIG. 30 is a fragmentary view of a detail in the paper level control mechanism;

FIG. 31 is a sectional view of the paper feed mechanism taken along the line 31–31 in FIG. 27;

FIGS. 32, 33 and 34 are illustrations of a detail used in the paper feed mechanism shown in perspective, from the side and the top, respectively;

FIG. 36 is a top view, from the left, of the paper pickoff mechanism;

FIG. 37 is a sectional view of the pulsator and its drive taken along line 37–37 of FIG. 36;

FIG. 42 is an isometric view of the fuser assembly and drive therefor utilized with the present invention;

FIG. 43 is a top view of the fuser assembly with parts broken away;

FIG. 44 is a side sectional view of the fuser assembly;

FIG. 45 is a rear view of the fuser assembly;

FIG. 46 is a sectional view of the fuser assembly taken along the line 46–46 in FIG. 43;

FIG. 47 is a front view of the fuser assembly;

FIG. 48 is a sectional view of the fuser assembly taken along line 48–48 in FIG. 43;

FIG. 49 is a diagrammatic illustration of the upper and lower fuser rollers when pressure is applied thereto.

Throughout this description, the front of the xerographic processing system (see FIG. 1) is regarded as that portion which the operator faces while placing minified data cards in the machine for reproduction and while adjusting the several manual operating controls. The right and left end of the machine are regarded as being to the right and left of the operator as he faces the machine.

Figure 1:
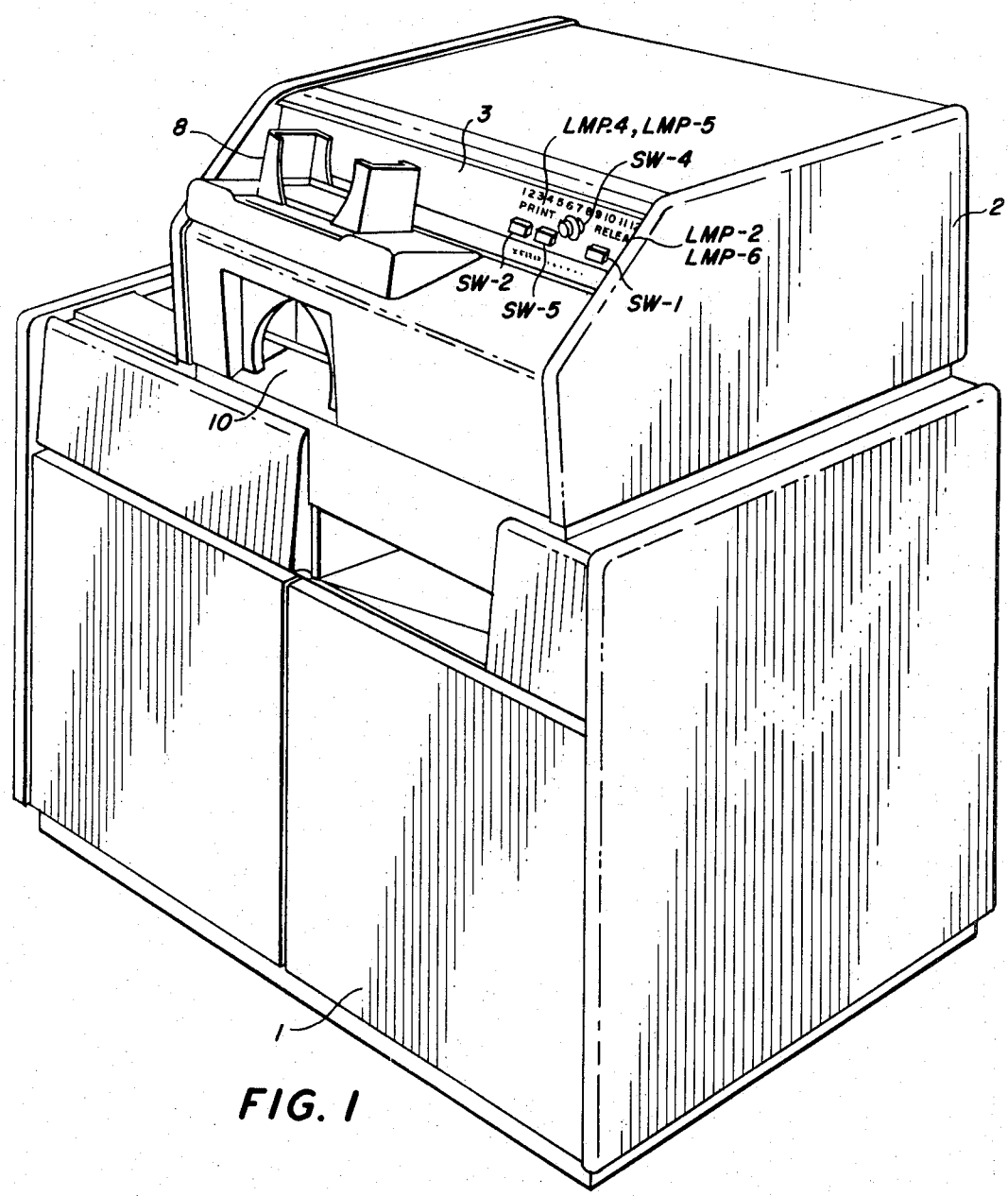
FIG. 1 is a perspective view of an automatic xerographic processing system embodying the invention.

In the particular embodiment shown in the drawings, the invention is incorporated in a minified data projection system that is a fully automatic, continuous printer for reproducing information contained on minified data opaque cards. This equipment produces copy on individual sheets of paper, that may have a width up to 9" and a length of 14" in a magnification ratio of approximately 3× which is enlarged to the full width of the sheet of material. Referring to FIG. 1, the system may be considered to include four distinct sections for housing the several elements thereof, namely, a base section 1, for housing the xerographic drum, the paper supply tray and feeding apparatus, as well as the devices for effecting the xerographic functions of plate charging, xerographic developing, image transfer, brush cleaning, etc.; an upper section 2, for housing the card handling apparatus as well as the bulk of the optical system; and a control section 3, mounted on the base section and forward of the upper section, for housing certain of the electrical equipment required in the system and to provide a control panel whereon the operator may set selected one of a plurality of switches for selecting the desired type of operation.

Figure 2:
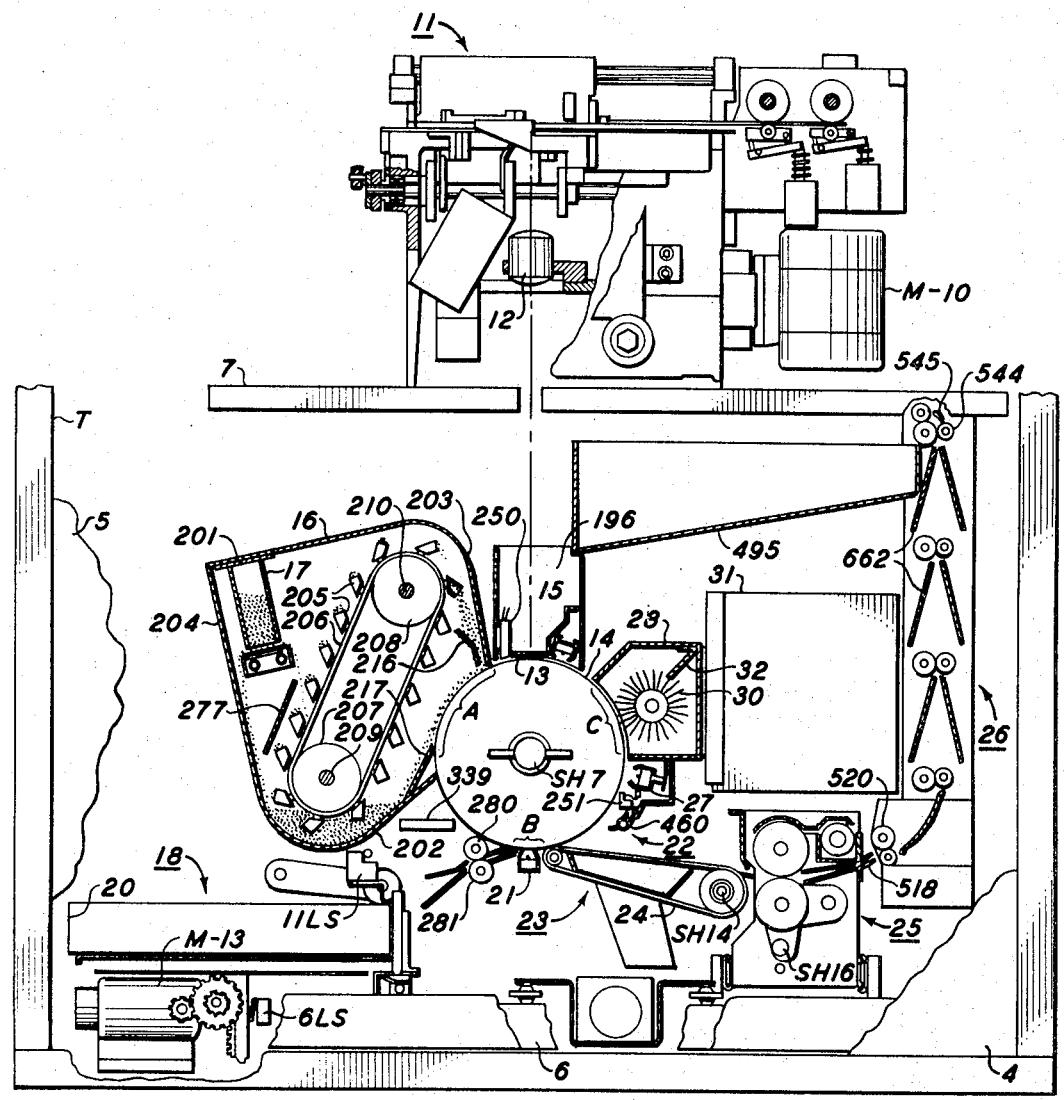
FIG. 2 is a schematic sectional view of the apparatus of the invention.

As shown in FIG. 2, the base section 10 includes front and rear plates 4, 5 supported on a base plate 6 and, connected across their tops by a top plate 7, whereby the entire system is supported. Suitable cover plates are included to enclose the mechanism and access doors are provided on the front of the machine to facilitate repair and adjustment. Upper section 2 includes suitable cover plates for enclosing the bulk of the data card handling apparatus and the optical system, as well as a data card magazine 8 for holding cards from which reproductions are to be made, and a receiving magazine 10 to which cards are ejected after minified image thereon is reproduced. The entire structure is specifically arranged to form a light-tight enclosure in the areas of the optical projection system and the xerographic developing system.

Control section 3 includes an instrument panel for supporting the several operating controls in convenient reach of the operator. These controls include an automatic reset-type selector switch SW–4, that is pre-settable to the desired number of copies required to be made of any minified card image, an "On" switch SW–1, to initiate warmup of the machine and to place it in "Standby" condition, a "Print" button switch SW–3, to initiate the operation of the system; a "Print Stop" switch SW–5, that functions to stop the machine within a predetermined interval after it is pushed to permit the completion of certain xerographic operations; and an "Off" switch not shown in FIG. 11, that is effective to stop the system instantaneously in the event this should become necessary.

*General description of system (FIG. 2)*

For a general understanding of the xerographic processing system in which the invention is incorporated, reference is had to FIG. 2 in which the various system components are schematically illustrated. As in all xerographic systems based on the concept disclosed in the above-cited Carlson patent, a light image of copy to be reproduced is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by a fusing device, whereby the powder image is caused permanently to adhere to the support surface.

In the system disclosed herein, minified data cards are placed in the card magazine 8 from which they are fed seriatim to a card carriage in a card handling apparatus, generally designated by reference character 11, arranged to the rear of the card magazine assembly. Suitable driving means are provided for the card carriage whereby it is caused to move the card past the optical axis of a light projecting system to be described hereinafter for the purpose of scanning the minified data across a scanning light line. The illuminated card is projected downwardly by means of an objective lens assembly 12 and through a variable slit aperture assembly 13 and onto the surface of a xerographic plate in the form of a drum 14.

The xerographic drum 14 includes a cylindrical member mounted in suitable bearings in the frame of the machine and is driven in a counterclockwise direction by a motor at a constant rate that is proportional to the scan rate for the minified data card, whereby the peripheral rate of the drum surface is identical to the rate of movement of the reflected light image. The drum surface comprises a layer of photoconductive material on a conductive backing that is sensitized prior to exposure by means of a screened corona generating device 15.

The exposure of the drum to the light image discharges the photoconductive layer in the areas struck by light, whereby there remains on the drum a latent electrostatic image in image configuration corresponding to the light image projected from the minified data card. As the drum surface continues its movement, the electrostatic latent image passes through a developing station A in which there is positioned a developer apparatus including a casing or housing 16 having a lower or sump portion for accumulating developing material. A bucket-type conveyor having a suitable driving means, is used to carry the developing material to the upper part of the developer housing where it is cascaded down over a hopper chute onto the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a toner dispenser generally designated 17 is used to accurately meter toner to the developing material.

Positioned next and adjacent to the developing station is the image transfer station B which includes a sheet feeding mechanism adapted to feed sheets of paper successively to the developed image on the drum at the transfer station. This sheet feeding mechanism, generally designated 18, includes a sheet source such as a tray 20 for a plurality of sheets of a suitable transfer material that is typically, sheets of paper or the like, a separating roller adapted to feed the top sheet of the stack to feed rollers which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, guides are positioned on opposite sides of the feed rollers.

The transfer of the xerographic powder image from the drum surface to the transfer material is effected by means of a corona transfer device 21 that is located at or immediately after the point of contact between the transfer material and the rotating drum. The corona transfer device 21 is substantially similar to the corona discharge device 15 in that it includes an array of one or more corona discharge electrodes that are energized from a suitable high potential source and extend transversely across the drum surface and are substantially enclosed within a shielding member.

In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station is positioned a transfer material stripping apparatus or paper pickoff mechanism, generally designated 22, for removing the transfer material from the drum surface. This device includes a plurality of small diameter, multiple outlet conduits of a manifold that is supplied with pressurized aeriform fluid through the outlet conduits into contact with the surface of the drum slightly in advance of the sheet material to strip the leading edge of the sheet material from the drum surface and to direct it onto a horizontal conveyor 23 having an endless conveyor 24 whereby the sheet material is carried to a fixing device in the form of a fuser assembly 25, whereby the developed and transferred xerographic powder image on the sheet material is permanently fixed thereto.

After fusing, the finished copy is preferably discharged from the apparatus at a suitable point for collection externally of the apparatus. To accomplish this there is provided a vertical conveyor, generally designated 26, by means of which the copy is delivered to a copy holder positioned in a suitable super-structure overhanging the rear portion of the desk top.

The next and final station in the device is a drum cleaning station C, having positioned therein a corona pre-cleaning device 27 similar to the corona charging device 15, to impose an electrostatic charge on the drum and residual powder adherent thereto to aid in effecting removal of the powder, drum cleaning device 28 adapted to remove any powder remaining on the xerographic drum after transfer by means of a rotating brush 30 and a source of light, not shown, whereby the xerographic drum is flooded with light to cause dissipation of any residual electrical charge remaining on the xerographic drum.

To remove residual powder from the xerographic drum, there is disposed the cylindrical brush 30 rotatively mounted on an axle. For collecting powder particles removed from the xerographic durm by the brush there is provided a dust hood 31 that is formed to encompass approximately two-thirds of the brush area. To insure thorough cleaning of the brush, a flicking bar 32 is preferably secured to the interior of the dust hood adjacent the edge of the exhaust duct and in interfering relation with the ends of the brush bristles whereby dust particles may be dislodged therefrom.

For removing dust particles from the brush and dust hood, an exhaust duct (not shown) is arranged to cover a slot that extends transversely across the dust hood and is connected to a filter bag in the filter box. A motor-fan unit, connected to the filter box, produces a flow of air through the filter box drawing air through the area surrounding the xerographic durm and the dust by the brush as the air flows through the dust hood. Powder particles are separated from the air as it flows through the filter bag so that only clean air reaches the motor-fan unit.

Any residual electrical charge remaining on the xerographic drum is dissipated by light from a fluorescent lamp mounted in a suitable lamp housing hinged to the dust hood.

Suitable drive means described hereinafter drive the drum and the minified data cards at predetermined speeds relative to each other and included are means to return the cards to their respective traverse starting positions and means to effect operation of the bucket-type conveyor, toner dispenser, horizontal conveyor, fuser assembly, vertical conveyor; the separating roller and feed rollers being controlled in a manner to permit the feed of a sheet of transfer material into registered impression contact with the developed image on the xerographic drum as it is rotated through the transfer station.

In general, the electrostatic charging of the xerographic drum in preparation for the exposure step and the electrostatic charging of the support surface to effect transfer are accomplished by means of corona generating devices whereby electrostatic charge on the order of 500 to 600 volts is applied to the respective surface, in each instance. Although any one of a number of types of corona generating devices may be used, a corona charging device of the type disclosed in Vyverberg Patent 2,836,725 is used for both the corona charging device 15 and the corona transfer device 21, each of which is secured to suitable frame elements of the apparatus and connected to an electrical circuit described hereinafter.

Figure 3:
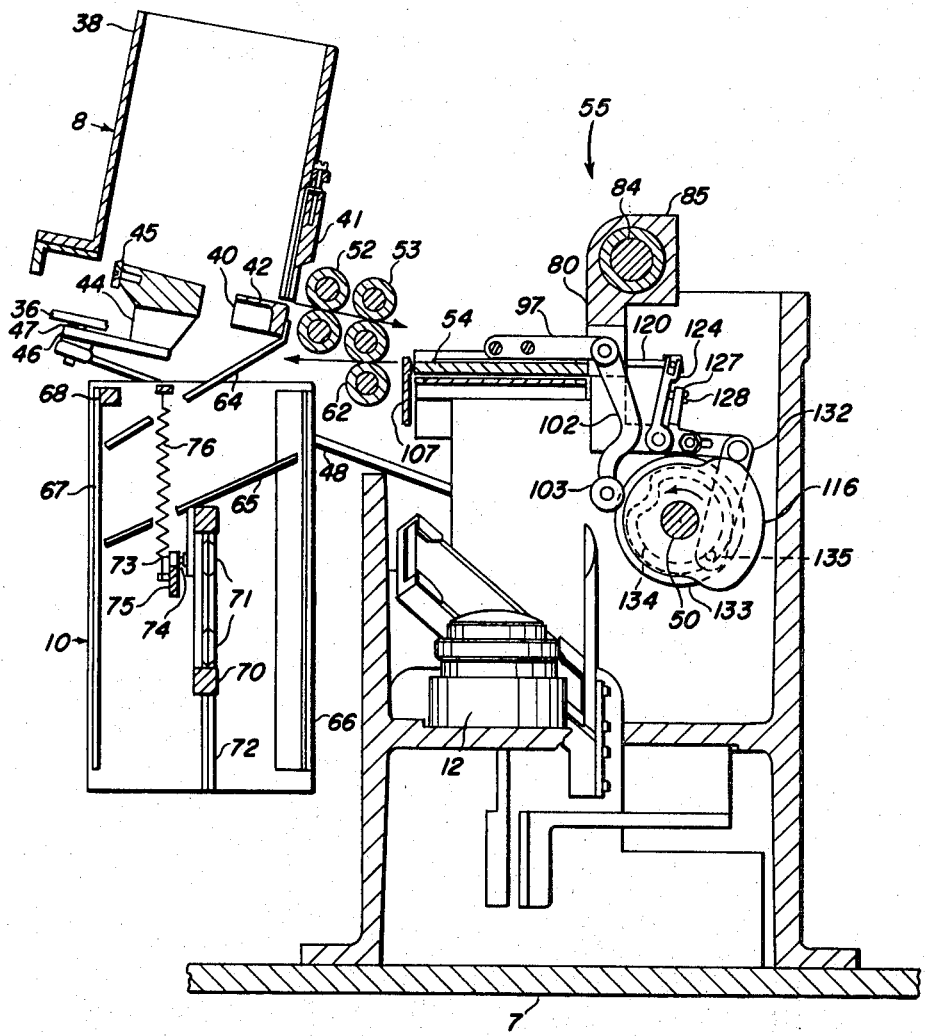
FIG. 3 is a side elevation, partly in section, of the card handling apparatus for the invention.

*Card feeding apparatus (FIGS. 3, 4 and 5)*

The card feeding apparatus comprises the several devices that serve to feed minified data cards seriatim from card magazine 8 (see FIG. 3) to a card carriage whereby they are moved past an optical system that is effective to project the minified data image onto the xerographic drum one or more times, in accordance with the number of copies required. After projection of the required number of light images, the card is ejected from the card carriage and is deposited in the receiving magazine.

Figure 4:
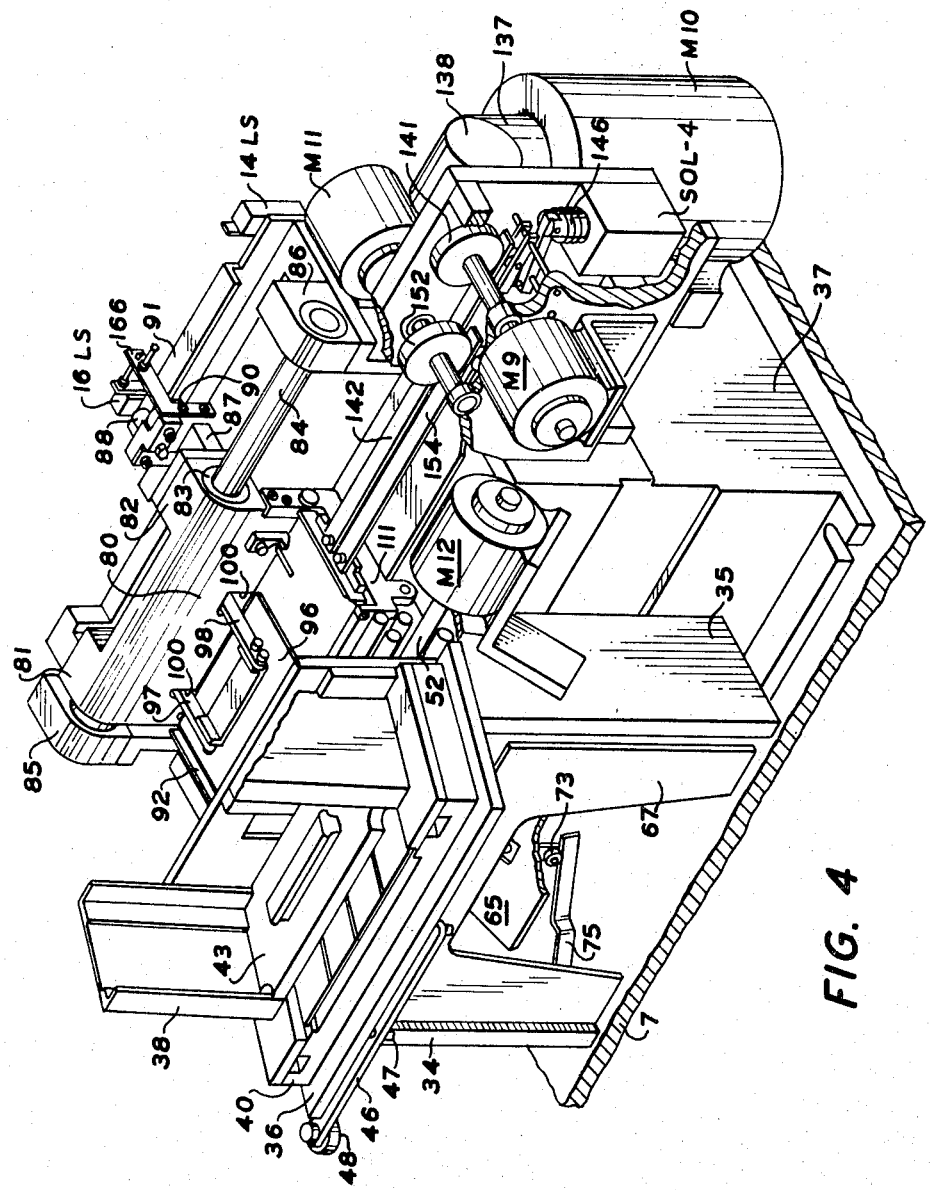
FIG. 4 is a perspective view of the card handling apparatus, as seen from the front of the machine.

For convenience of assembly and adjustment, the card feeding apparatus, as shown in FIG. 4, is mounted on a rigid frame consisting of side plates 34 and 35 and a top plate 36 that is integrally connected with the side plates. Side plates 34 and 35 are also connected at their lower ends on a base casting 37 that serves to support the entire card handling apparatus and, in turn, is supported on plate 7 of base section 1.

Seriatim feeding of the cards is effected by means of an apparatus that is an adaptation of that disclosed in copending application Ser. No. 159,402, filed Dec. 12, 1961, in the name of R. A. Hunt. Minified data cards are placed in card magazine assembly 8 that includes vertical guide members 38 for holding a stack of cards in alignment, and base member 48 for supporting the weight of the card stack which, in turn, is supported on frame plate 36. The magazine is arranged to permit the feeding of cards from the bottom of the card stack, and an adjustable throat knife assembly 41 is provided at the exit slot 42 of the magazine to retain the remaining cards in the stack as each bottom card is removed. A card weight 43 is provided to hold the cards in proper feeding relation.

For moving each card out of the magazine, the apparatus includes a movable base block 44 that supports the trailing edge of the card stack and is provided with an adjustable pickerknife 45 that is arranged to engage the trailing edge of the lowermost card of the stack. Base block 44 is mounted in suitable ways for sliding movement toward and away from the exit slot of the magazine, and is reciprocated in timed relation to the operation of the remainder of the card handling apparatus. For this purpose, a lever 46 is pivotally mounted on a stud 47 fixed in the frame plate 36 and is connected to the base block 44 by a suitable screw. The other end of lever 46 is connected to a crank rod 48 which, in turn is pivotally connected to a crank arm 49 keyed on a cam shaft 50 (see also FIG. 5). As described below, the cam shaft 50 is rotated periodically through a single revolution clutch, in timed relation to the remainder of the mechanism, whereby a single card is advanced from card magazine 8, as required.

As each card leaves magazine 8, it is gripped successively by two sets of feed rolls 52 and 53 and advanced rearwardly to a card carriage 54 of a reciprocable carriage assembly, generally designated by reference character 55. For this purpose, both sets of feed rolls 52 and 53 are journaled for rotation in supporting brackets 56 and 57 that are secured on side plate 34 and 35, respectively, and the upper rolls are resiliently urged into engagement with the lower rolls by springs 58. For driving the feed rolls, the shaft of lower roll 52 extends through bracket 56 and is connected to the drive shaft of a motor M12 that rotates continuously while the apparatus is in operation. The remaining rolls are positively driven through pinions 60 fixed on each feed roll shaft and an idler pinion 61 mounted on bracket 57, whereby the two upper rolls of the sets 52 and 53 are rotated counterclockwise, as viewed in FIG. 3 and lower rolls of the sets 52 and 53 are rotated clockwise to advance the card to card carriage 54, which at this point of operation if directly aligned with the feed rolls to receive the card.

Immediately thereafter, the card carriage 54 is moved to the right, in a path of movement normal to the card feeding movement, to effect the image scanning operation. After the minified data is scanned, the carriage 54 is returned to a position in alignment with the feed rolls and the card is ejected from the carriage, as described below. Thereupon, it is engaged by the lower feed roll 53 that is in frictional contact with an idler feed roll 62 that is rotatably mounted in a pair of arms 63, pivoted on the side plates 34 and 35, and is resiliently urged into contact with the feed roll 53. The continued driving action of feed rall 53 is thereby effective to move the card forwardly against a deflector plate 64 that causes the card to drop downwardly and come to rest on a support plate 65 in receiving magazine 10.

The receiving magazine includes suitable vertical guide members 66 to confine the movement of the cards rearwardly, and a gate member 67 is fixed on a rod 68 that is rotatably mounted in the side plates 34 and 35. The gate member 67 is effective to maintain the cards in a vertical stack but may conveniently be swung outwardly by rotating the member outwardly, whereby the operator may remove cards from the machine. The support plate 65 of the magazine is secured on a rectangular frame assembly 70 having rollers 71 that ride in vertical grooves 72 in the side plates 34 and 35, whereby the support plate 65 is guided for vertical movement. A roller 73 is mounted on a stud 74 fixed in frame assembly 70 and rides on a lever 75 that is pivotally mounted in the side plate 35. A spring 76 is extended between lever 75 and the magazine frame to urge frame assembly 70 and support plate 65 upwardly, when there are no cards in the magazine. This construction minimizes the possibility of cards tumbling as they are ejected from the card carriage 54, and, at the same time, provides a support plate structure that moves downwardly as additional cards are added, against the tension of the spring 76, whereby a substantial number of cards may be stacked in the receiving magazine before it is necessary for the operator to remove them.

In the event of a misfeed of a card or in the event the supply of cards in card magazine 8 becomes exhausted, means are provided to stop the machine to enable the operator to make the necessary adjustments. For this purpose, a "card detector' limit switch 12LS is mounted on the back plate 77 of the card magazine 8. This switch functions in conjunction with the remainder of the electrical circuit to keep the several operating circuits energized as long as switch 12LS is actuated during the period in which a card is supposed to be passed through feed rolls 52 and 53. For this purpose, a switch-actuating element 78 extends downwardly between the upper feed rolls 52 and 53 and into the path of movement of the cards. Engagement of each card with actuating element 78 serves to maintain the desired circuitry energized. In the event there is a failure to feed a card, the switch 12LS is not actuated and the circuit is thereby broken to stop the machine, as described below.

*Card carriage assembly and controls (FIGS. 3, 5 and 6)*

The card carriage assembly receives each minified data card from the feed rolls and carries it through the scanning cycle, i.e., the "scan" or exposure stroke and the return stroke, during continuous operation of the machine. In the normal stopping position of the system, the carriage assembly 105 is positioned at the end of its scan stroke of movement, in which it is out of register with the card magazine assembly 8. When the system is restarted, carriage 54 is immediately returned to a position in register with feed rolls 52 and 53 of the card magazine assembly to receive the next card for reproduction. The carriage is held momentarily in this position to permit the ejection of a card carried thereby, if any, and to receive a new card carriage and its several related operating mechanisms function to effect the several mechanical movements and electrical circuit connections of the card handling operation in proper sequence.

Figure 9:
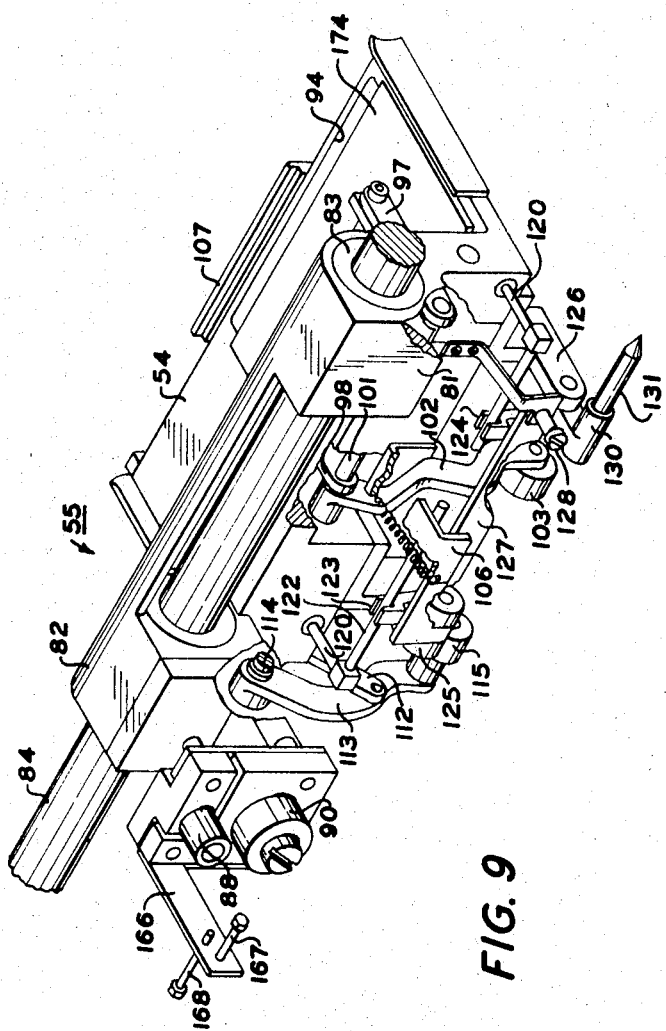
FIG. 9 is an isometric view of the card carriage, as seen from the rear of the machine and in relation to the operative structural details for card handling.

Specifically, card carriage assembly 55 includes the generally horizontally disposed card carriage 54 (see FIGS. 8 and 9) that is formed of a casting having a flat top surface or platen for supporting cards and a generally vertically disposed backing plate 80 to which the carriage 54 is secured along its rear edge. The plate 80 extends upwardly and is formed with bosses 81 and 82 through which is formed a longitudinal bore having suitable linear ball bushings 83. The carriage is adapted for lateral movement, relatively to the card magazine assembly, on a shaft 84 which extends within the bushings 83 and is mounted in frame plates 85 and 86 secured on base plate 37. To maintain the carriage assembly 55 horizontal, it is provided with an extension 87 upon which is mounted an upper roller 88 and two lower rollers 90 at axes at right angles to shaft 84 and which ride on the upper and lower surfaces, respectively, of a rail 91 secured to the base 37 and arranged parallel to shaft 84. By this structure, carriage assemly 55 is supported for movement on the shaft 84 while maintaining its card supporting surface in a substantially horizontal position throughout its path of movement.

For guiding minified data cards onto the carriage platen 54, card guides 92 and 93 are provided at opposite ends of the carriage. In order to project a light image from a minified data card supported on the carriage, a rectangular aperture 94 (see FIG. 7) is formed through the carriage 54. The aperture 94 is of a dimension slightly in excess of that of the minified data area imprinted on a card, and is positioned to underlie the data area when the card is positioned on the carriage. An optical glass insert 95 is positioned in the aperture 94 to provide a flat surface for supporting the minified data area.

For clamping the minified data area of a card in scanning position, there is provided a spring loaded, rectangular frame or pressure pad 96 (see FIG. 8) whereby, when the pad is positioned on a card held on the carriage, the pad securely presses the minified data area against the insert 95 in the carriage so that the minified data area is securely pressed in a horizontal plane during the scanning operation.

In order to actuate the pressure pad 96 to permit the insertion and removal of minified data cards, the pad is fixed to two arms 97 and 98 that extend through suitable openings 100 formed in the backing plate 80 and are pinned on a shaft 101 (see FIG. 9) rotatably journaled in the plate 80 across the openings 100.

For operating the pressure pad 96, a crank 102 is fixed to the shaft 101 and is provided with a cam follower 103 at its lower end that is adapted to be engaged by the high dwell of a cam 104 fixed on the cam shaft 50 which, as described below, is rotated through a single revolution by means of a single revolution clutch drive during each card feeding operation. The rigid crank assembly comprising pressure pad 96, arms 97 and 98 and the crank 102 are resiliently urged clockwise by a spring 105 extended between crank 102 and the outer edge of a bracket 106 fixed on the backing plate 80. The several parts of this assembly are so proportioned that they are limited in motion by contact between the pad 96 and the carriage surface so that the follower 103 is held slightly away from the low dwell of the cam 104 at this stage of operation.

For properly positioning a card on carriage 54 after it is fed thereto, the apparatus includes a line-up plate 107 (see FIG. 9), together with an actuating linkage. The plate 107 is formed with an offset lever portion 108 that is pivotally mounted on a stud 110 secured in a boss 111 on the underside of the carriage. A forked link 112 connects the mid-portion of a lever 113 mounted at its upper end on a rod 114 journaled in the backing plate 80. A follower 115 is rotatably mounted on the lower end of the lever 113 and is adapted to engage the high dwell of a cam 116 that is also fixed on cam shaft 50 (see FIG. 7). A spring 117 is extended between a fixed anchor 118 and the upper portion of the lever portion 108 and functions to urge the plate 107 against the forward edge of carriage 54 and to urge the follower 115 into contact with the cam 116. However, the dimensions of the parts are such that contact between the plate 107 and the carriage limits the rearward movement of follower 115 to a position in which a slight clearance is maintained between it and the lower dwell of the cam 116.

In operation, the plate 107 is rocked counterclockwise (in FIG. 8) immediately prior to the time a card is fed from feed rolls 53 so that the card has unimpeded passageway onto the card carriage. The high dwell of cam 116 is such that when a card is completely passed over the plate 107, the plate is restored to the position shown by the spring 117 and serves to urge the card rearwardly to place it accurately in scanning position.

For ejecting a card during a card changing cycle, two ejector pins 120 (see FIGS. 7 and 9) are slidably journaled in bores 121 drilled through the plate 80 and extending for a slight distance onto the upper surface of carriage 54. The ejector pins 120 are normally held in their rearward position, as in FIG. 9, and are provided with square forward ends that engage the rearward edge of a card positioned on the carriage 54. The rearward ends of pins 120 are connected to a transverse rod 122 that is rotatably retained between the arms of a pair of bifurcated cranks 123, 124 pivotally supported on suitable arms 125, 126, respectively, secured to the lower edge of the backing plate 80. Also pivotally supported on the arms 125, 126 along the pivotal axis for the cranks 123, 124 is a bar 127 having screws 128 threaded thereon which, when the bar is rotated in a counterclockwise direction as viewed in FIG. 8, are adopted to engage and rotate the cranks 123, 124 causing outward movement of the card ejector pins 120 along the carriage 54 for ejecting a card therefrom.

Rotation of the bar 127 in any direction is produced by an angled actuator member 130 in the form of a bell crank which is secured to the bar 127 adjacent the crank 124 and having a follower 131 extending rearwardly and laterally of the carriage assembly. The bell crank 130 is rocked to rotate the bar 127 about its axis by a lever 132 having a bifurcated end straddling the follower 131 and which itself is rotated for producing the rocking action by a cam 133 formed with a cam groove 134 on one side thereof. The lever 132 is suitably pivoted in the frame 34 and has a follower 135 extending into and cooperable with the cam groove. As shown in FIG. 5, during continuous rotation of the cam 133, which is secured to the cam shaft 50, the lever 132 is adopted for rotation in both directions.

For operating the several cam controlled mechanisms of card carriage assembly 55, as well as the card feeding mechanism, there is provided a motor M10 that is supported on the top plate 7 and is connected to the cam shaft 50 through a gear reduction assembly 137 and a conventional solenoid actuated, single revolution clutch 138, whereby the several mechanisms are caused to function in timed relation to the remainder of the mechanism. The motor M10 is driven continuously and is effective to drive the cam shaft 50 through a single revolution upon the energization of a solenoid SOL-3, as described below. When this occurs it is apparent from the cam contours shown in FIGS. 3, 5 and 9 that the line-up plate 107 is first rocked clockwise to remove them from the path of movement of a card. Immediately thereafter, the pressure pad 96 is elevated to release the card, if any, held on the carriage 54. Thereupon, ejector pins 120 are effective to eject the card from the magazine and are immediately withdrawn to their rearward positions.

At this point, the crank 49 is effective to cause a new card to be advanced through feed rolls 52 and 53 and onto the card carriage. Immediately thereafter, the plate 107 is rocked counterclockwise to position the card accurately on the carriage. As this is accomplished, the pressure pad 96 is lowered to press the minified data card into register with the scanning aperture in the carriage. During the rotation of cam shaft 50, the detent cam 98 is effective; first, at about its midpoint of revolution, to actuate a "miss detector" relay switch 8-CR that functions in conjunction with the "card detector" switch 12LS to stop the system in the event of a misfeed; and second, immediately before the end of its rotational movement, to actuate an "end of cycle" switch 14LS that functions to condition the related circuits for a scanning cycle of operation, as described below.

*Card carriage drive*

For driving card carriage assembly 55 during the scanning operation, there is provided a driving arrangement for moving the carriage 54 at a predetermined, relatively slow speed during the "scan stroke," and at a relatively higher speed during the return stroke of the carriage. For this purpose, there is provided a constant speed, synchronous motor M9 (see FIGS. 4, 5 and 10) that is suitably secured in the frame of the machine and is provided with a drive shaft 140 having a roller 141 to effect a predetermined drive rate. Associated with roller 141 is a flat drive rod 142 which is of substantially rectangular cross-section and is secured to the right-hand end of carriage assembly 55. In the arrangement employed, as illustrated in FIG. 6, the drive rod 142 is spaced slightly from its associated drive roller and rests on an associated pinch roller 143 which is mounted on a substantially horizontal bar member 144 that is pivotally mounted on a pin 145.

In operation, motor M9 rotates continuously but is effective to drive the carriage assembly 55 only during the scanning stroke for the carriage when there is engagement between drive rod 142 and its respective drive roller 141. To effect engagement of drive rod 142 and drive roller 141 there is provided a solenoid SOL-4 that is mounted in the frame of the machine and has its armature 146 connected to one end of a lever 147 that is pivotally mounted near its other end on a pin 148 secured in the machine frame. At the extreme end of lever 147 adjacent pivot pin 148 there is provided an adjustable screw 150 that is set substantially in engagement with the lower face of bar 144. When the carriage is to be operated, the solenoid SOL-4 is energized, as described below, to rotate lever 147 clockwise and drive bar 144 clockwise to cause the roller 143 to force the drive rod 142 into frictional engagement with drive roller 141. By proper selection of the drive roll diameter, different driving ratios are obtained whereby, in each instance, the carriage assembly 55 is driven past the axis of the optical system at a rate directly proportional to the rotational speed of the xerographic drum in order to achieve exact synchronism between the moving card and the sensitized surface of the xerographic drum.

For driving the card carriage during the return stroke of the scanning operation, there is provided a return stroke motor M11 that is suitably secured on the frame of the machine. The motor M11 includes a drive shaft 151 having a roller 152 to effect a rate of drive higher than the scanning drive rate. Within the roller 152 there is provided a slip clutch 153 for controlling the drive connection between the roller and the drive shaft 151. The return stroke drive includes a drive rod 154 of similar cross-sectional form as the rod 142 and is arranged in the same plane and parallel thereto. During a scanning stroke, the rod 154 is spaced slightly from its associated drive roller 152 and rests upon a pinch roller 155 which is mounted on a substantially horizontal bar 156 that is pivotally mounted on a pin 157.

In operation the motor M11 rotates continuously in the opposite direction to that of the motor M9 and is effective to drive the carriage assembly 55 only during the return stroke when there is engagement between the drive rod 154 and its respective drive roller 152. To effect this engagement there is provided a solenoid SOL-5 mounted on the machine frame having its armature 158 connected to one end of a lever 160 that is pivotally mounted near its other end on a pin 161 secured to the machine frame. At the extreme end of the lever 160, adjacent the pin 161, there is provided a screw 162 adjustable for engagement with the lower face of the bar 156. In both drive systems, the screws 150 and 162 are utilized for presetting the exact time at which the respective levers 147, 160 will engage the bars 144, 156, respectively, for effecting drive of the carriage.

The slip clutch 153 illustrated in FIG. 11 may be of conventional design and comprises a flat ring 163 secured to the end of the shaft 151 and frictionally engageable with an inner surface of the roller. A relatively light spring 164 biases the wheel against the ring to produce limited friction therebetween and, consequently, a drive connection between the ring and the wheel. However, this friction may be overcome when sufficient force is placed upon the wheel 152 whereupon the force will immobilize the roller while allowing continual rotation of the drive shaft. Such a force is produced when the drive rod 154 is held against longitudinal movement while the solenoid SOL-5 is energized to force the pinch roller 155 against the rod 154. In this event, the roller 152 may be completely immobilized because of its frictional engagement with the rod or slipping may result between the roller and the drive rod.

When the carriage is to be operated to its start of scan position during the return stroke, the solenoid SOL-5 is energized, as described below, to rotate the lever 160 clockwise and drive bar 156 clockwise to cause the pinch roller 155 to force the drive rod 154 into frictional engagement with drive roller 152. When the carriage asssembly 55 reaches the start of scan position, the boss 81 engages a stop 165 secured to the frame 37 and further movement of the carriage assembly and longitudinal movement of the drive rod 154 is prevented. In order to prevent inadvertent bouncing of the carriage assembly and to insure that the carriage assembly will remain in this position while a data card is being removed from the carriage and other positioned thereon by the card feeding device, the solenoid SOL-5 remains energized for permitting the continuance of the force produced by the drive roller 152 upon the drive rod 154 by action of the slip clutch 153.

The carriage assembly 55 includes an offset projecting plate 166 fixed on the bracket 87 and having mounted thereon two horizontally arranged but oppositely extending threaded elements 167, 168 each of which is adapted to cooperate with a limit switch. As the carriage assembly 55 moves to the right from its start of scan position the element 168 will approach and eventually actuate and close a limit switch 14LS that is fixed on the rearward edge of base plate 37. The closing of switch 14LS is effective to complete a circuit to energize the carriage return solenoid SOL-5 for producing engagement of the drive roller 152 to the rod 154 and there impart movement of the carriage assembly on its return stroke and back to its start of scan position.

As carriage assembly 55 approaches its "start of scan" position, element 167 engages the actuating element on a limit switch 16LS that is fixed on frame plate 34. The actuation of switch 16LS signals the return of carriage assembly 55 to its "start of scan" position and is effective to initiate a repeat scan of the card on the card carriage or to effect the ejection of that card and the feeding of a new card, in accordance with the condition of the associated circuits.

Thus, there is provided a driving mechanism for moving carriage assembly 55 throughout the scanning cycle of operation. Throughout this cycle, the cam shaft 50 remains in the position shown in FIGS. 5 and 9 in which the followers 103, 115 and 131 of the carriage assembly actuating mechanism are opposite the low dwells of their respective cams 104, 116 and 133. Inasmuch as a slight clearance is provided between each follower and the low dwell of its respective cam, as described above, the several followers may conveniently be removed from alignment with their respective cams and then returned to proper alignment therewith during the movement of the carriage assembly, without the possibility of interference.

Figure 12:
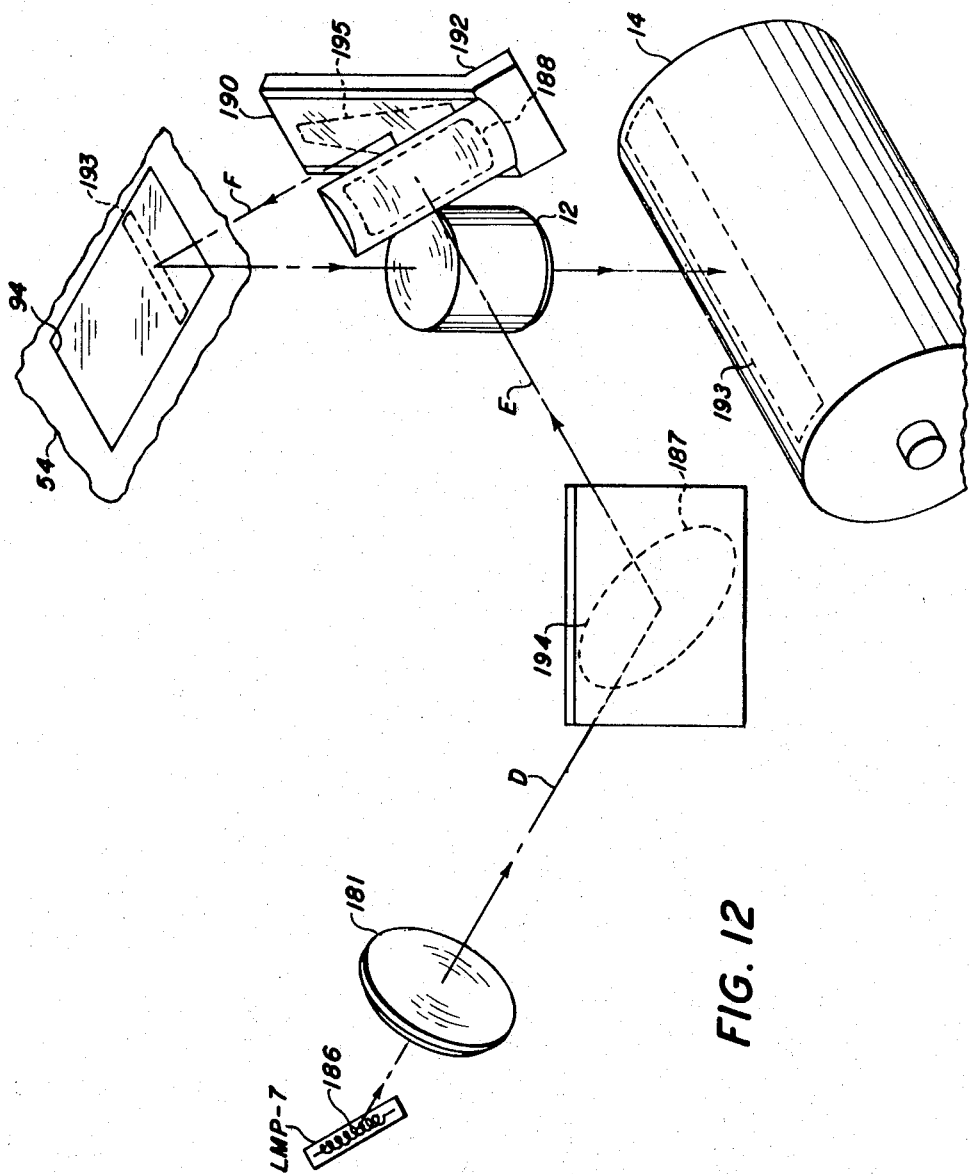
FIG. 12 is a schematized isometric view of the optical system.

*Optical system (FIGS. 6, 10 and 12)*

The projection optical system of the reproducing apparatus is used to form an image of the minified data area imprinted on a card on the carriage assembly as it moves through the scan stroke at a magnification ratio of approximately 3×, onto the sensitized surface of the xerographic drum.

The condensing optical system is used to illuminate the area to be copied and includes a lamp housing 180 which encloses a 650 watt tungsten filament lamp LMP-7; a bi-convex lens 181; and a cylindrical strip lens 188. Two mirrors are located in the system for the purpose of bending the light beam around corners. The lamp housing is supported on a suitable standard 182 secured on the rearward face of the frame member supported on the frame 37. A suitable fan 183, driven by motor M14, is provided for cooling the projection lamp LMP-7 and lamp housing 180. Lamp LMP-7 is located approximately in the focal plane of lens 181 and is rotated a fixed amount from the vertical so that the lamp filament 186 is inclined about 30° from the vertical. Because the filament is approximately in the focal plane of lens 181, the light passing through lens 181 is rendered quasi-collimated. The light beam travels along optical path D until it strikes mirror 187 which deviates the beam 90° from path D. Mirror 187 has a multi-coat surface so that the heat contained in the light beam is transmitted through the mirror while the useful shorter wavelengths are reflected along path E. After reflection from mirror 187 the still quasi-collimated beam travels to the cylindrical planoconvex strip lens 188. The cylindrical lens is perpendicular to the optical path E but rotated about 30° from the vertical so as to accept the slightly rotated quasi-collimated light beam. The action of the cylindrical lens is to cause the width of the light beam to converge and come to a sharp focus in the general region of the card platen, while leaving the length of the light beam unaltered and therefore out of focus. The purpose of this is to form an in-focus image of the filament width thereby concentrating light in the width direction, while at the same time causing the filament coil structure to be absent by smearing the filament image lengthwise. In effect, one obtains a narrow band of homogeneously distributed light in the region of the card platen. The combined action of the two lenses of the condensing system also magnify the filament by about 3× thereby causing the light band on the card platen to be about three times wider than the filament itself. Just beyond the cylindrical lens is mirror 190 which is mounted with the cylindrical lens in bracket 191 which in turn is supported on a standard 192 secured to the base plate 7.

Mirror 190 is set at the same angle as the cylindrical lens relative to the vertical but in addition is tilted 45° relative to the path E. The action of mirror 190 is to direct the converging light beam to the card platen along path F.

The data area of a card is illuminated by the filament image through the system 94 in carriage 54 and is then projected onto the selenium drum by the objective lens system 12 having an objective lens 184 mounted in an adjustable lens barrel 185. Preferably, the system employs a 4¼ inch, f/6.3 lens for projecting the data area. The various paths for the optical axis of the system are so arranged that the card feeding assembly and carriage assembly can be positioned relative thereto in accordance with the size of the data area to be reproduced, as described below. In any relative setting of the card feeding assembly and carriage assembly with reference to the filament image, it is arranged that the filament image be at the extreme right-hand edge of the data area on the card, as viewed from the front of the machine, when the carriage assembly is in its "start of scan" position.

The objective lens 12 is stationary at all times and has the stationary filament image lying on its optical axis. The cylindrical lens and mirror 190 have their optical axes in the same plane as that of lens 12. It is therefore necessary that the light beam converging from the cylindrical lens and mirror 190 be directed toward the card platen at an angle. It is this necessity, combined with the need for having the filament image traverse the width of the aperture 94 and to fall upon the data area of a card along a transverse line, that precipitates the need for introducing 30° angles (relative to the vertical) of the filament, lens 188, and mirror 190. These angles make it possible to form the filament image between the sides of the aperture 94 and normal to the direction of movement of the carriage 54. The concentration of the light in the filament image 193 may be varied by the movement of the condenser lens 181 along the path D of the optical axis. This adjustment, in effect, varies the magnification of the filament image 193 in the event that this becomes desirable.

The light from the data area on the card passes through the objective lens system 12 and then through a variable aperture slit assembly 13, whereby the light intensity may be controlled, before the light reaches the surface of the xerographic drum 14. The variable slit aperture assembly 13 includes an outer housing 196 of U-shaped cross-section that extends transversely across the machine and is secured to the underside of the plate 7. Formed in the lower wall of the housing 196 for the assembly 13, as shown in FIGS. 2 and 15, is a transverse slot 197 that extends over the entire width of the xerographic drum 14.

To vary the overall light intensity that reaches the drum surface, the assembly 13 includes a removable masking element 198 which is adapted to be retained in suitable grooves formed along the edges of the slot 311. The masking element is provided with a narrow slit through which the light rays transmitted by lens 12 must pass in order to reach the drum surface. Since the light intensity on the drum surface is proportional to the width of the slit in the masking element, it will be apparent that the light intensity may be controlled by utilizing the masking elements having a slot width suitable for the particular light intensity desired. In this manner, the overall light intensity projected on the drum surface may be varied by removing one mask and inserting another in order to provide slits of different widths. In accordance with conventional projection techniques, any particular light slit chosen is of varying width, being wider at each end than it is in the middle, to insure uniform light intensity on the drum surface.

As mentioned earlier, the objective lens 12 forms an image of the exposed data area of a card on the selenium drum at a magnification of about 3×. With a .75 inch wide masking elements located over the drum, a strip only .25 inch wide on the data card would be imaged onto the drum. It is necessary then that the .25 inch strip in the data card be fully illuminated with homogeneous light distribution. If one provides a filament image on the card plate only .25 inch wide and if the projection lamp should burn out, then the person replacing the lamp would have a critical alignment to perform. If instead the filament image on the card platen is more than .25 inch wide, then the lamp replacement need not be as critical since there is a wider spread of light than is needed. In order to obtain a filament image spread of more than .25 inch on the card platen, the card platen is located just outside of the plane where the filament image is in sharpest focus. Beyond the focal plane the light beam begins to spread and therefore produces a broader band of light than would be found in the plane of best focus.

*Operation of the card handling mechanism*

The function of the card handling mechanism is to position each individual data card in the optical path, pass it at the proper speed past the objective lens, return it for the number of repeat copies, if required, and, finally, to reject the card and position the succeeding card. During a scanning cycle, each card lies in a horizontal plane upon the glass plate 95 and the condenser optics projects a scanning light line upwardly from the mirror 190, onto the data area of the card.

In the description to follow, it is assumed that the manual switches will be set to turn the machine "On" and, that the rotary selector switch has been turned to some number greater than "1" in order to produce multiple copies. The operation of the xerographic portion of the system will be considered only when it is necessary to an understanding of the card handling mechanism. For simplicity of the description it is assumed that the machine is already in operation with a card on the carriage being scanned. Operation during the starting period is described below.

For card operation, the following components operate continuously: the projection lamp LMP-7, the lamp cooling blower M14, the card feed roll drive motor M12, the scan drive motor M9, the return drive motor M11, and the cam shaft drive motor M10. Referring to the wiring diagrams of FIGS. 50, 51 and 52 during the scanning operation, the scan drive solenoid SOL-4 is energized and the carriage is driven at constant speed by the scan drive roller 141.

At the end of the scan the element 167 on the carriage assembly 55 operates the end of scan switch 14LS which opens normally closed switch contact 14LSB and closes normally open switch contact 14LSA. When 14LSB opens at the end of scan, power from a wire W3 is opened to the coil of relay 11CR for de-energizing the same. The wire W3 is energized at all times during the operation of the head, and serves as power source for the relays and solenoids in the control section. With the relay 11CR de-energized, one of its contacts, 11CR-3B, opens to de-energize the scan solenoid SOL-4 and the attendant scan mechanism and, the other contact, 11CR-3A, closes energizing the return mechanism through the return solenoid SOL-5. As shown in the wiring diagrams both the solenoids SOL-4 and SOL-5 derive power, when energized, from a full wave selenium rectifier SR-2 which is connected between the wire W3 and main power line W1.

Energization of the return solenoid SOL-5 causes the upward movement of the armature 158 which rotates the return push rod 160 for pushing the return drive rod 154 against the return drive roller 152. This action will drive the carriage assembly 55 toward its start of scan position, or to the left as viewed in FIG. 10. In leaving the end of scan position, the carriage assembly 55 will release the switch 14LS to cause closing of the switch contact 14LSB. However, since the relay contact 11CR-1 was opened during the de-energization of the relay 11CR, the power circuit to this relay remains open in order to maintain energization of the return solenoid SOL-5.

It is assumed that the selector switch and counter is set to produce more than one copy, and in the case being considered the counter has not reached a total count. As shown, the selector switch SW-4B has been arbitrarily shown at position number "4" to set the circuit in condition for the machine to make 4 enlarged reproductions or copies of the data area of a card now to be placed in the carriage 104. When power has been conducted to the wire W3, by a circuit to be described in another section, the lamp corresponding to the number of copies selected (LMP-8 through LMP-23) is energized through a 33 kilohm series resistor (R-8 through R-24), contact SW-4A and one of the coils of a latching type relay 10CR. In the example chosen, the lamp LMP-12 and the resistor R-12 utilized. The resistor limits the current to a value well below that required to energize 10CR (latch). The relay 10CR, being a latching type, includes two coils. Upon energization of one coil, the relay contacts will switch and remain in this condition even upon removal of power, until the other coil is energized. For purposes of illustration, 10CR (latch) denotes one of the coils and 10CR (release) denotes the other coil for relay 10CR. When the end of scan limit switch 14LS was actuated by the carriage assembly in order to open contact 14LSB, it also closed its other contact 14LSA to provide power momentarily to the coil 10CR (latch) which resulted in the closing of contact 10CR-2A and the opening of the contact 10CR-2B. This power connection is made from wire W3, contact 14LS-A, wire W4, contact arm 200 of switch SW-4B, coil 10CR (latch) and wire W1. Since the limit switch 14LS is momentarily actuated as the carriage assembly leaves its end of scan position, the contact 14LS-A correspondingly is momentarily actuated. However, the coil 10CR (latch) will maintain the contact 10CR-2A closed and the contact 10CR-2B open even after the power connection is broken.

In moving to the start of scan position, the carriage assembly actuates the carriage home switch 16LS which connects the carriage home relay 12CR for electrical power between wires W1 and W3. The ensuing energization of the relay 12CR closes its normally open contact 12CR-2 to complete the circuit through the normally closed contact 14CR-2B and the previously closed contact 10CR-2A to the card feed solenoid SOL-3 and the stepper reset coil 3TR. During energization of the home relay 12CR, the carriage return solenoid SOL-5 remains energized through the normally closed contact 11CR-3B in order to continuously apply force against the carriage 54 when it strikes the stop 165 at the start of scan position to minimize the tendency of the carriage to bounce away from the stop due to the impact.

The energized card feed solenoid SOL-3 operates and releases the trip lever of the single revolution clutch 138, and the cam shaft 50 begins a revolution for effecting a card change.

With the carriage assembly 55 against the stop 165 under continued force produced by the return motor M11, the carriage 54 is in proper location with respect to the card feeding mechanism so that a card may be fed to the carriage. In addition, the cam followers 103, 115, and 131 are in position for cooperative action by their respective cams 104, 116, 134 being moved there along with the carriage assembly. As the cam shaft 50 rotates, the line-up plate 107 is pivoted away from the carriage 54 by action of the cam 116 on the follower 115; the pressure pad 96 is raised from the carriage by action of the cam 103 on the follower 104 to release pressure and permit card movement; and the ejector pins 120 move forward to push the card on the carriage into the mating lower feed roller 53 and idler 62, where it is ejected into the card receiver 10. Simultaneously, the picker knife 45 is actuated by the rotative action of the crank arm 49 upon the rod 48 and the lever 46 to push the bottom card of the stack in the card magazine 8 into contact with the upper feed roller 52 and the card is carried through the feed rollers and deposited upon the carriage with the data area side of the card face down against the glass insert 95. The ejector pins 120 are retracted before the card arrives on the carriage so there is no interference. The line-up plate 107 swings back into position in order to position the card against the back edge of the carriage. Slide positioning is accomplished by the card guides 92, 93 and the pressure pad 96 is actuated downwardly to clamp the data card to the glass insert thereby insuring flatness of the card during the ensuing scan stroke.

As the card passes through the upper card feed roller 53, it momentarily actuates the card detector switch 12LS, closing the contact thereof. Assuming that a card is fed at the proper time, operation will continue. If a card fails to feed either due to mechanical difficulties or lack of cards, the card detector switch 12LS will not operate and power will be cut off to the card feed relay 10CR (release). As the switch 12LS is momentarily actuated, the card feed relay 10CR (release) and a card counter C-1 are momentarily energized. Energizing the counter C-1 advances the card count one, while energizing the release coil of 10CR closes the contact 10CR-2B and opens the contact 10CR-2A to de-energize the solenoid SOL-3 to permit the trip lever of the clutch 138 to return to its normal position. Closing of the contact 10CR-2B places the head in condition for the scan stroke.

With a new card positioned on the carriage, as described in the foregoing, the scanning stroke is commensed by the actuation of the scan start switch 15LS which is actuated by the cam arrangement associated with the programmer for the xerographic processing system to be described in a later section. With the switch 15LS closed, power is connected to the scan relay 11CR through a circuit consisting of the wire W1, relay 11CR through closed contacts 15LS, 10CR-2B, 12CR-2, 14CR-2B, and wire W3. With the relay 11CR energized, the contact 11CR-1 is closed thus maintaining energization of 11CR through the locking or holding circuit of contacts 11CR-1 and 14CR-2B. The contact 11CR-2 is also closed for energizing relay 13CR which becomes locked in by the subsequent closing of contact 13CR-1A and remains energized during the first scanning cycle and throughout the remaining cycles of operation.

The energization of the relay 11CR also opens the contact 11CR-3B for disengaging the return solenoid SOL-5 and terminating the drive upon the return drive rod 154. Simultaneously, the contact 11CR-3A is closed for energizing the scan solenoid SOL-4 which presses the scan drive bar 142 against the drive roller 141 and the commencement of the scanning stroke.

As the carriage assembly leaves the home or start of scan position, the actuating element 167 is moved away from the carriage home switch 16LS thereby opening the contact for the same. With the contact open, the relay 12CR is de-energized causing opening of the contact 12CR-2 which prevents further operation of the card change mechanism until the carriage again returns to the home position. During the scanning stroke, various xerographic processing actions, properly programmed, are set in motion and carried on even after the carriage assembly has reached the end of scan position. Description of these operations and the cooperative effects relative to the scanning stroke are included in another section.

When the carriage has completed the scan of the new card therein and arrives at its end of scan position, the limit switch 14LS is again actuated by the actuating element 168 on the carriage assembly. This actuation causes the contact 14LS-B to open to de-energize the scan solenoid SOL-4 and the attendant scan mechanism and, the contact 11CR-3A closer to energize the return solenoid SOL-5, as previously stated. Upon the return stroke of the carriage, as it reaches the home position, the limit switch 16LS is again actuated to a closed condition for energizing the home relay 12CR. This produces closing of the contact 12CR-2 and the carriage will dwell in the home position until the scan start switch 15LS closes. During this action, the relay 10CR is still released with the contact 10CR-2A remaining open and the contact 10CR-2B closed. The machine then cycles through the scan cycle and the return cycle until the required number of copies are obtained.

During the last required scan cycle for the card already in the carriage and for which four enlarged copies were to be produced, the end of scan limit switch 14LS is actuated as in all previous cycles. Actuation of this switch closes contact 14LS-A and energizes the relay 10CR (latch) through the switches 3TR (SW) and SW-4. A card change will then take place when the carriage assembly reaches home as 10CR is latched to close 10CR-2A and the opening of 10CR-2B. The machine will then cycle again to produce four enlarged copies of the new card.

For one copy reproduction, that is, one enlarged copy each card, a slightly different cycle results. For this purpose, the SW-4 is actuated so that copy selector switch reads "1" in order to place the contact arm 200 in engagement with wire W5 in switch SW-4B and wire W6 in switch SW-4A. In this condition of the switches, the count stepper 3TR is never energized since the contact SW-4A breaks the only circuit to the stepper. At the end of each scan relay 10CR (latch) is energized through the contacts 14LS-A and SW-4B, resulting in a card change each time the carriage returns home.

For multiple copies with the card selector switch SW-4 in the "M" position, the card change mechanism will be inoperative and the head will continuously produce enlarged xerographic copies of the card already in the carriage. In this operation, the count stepper 3TR is again disconnected by the contact SW-4A and contact SW-4B similarly isolates the relay 10CR (latch) so that it can not be energized. Thus no card change is possible with the machine in the "M" position.

*Development system*

In order to effect development of the electrostatic latent image on the cylindrical zerographic plate, the developing system shown includes a developer apparatus 16 which coacts with the cylindrical xerographic drum 14 to form a development zone A wherein the charged and exposed surface of the drum is developed to form a powder image of the copy.

For this purpose the developer housing 16 is mounted adjacent to the xerographic drum to form a development zone. Mounted within the developer housing is a driven bucket-type conveyor used to carry the developer material previously supplied to the developer housing to the upper portion of the developer housing from where the developer material is cascaded over the hopper chute onto the drum. As the developer material cascades over the drum, toner particles of the developer material adhere electrostatically to the previously formed electrostatic latent image areas on the drum, the remaining developer material falling off the peripheral surface of the drum to the deflected by baffle plates into the bottom of the developer housing. Toner particles consumed during the developing operation to form the visible powder images is replenished by a toner dispenser mounted within the developer housing.

Specifically, the developer assembly (see FIG. 2) includes the box-like developer housing having a top wall 201, angular bottom wall 202, front wall 203, and a rear wall 204, forming in the lower portion thereof a reservoir for developing material. As shown in FIG. 2 the front wall 203 is formed with a concave edge portion in conformity with the shape of the xerographic drum to permit the developer housing to be positioned closely adjacent to the xerographic drum. Secured to the inside faces of the developer housing are suitable baffle plates, not shown, which prevent excessive dust and air currents from circulating within the developer housing adjacent to the cylindrical xerographic plate.

A suitable bucket-type conveyor is used to convey developer material from the reservoir portion of the developer housing to the upper portion of the developer housing from where it is cascaded over the xerographic drum. As shown, the bucket-type conveyor consists of a series of parallel spaced buckets 205 secured as by a suitable pair of conveyor belts 206 wrapped around a conveyor drive pulley 207 and a conveyor idler pulley 208 secured as by a drive fit on drive and idler shafts 209 and 210, respectively, to rotate therewith.

The drive shaft 209, may be journaled in suitable bearings and held in place against axial movement thereby while a driven gear 212 is secured to the shaft for rotating the drive pulley 207. The driven gear 212 meshes with a drive gear 213 secured to a shaft SH2 which is journaled in the rear frame plates 5 and a plate 215 arranged in a plane parallel to the rear plate 5 and together with the latter support the various drive structure for the apparatus (see FIG. 22).

To deflect the developing material and to spread this material across the face of the drum as the developing material is emptied out of the conveyor buckets by gravity, a flanged hopper chute 216 is secured as by welding to the side walls of the developer housing. As the xerographic drum rotates, developing material previously tumbled over the flanged hopper chute onto said drum from the buckets will cascade over said drum and will eventually fall off or be thrown off of the surface of the xerographic drum. To catch the developing material that falls from the xerographic drum so that it may be returned to the reservoir in the developer housing, a pick-off bar 217 is secured to the bottom wall 202 of the developer housing. The leading edge of the pick-off bar 217 is positioned closely adjacent to the peripheral surface of the xerographic drum but out of contact therewith whereby to catch the developing material as it falls off said drum. Any developing material not caught and returned to the reservoir of the developer housing by the pick-off bar is caught by a pan held in place by any suitable means secured to the bottom wall 202 of the developer housing. As a supply of developing material accumulates in this pan it must be manually removed by an operator and returned to the developer housing.

*Automatic toner dispensing control*

As the developing mixture is cascaded over the xerographic drum, toner particles are pulled away from the carrier and deposited on the drum to form powder images, while the partially denuded carrier particles pass off the drum into the reservoir. As toner powder images are formed, additional toner particles must be supplied to the developing mixture in proportion to the amount of toner deposited on the drum. To supply additional toner particles to the developing mixture, the toner dispenser 17 is used to accurately meter toner to the developer mixture. Although any one of a number of well-known powder or granulated material dispensers may be used, the toner dispenser shown is of the type disclosed in Patents Nos. 3,062,109, issued Nov. 6, 1962, to Mayo et al.

Referring now to FIGS. 13 and 14 the toner dispenser 17 consists of a hopper or container 220 for the toner particles to be dispensed. Although the hopper or container 220 may made in any size or shape, the hopper shown is formed as a rectangular open-ended box having vertical side walls 221 and end walls 222, the upper ends of the walls being bent outward to form horizontal flanges by means of which the hopper may be attached to the underside of top wall 201 of the developer housing as by welding, with the opening in top wall 201 of the developer housing in alignment with the opening in the hopper. At opposite ends of the hopper are positioned depending bearing blocks 223 and 224 for supporting the remaining elements of the toner dispenser, the bearing blocks being attached to end walls 222 by screws 225.

The bottom of the hopper is partially closed by a dispensing plate 226 positioned in spaced vertical relation below the lower edges of the walls of the hopper. The dispensing plate 226 which is as wide as the hopper, is secured to the underside stepped portions of bearing blocks 223 and 224 by screws 227. The dispensing plate 226 combines with the walls of the hopper 220 to provide a reservoir having narrow elongated outlet slits or passages 228 for the flow of toner particles.

To effect substantially uniform flow of toner particles through the outlets or passages 228 there is provided a metering element, generally designated 230, having a dispensing grid 231 positioned for reciprocating motion in the space between the dispensing plate 226 and the lower edges of the walls of the hopper 220. The metering element 230, as shown, has the dispensing grid 231 formed by a top wall having a series of transverse perforations or slots formed therein, and depending side walls 232, the ends of which are bent inward at right angles to form flanges 233 to which support plates 234 are secured as by spot welding. For ease and economy in manufacturing the metering element is formed as a sheet metal stamping, the slots being formed relatively closed to each other and to the tranverse edges of the top wall so that after the slots are formed there remains only narrow strips of metal simulating wires 235, the width of the metal remaining between slots being only sufficiently wide to prevent them from being bent out of shape in the stamping process.

The metering element 230 is supported by parallel guide rods 236 extending through holes formed in support plates 234, the ends of the guide rods being journaled for reciprocating motion in apertures 237 formed in bearing blocks 223 and 224. As seen in FIG. 13, the movement of the guide rods 236 to the left is limited by collars 238 adjustably secured thereto by suitable screws, while movement of the metering element 230 with respect to the guide rods 236 is prevented by a second set of collars 240 secured by set screws to the guide rods inboard of the support plates 234.

For effecting movement of the metering element, a plunger rod 241 is journaled for reciprocating movement in a bearing block 242 secured to a side wall of the developer housing, the plunger extending at one end through a suitable aperture in the side wall to be actuated by a suitable power source, and at its opposite end the plunger rod extends through a suitable aperture in bearing block 223 into contact with the left-hand support plate 234. To limit the movement of plunger rod 241, retaining rings 243 are secured in suitable grooves at each end of the plunger rod. The return stroke of the metering element is effected by coiled springs 244 encircling the guide rods 236 and butting at opposite ends against the bearing block 224 and the right-hand support plate 234 to bias the metering element to the left.

As shown, the dispensing grid is positioned between the dispensing plate 226 and the lower edge of the walls of the hopper 220 in spaced relation to each other to permit free reciprocating movement of the grid. The space or clearance between each of the last-named elements may be varied during fabrication to accommodate the particle size of toner to be dispensed.

In the operation of the toner dispenser a supply of toner particles is placed within the hopper, the hopper grid and the dispensing plate forming a reservoir for the toner particles. Upon reciprocation of the grid by the plunger rod 241, a metered quantity of toner particles will be permitted to cascade through the open grid work of the grid from where they will fall to the reservoir portion of the conveyor housing 16.

Since the toner dispenser 16 dispenses a uniform quantity of toner for a given strokelength of the metering element 230 it is apparent that the quantity of toner delivered by the toner dispenser may be varied by either varying the length of stroke or by varying the number of strokes per unit of time. Thus, the dispensing rate may be varied by changing the length of stroke of the metering element 230, which, for example, may be accomplished in its simplest form by adjustment of the righthand collars 240 on the grid rods 236.

Figure 22:
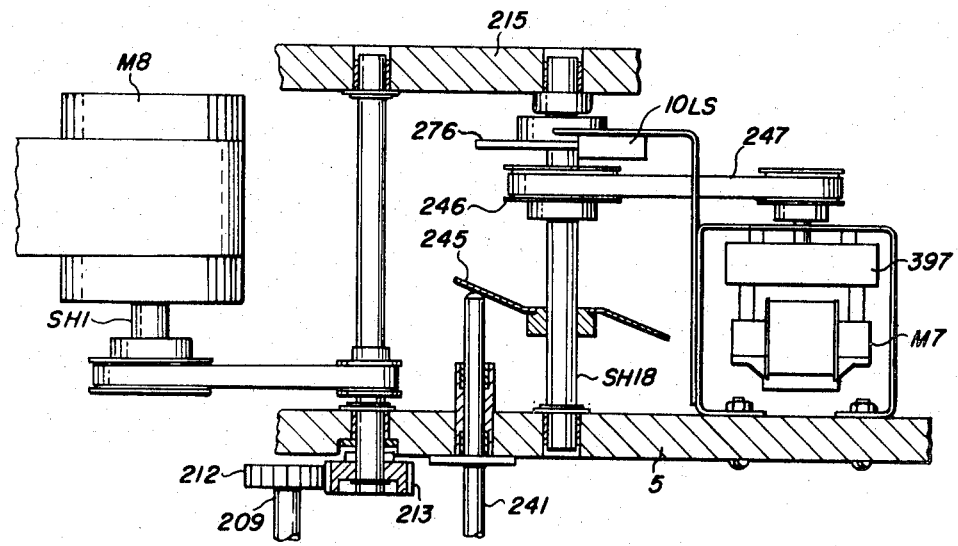
FIGS. 22, 23 and 24 are top views of the drive system for the xerographic processing device in the machine and may be joined together in end-to-end relationship to illustrate the complete interrelated drive system.

Reciprocation of the plunger rod 241 is effected by means of wobble plate 245 secured to the end of a shaft SH18 journaled in bearings mounted on frame plates 5 and 215 (see FIG. 22). The shaft is driven by a pulley 246 connected by a belt 247 to the shaft of a motor M7. The contour of the wobble plate 245 is such that one complete revolution of the shaft SH18 will actuate the rod 241 axially to reciprocate the dispensing grid once from one extreme position to the other.

In order to control the dispensing of toner from the toner dispenser 17 there is shown in FIGS. 15-21 the details of an automatic toner control system which ultimately imparts rotation to the wobble plate 245 in single revolution step by step operation in accordance with the density of the developed image on the drum 14. Basically, the automatic toner dispensing system comprises an exposure device which exposes a stripe along the edge of the drum after it is charged; a sensing device for generatiing a signal in accordance with the relative density of the developed stripe and; an electrical circuit for utilizing the signal for imparting rotation to the wobble plate of the toner dispenser.

As shown in FIG. 2, a stripe exposure of marking device 250 is mounted on the machine at a point between the charging device 15 and the developing mechanism 16. Between the transfer station 21 and the pre-cleaning device 27, there is mounted a sensing head 251 which is adapted to project light onto the developed stripe and to sense the density of the toner comprising the stripe in accordance with the light reflected from the stripe.

The stripe marking device 250 comprises a tubular member 252 secured above the drum to the interior of the housing 196, and is positioned with its axis projecting downwardly toward the drum 14. At the lower end, the tubular member is formed with an open end 253 which is closely spaced from the peripheral surface of the drum and slightly contoured to conform to the shape of the drum. Across the lower end 253 there is secured a narrow opaque strip of material 254 which covers approximately one-third of the otherwise open end 253 and is centrally located relative to this end for separating two open sectors 255 between the strip and the wall of the member 252. The sectors 255 are, in effect, windows for permitting exposure of the drum therethrough by means of a small lamp LMP-25 mounted within the member 250. The windows 375 are generally of equal area and, when the lamp is energized, allow the light rays therefrom to impinge the drum surface to expose that portion of the drum immediately below the windows. The strip 254 and windows 255 in effect, function as a mask which results in the formation of a stripe 256 of unexposed drum surface between two exposed areas 257, being produced when the lamp LMP-25 is energized.

For efficient operation of the automatic toner dispenser, the stripe marking device is located at one of the extreme ends of the drum 14 remote from the adjacent edge for the copy image area that evolves from use of the drum in the xerographic machine. With this arrangement there is no interference between the exposure elements and the development of the resultant stripe pattern with the exposure elements for the xerographic processing. The exposure slit formed in the masking element 198 will not interfere with the operation of the marker device 250 and, conversely, the marking device will not interfere with the normal operation of the element 198. The only common operative inter-action between these two exposure devices is the use of the developer mechanism 16 for developing the respective images.

For a more accurate control of the toner dispenser and the surveilance of the resulting toner density, it is preferred that the stripe 256 produced on the drum have a length approximately one-fourth the circumference of the drum. It is also preferred that there be produced a series of three stripes for each revolution of the drum 14. In order to accomplish this there is provided a programming device, to be described hereinafter, which periodically energizes the lamp LMP-25 for accomplishing the preferred arrangement of stripes.

After the stripes 256 have been developed in the developer mechanism to form toner powder images of the stripes, the stripes are transported by normal rotation of the drum 14, past the sensing device 251. In traveling to this point, the toner powder images of the stripes being formed adjacent one end of the drum 14, will be clear of the transfer station 21 and will not be transferred to a support material as is the case for the developed images of the data area of a card.

The sensing device 251 is mounted on a channel member 257 secured to the lower wall of the brush drum cleaning device 28 and includes a support block 258 having a wall surface 260 disposed in a plane at a slight angle relative to the adjacent surface of the drum. One end of a light transmitting fiber bundle 261 is mounted on the block 258 with the end face 262 of the bundle flush with the plane of the wall surface 260. The other end of the fiber bundle projects out of the member 257 and terminates in the end wall 263 of a cylindrical light shield 264 secured to the rear wall of the channel member 257. A lamp LMP-3, also secured to the rear wall of the member 257, extends into the shield 264 and, when energized, is adapted to present light rays upon the adjacent end face of the fiber bundle 261. The light rays, transmitted by the bundle 261, emerge from the end face 262 and, are directed to the stripe image on the drum surface at an angle relative thereto. In order to eliminate the possibility of spurious light reaching the drum surface and effecting the toner powder image of the stripes, the fiber bundle 261 is covered with a suitable opaque sheath. One purpose for the fiber bundle is to avoid the effects of heat from a light source, such as the lamp LMP-3 that would otherwise be mounted in close proximity to the drum, which, if made of selenium would gradually crystallize in those areas constantly heated by the lamp. Another purpose is to avoid the possibility that the developing material may adhere to a closely positioned hot lamp and thereby interfere with proper illumination.

The support block 258 is also formed with two side-by-side apertures 265, 266 immediately below the end face 262 of the fiber bundle and positioned such that one aperture is on one side of the vertical center line for the end face. Mounted with the apertures are photoelectric devices or photocells P-2, P-3, respectively, which are adapted to scan the light rays reflected from the drum surface and directed thereon by the light rays emanating from the end face 262. The relative positioning of the photocells are such that the cell P-2 will receive the light rays or rather, the shadow of the developed stripe 256, illustrated in FIG. 20 by the dotted shadow 267. The cell P-3 is positioned to receive the light rays by reflection from one of the tonerless clear areas 257 and, consequently, will receive more reflected light rays than the cell P-2. In effect, the cell P-3 will serve as a standard since the light it receives will remain constant through continuous use of the xerographic drum 14, while the light reaching the cell P-2 will vary in accordance with the density or amount of toner particles adhering to the drum along the stripe 256.

Figure 50:
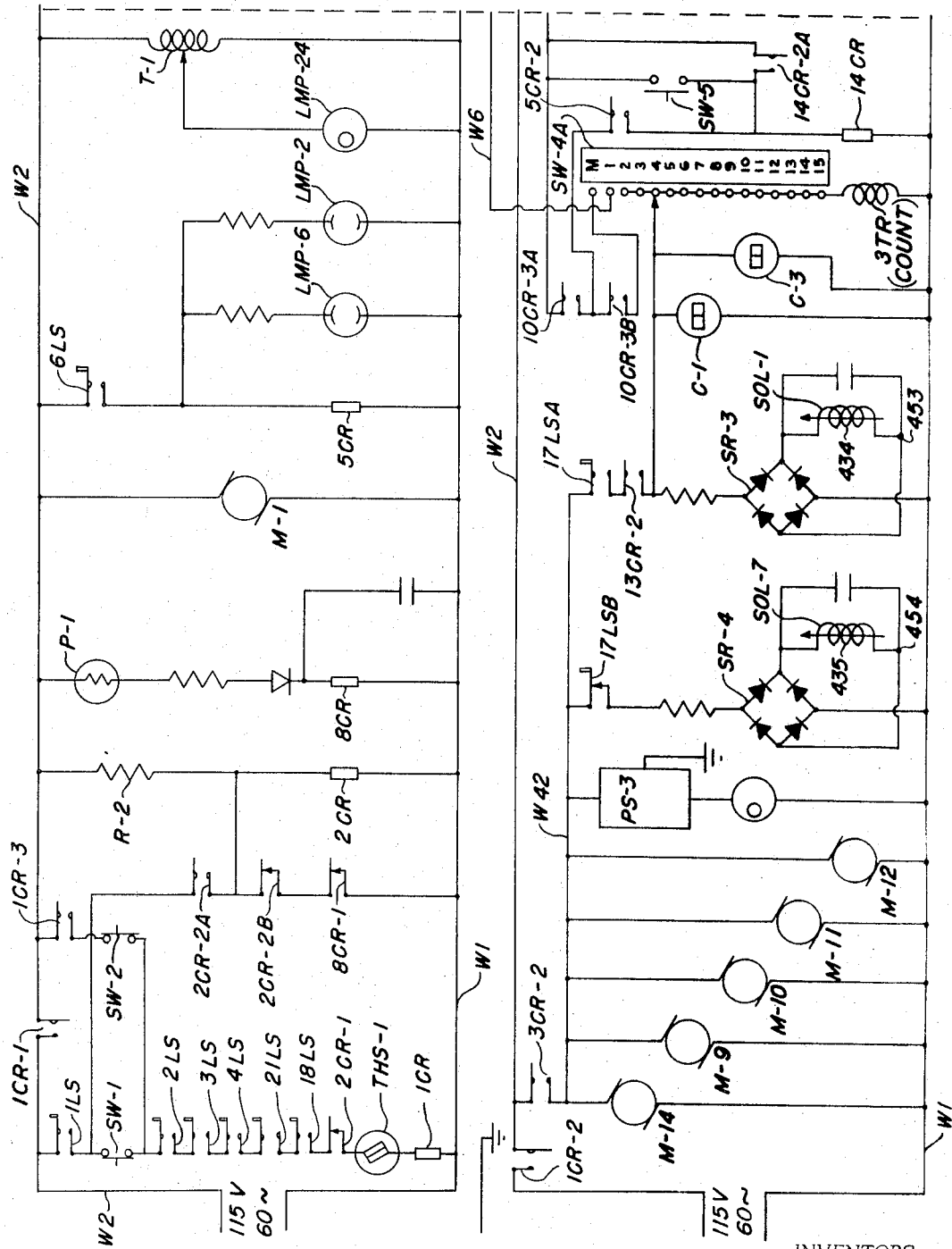
FIGS. 50, 51 and 52 are schematic electrical wiring diagrams of the xerographic apparatus and, when combined in end-to-end relationship, illustrate the complete wiring system.

Electrically, the photocells P-2, P-3 form two legs of a bridge circuit which is illustrated in FIG. 21 and schematically shown in FIG. 50. The other two legs of the bridge circuit comprise two fixed resistors 268, 269 and portions of a variable resistor R-25 having its wiper arm 271 connected to the negative terminal of a D.C. source 272. To complete the bridge circuit, the junction between the photocells is connected to the positive terminal of the D.C. source. The power supply for the bridge circuit is derived from a D.C. source 273 and potentiometer 274 which has its wiper arm connected between the resistor 268 and the photocell P-2. The bridge unbalance output is fed to a Schmitt trigger 275 which, when energized, produces a short duration pulse to de-energize a normally energized relay TCR. As shown in FIGS. 21a and 50, de-energization of the relay will permit actuation of a normally closed contact TCR-1 to its closed position to complete the circuit momentarily to a relay coil 9CR. This causes closing of the relay contact 9CR-1 for closing the circuit to the motor M7 and energization thereof. Mounted on the shaft SH18 for rotation with the wobble plate 245 is a circular cam 276 adapted to actuate a normally closed limit switch 10LS to an open position once each revolution of the cam and wobble plate. Closing of the contact 9CR-1 also completes the circuit to the relay 9CR for holding the contact closed until the wobble plate makes one complete revolution. Upon this occurrence, the switch 10LS is opened momentarily to de-energize the relay 9CR and to open the power circuit to the motor M7. Since a short duration pulse closed the contact TCR-1 for initiating the motor M7 operation, this contact will be opened before the switch 10LS is opened.

During normal operation of the automatic toner dispensing apparatus, the sensing head lamp LMP-3 is continuously energized for presenting light upon the stripe 256 and adjacent clear areas 257. This light is fairly evenly distributed upon these areas of the drum and the light reflected from the stripe and clear areas are sensed by the photocells P-2, P-3 and compared by the bridge circuit. The resistor R-25 is adjusted so that there is a bridge balance with zero output between the results of the light impinging upon the cell P-2 from the stripe 256 and the results of the light impinging upon the cell P-3 from one of the clear areas 257. This balance will be determined by the desired density of the toner that adheres to the stripe 256. With a balanced condition of the bridge the Schmitt trigger will have zero output for the relay TCR. As the toner supply in the developer housing 16 depletes during normal xerographic processing, the density of the toner on the continuously sensed stripe 256 will lessen. With a density lower than the predetermined level which was used to balance the bridge circuit, the bridge will swing out of balance and when differential current in the trunks of the bridge is sufficiently high, the Schmitt trigger, which, in effect is a level detector, will produce an electrical pulse causing a momentary de-energization of the relay TCR and closing of the relay contact TCR–1. For each electrical pulse produced in this manner, the wobble plate 245 will rotate one complete revolution by means of the drive belt 247 and pulley 246. As previously stated, one revolution of the plate 245 will actuate the dispensing grid 241 between its extreme position for dispensing toner into the developer housing.

As the density of the toner on the stripe 256 increases, the balance of the bridge circuit will become restored thereby terminating further actuation of the toner dispenser. The sensitivity of the sensing head can be varied by the parameters chosen for the resistors 268, 269 and R–25 and the strength of the D.C. sources 272, 273. These components will determine the output level of the bridge circuit and may be varied so that a high unbalance must be present before a level can be detected by the Schmitt trigger. This condition would evolve that it is desirable to have a relatively wide density range for xerographic reproductions. If high quality contrast is needed in the reproductions, then a very sensitive bridge balance is necessary whereby the slightest unbalance will demand toner dispensing and replenishment.

The toner dispenser 17 functions to sift toner material onto the developing material already present in the developer housing. In order to ensure uniform distribution of new toner to bring the toner density back to the desired level in a minimum of time the outer dispenser extends horizontally substantially across the upwardly moving buckets 205 which are in motion to cascade toner over the drum surface throughout its entire width.

Some of the newly dispensed toner are caused to deposit on a baffle plate 277. To cause these particles to be mixed with the remaining developing material and thereby ensure adequate mixing of at least a portion of the new toner, narrow slots may be formed in the plate whereby a portion of the material sliding down this plate is caused to pass through the slots and over the surface of the developing material supply at the bottom of the housing.

*Paper feed system*

The sheet feeding mechanism 18, positioned in the image transfer station B, for seriatim feeding of cut-sheet transfer material into contact with the xerographic drum so that the developed powder images on the surface of said drum may be transferred to the transfer material, consists of a tray for holding a supply of cut-sheet transfer material, separator rollers and devices for separating a single sheet of transfer material from said supply, feed rollers for feeding a single sheet into impression contact with the drum and means for coordinating the operation of the separator rollers and feed rollers to thereby feed a single sheet of transfer material into contact with the drum for proper registration of the powder image on the drum onto the transfer material. A paper tray level control device is also provided for raising the tray as sheets of paper are fed from the top of the paper supply.

Referring now specifically to FIGS. 2 and 27 to 35, inclusive, the apparatus for feeding sheets of transfer material to the xerographic drum 14 in timed relation to the appearance of a developed image thereon includes a pair of register feed rollers 280 and 281, usually made of rubber or similar material, mounted in cooperative relation to each other in front of guides 282 and 283 which direct sheets of transfer material forwarded by said feed rollers into contact with the drum 14 at a point at or slightly in advance of the corona transfer device 21.

The feed roller 280, which is a driven roller, is mounted in position by a shaft SH6 journaled in the machine support plates 4 and 5 and is driven by a pulley 284 (see FIG. 23) secured to the end of shaft SH6. The feed roller 281, which is an idler roller, is mounted on a shaft SH19 journaled at its ends in arms 285 pivotally mounted on frame plates 4 and 5, the feed roller 281 being yieldingly biased against the feed roller 280 by means of springs 286 so that feed roller 281 may be driven by frictional engagement with roller 280 or with a sheet of transfer material interposed between said rollers.

A supply of cut-sheet transfer material 287, that is, typically sheets of paper or the like, to be fed one at a time to the feed rollers 280 and 281 is held in the paper tray 20 slidably positionable from the side of the machine between frame plates 4 and 5. The paper tray 20 includes a base comprising three sections: a stationary base member 288, a left-hand angle member 290 and a right-hand angle member 291. The angle members 290, 291 are each formed with upright sheet guide portions 292, 293 and lateral portions 294, 295, respectively, and are positioned with their guide portions parallel to the sides of the base member 288 and with their lateral portions extending in the same plane as the center section 296 of the base member 288.

The members 290 and 291 are actuable toward and away from each other and the center section 296 by a linkage system mounted below the section 296. As shown in FIG. 31, the base member 288 is formed with the center section 296 coplanar with the left and right lateral sections 294, 295 and with a left side bent down portion 297 and a right side bent down portion 298. The portions 297, 298 are coplanar and are located immediately below the sections 294, 295, respectively, and upon which these sections may slide toward and away from the center section 296. The base member is formed with additional bent down portions 300, 301 beyond the extremities of the portions 297, 298, respectively, and these portions are coplanar in a plane slightly below the plane of portions 297, 298.

Immediately below the center section 296 and toward the rear of the tray 20 is a disk 302 rotatably mounted as by a pivot pin 303. Similarly, a second disc 304 is rotatably mounted as by a pivot pin 305 under the forward end of the tray. The discs 302, 304, are arranged so that their centers are coincident with the longitudinal center line of the tray. A connecting link member 306 disposed between the center section 296 and the discs 302 and 304 is pivotally connected at one end to the disk 302 and at its other end to the disc 304 and, in such a manner as to be longitudinally parallel to the longitudinal axis of the tray 20. With this arrangement, rotation of the disc 302 will produce corresponding rotation of the disc 304.

Pivotally mounted at one end to and below the disc 302 as by a pivot pin 307 is a link member 308 which is pivotally connected at its other end by a pivot pin 310 to the lateral portion 294 of the left-hand angle member 290. The pivot pin 310 extends through a slot 311 formed in the bent portion 300 of the base member 288 in order to connect the portion 294 with the end of the link 308. Diametrically opposed to the pivot pin 307 is a pivot pin 312 to which is pivotally connected a second link member 313 which has its other end pivotally connected to the lateral portion 295 as by a pivot pin 314. The pivot pin 314 extends through a slot 315 formed in the bent portion 301 in order to make connection with the link 313 which, as is the case for the link 308, is located below the disk 302. As viewed in FIG. 27, counterclockwise rotation of the disc 302 will move the pivot pins 310, 314 closer together along a line that generally includes the pivot pin 303. Conversely, clockwise rotation of the disc 302 will move the pins 310, 314 further apart, in each case the pins 310, 314 sliding within and being guided by the slots 311, 315, respectively.

At the forward end of the tray 20, or that end from which each sheet of transfer material 287 is withdrawn during paper feed operation, the disc 304 is provided with an identical linkage arrangement. Link members 316, 317 are pivotally connected at one end by pins 318, 319, respectively, at diametrically opposed points on the disc 304 and at their other ends by pivot pins 321, 322 to the bent portions 300, 301, respectively. Slots 323, 324, formed in the bent portions 300, 301, accommodate the respective pins in order to permit limited sliding movement of the pins relative to the respective bent portions.

In order to actuate the linkage thus far described, the rear disc 302 is provided with a manually actuatable handle 325 which may be secured as by welding to the disc. Movement of the handle 325 in a counterclockwise direction, as seen in FIG. 27 will similarly rotate the disc 302 about the pivot 303. This action will move the pins 310, 314 toward each other. Rotation of the disc 302 will also produce corresponding rotation of the disc 304 by means of the connecting link 306 and this action will move the pins 321, 322 closer together. Movement of the pins 310, 321 will be in unison and equal to the movement of the pins 314, 322. The resultant action will draw the left and right upright guide portions 292, 293 closer together, in parallel and equal motion resulting in centering sheets of paper relative to their path of movement regardless of paper width.

During operation of the xerographic apparatus, a stack of transfer material sheets is placed in the tray 20 and the handle 325 manipulated to bring the guides 292, 293 into contact with the adjacent edges of the sheets. This will insure that the stack is centrally located within the tray and in proper alignment with the paper feed rollers. In order to remove the stack, or to replace sheets, the handle 325 is rotated in a clockwise direction which results in the guides 292, 293 being moved away from the stack thereby clearing the same of impeding structure. In their movement toward or away from the stack of transfer material, the guides 292, 293 will slide with relative ease upon the bent portions 297, 298, respectively. Their limit of travel in one direction will be determined by the engagement of the inner edges 326 of the portions 294, 295 with the bent edges 327 of the central section 296 when there is no paper sheets in the tray and will be determined by the guides 292, 293 when the paper sheets are present in the tray. The limit of travel in the other direction will be determined by the length of the slots 311, 315, 323, 324.

The tray 20 comprising the base member 288, the guides 292, 293 and the linkage arrangement is mounted for longitudinal movement as a unit toward and away from the feed rollers 280, 281. To this end, the base member 288 is formed with up-turned flanges 328, 329 at each extreme side edge. These flanges extend beyond the guides 292, 293 and have secured thereto the inner race 331 of commercial type file cabinet drawer slides. The outer races 332 for the slides are attached to a support bracket 333 which extends across and beneath the entire tray 20 and terminates beyond the side thereof into upstanding flanges 334, 335. Each of the outer races 332 is secured as by welding to the inner surface of the flanges 334, 335 and serve to support the tray 20 and the linkage system relative to the support bracket 333. Suitable ball-bearings mounted between the races 331 and 332 permit slidable action between the tray 20 and the bracket 333 and removal of the tray from the apparatus. A spring latch 336 secured to the flange 335 by welding has a bent end 337 engageable with the rear end of one of the inner races 331 which serves to detachably retain the tray in a relatively fixed position.

The tray 20 is also mounted for vertical movement and to this end there is provided a left-hand support plate 338 secured to the frame plate 5 by a bracket 340 and a right-hand support plate 341 secured to the frame plate 4 by a bracket 342. The support plate 338 and 341 are joined together at their top portion by a connecting rod 343 and at their lower portions by a support bar 344. Positioned between and secured to the flange 334 and the support plate 338 are the inner and outer races 345, 346, respectively, of a file drawer slide 347 having suitable ball bearings between the races. Similarly, the flange 335 and the support plate 341 have the inner and outer races of a cabinet slide 348 mounted therebetween. Each of the slides 347, 348 extends vertically a distance that will facilitate vertical movement of the tray 20 between its full range of movement while preventing rocking movement of the tray relative to the fixed supporting structure for the tray.

The lower limit of movement of the tray is determined by a plurality of stops 350 mounted on brackets 351 that are secured to the flanges 334, 335. Preferably the stops 350 are located adjacent the four corners of the tray in order to prevent uneven settling of the tray and its associated parts.

In feeding sheets from the stack 287, one at a time, as the topmost sheet is advanced forward, the movement of the topmost sheet will tend to advance the second sheet also. In order to insure separation of the topmost sheet only from the stack, there is provided at opposite corners from the stack separating devices which apply a light restraining force on the forward corners of the topmost sheet and the leading edge of the paper stack. Each of the separating devices comprise a vertically movable plunger 353, 354 freely movable in a tubular element 355, 356 secured to the outside surface of upright portions 292 and 293 respectively to be movable laterally therewith. Each of the plungers 353, 354 has a snubber 357, 358 secured thereto to be movable therewith. Since the separating devices are formed complementary to each other, it is believed necessary to describe only one of the devices in detail. As shown in FIGS. 32, 33 and 34, the plunger 354 is formed with a radial slot 360 and within which is secured one leg 361 of a bent element 363 upon which is secured the snubber 358. A slot 363 is formed axially along the wall of the tubular element 356 and the leg 361 extends through and is slidable within this slot which retains the snubber 358 against rotation. With the plunger 354 being located on one side of the paper stack 287, the snubber 358 is positioned against the leading edge of the stack with the snubber overlying the corner of the topmost sheet. The elements 358, 361, 362 of the separating device are preferably formed as a unitary structure stamped from sheet material.

The weight of each of the plungers 353, 354 is imposed on the upper forward corners of the paper stack and the weight on each corner is such that the plungers will follow the level of the stack downwardly as the stack level is lowered. Their weights also provide a restraining force which will assist in the feeding of a single sheet of paper when the stack is acted upon by separator rollers to be described hereinafter.

As shown in FIG. 28, the lower ends of the plungers 353, 354 extend beyond the depth of the stack 287 and terminate in rounded ends 364 preferably made from a plastic material such as Teflon. These ends are adapted to ride upon inclined plates 365 located below the plungers and the outer edges 366 of the support bracket 333 on either side of the tray when the tray is moved rearwardly. As the tray 20 is retracted from its paper feeding position, or to the left as shown in FIG. 28, the plungers 353, 354 will engage the inclined plates 365 and be raised where they will remain as the tray is retracted. With the plungers held in their uppermost position, the snubbers 357, 358 will be clear of the paper stack thereby permitting the adding or removal of paper sheets from the tray without encountering interference. Assuming that a new supply of paper has been placed upon the tray and the same is moved to its forward position, the plungers will again resume their positions with the snubbers resting upon the topmost sheet of the new supply.

To feed sheets of transfer material one at a time from the paper tray 20 into the bite of the feed rollers 280, 281, there is provided a paper feeding means comprising intermittently driven rollers 367 fixedly mounted upon a shaft 368 journaled in bearings 370 mounted in an arm 371 adapted to swing about the axis of a shaft 372. The means for driving the rollers 367 comprises a pulley 373 secured to a conventional slip clutch 374, and a pulley 375 mounted on the shafts 368 and 372, respectively, and operatively connected together by means of timing belt 376. The slip clutch 374 permits the rollers 367 to be rotated either by the timing belt 376 or by frictional contact with a sheet of transfer material as it is pulled forward by the feed rollers 280 and 281.

Figure 23:
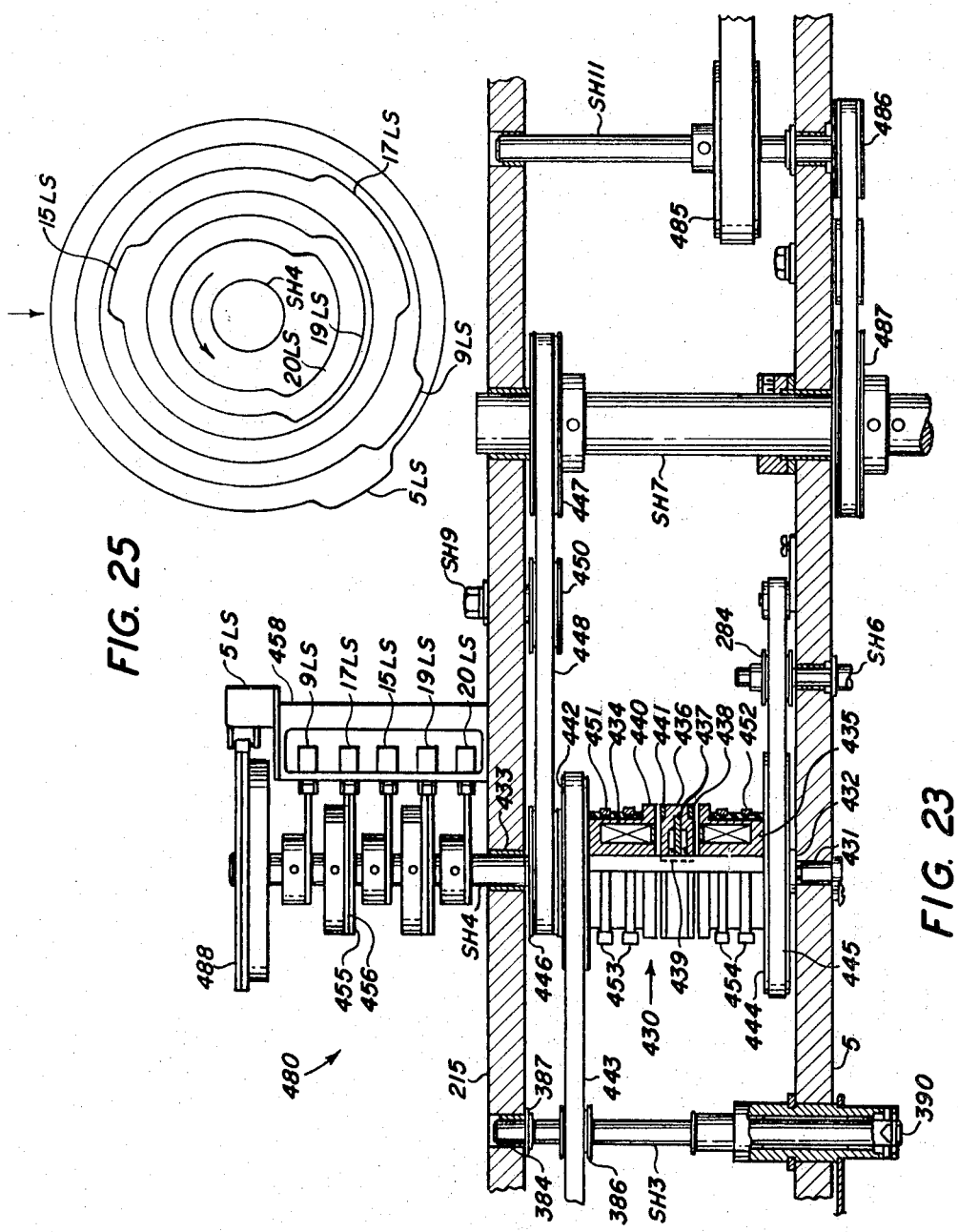
Figure 35:
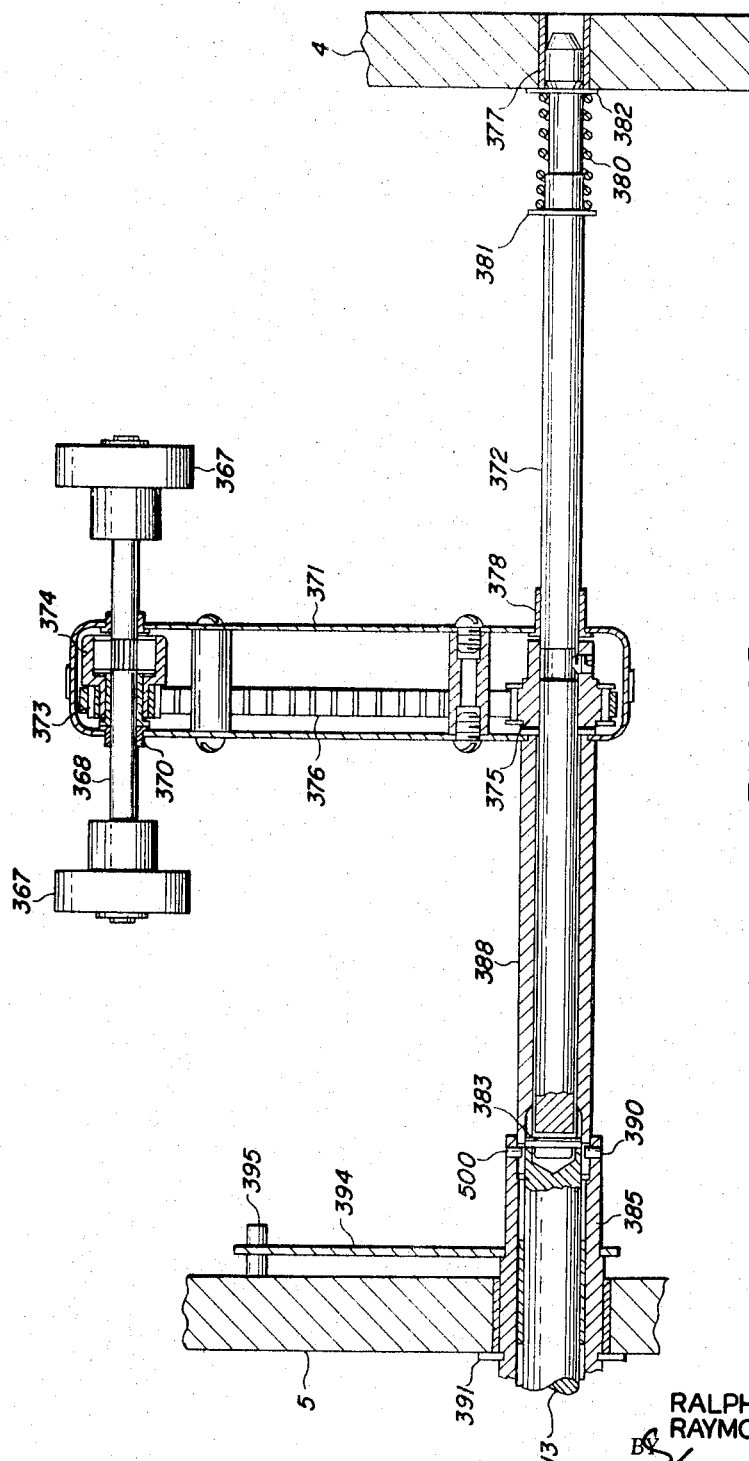
FIG. 35 is a sectional view of the paper separator roller and associated elements.

The shaft 372 is journaled by a bearing 377 in the front plate 4, and by a bearing 378 in the arm 371 and, is normally biased to the left as seen in FIG. 35, by means of a spring 380 interposed between a snap ring 381 on the shaft 372 and a shaft encircling washer 382 butted against the plate 4. As shaft 372 is forced to the left, the notched end of said shaft is forced into the aperture in the end of a shaft SH3 to engage drive pin secured therein. As shown in FIG. 23, the shaft SH3, which is journaled in suitable bearings 384 positioned in the frame plate 215 and a sleeve 385 in the rear plate 5 has an intermittently driven pulley 386 secured thereon. A washer 387 rides against a shoulder on shaft SH3 to prevent outward axial movement of said shaft as viewed in FIG. 23.

To adjust the pressure of rollers 367 on the stack of transfer material in paper tray 20, the arm 371 is fixed to one end of a hollow arm shaft 388, the opposite end of the arm shaft being notched to engage locating pins 390 secured to the counterbored end of the sleeve 385 journaled in the plate 5, the sleeve being retained against axial movement to the right as seen in FIG. 35 by a snap ring 391 secured in a suitable groove formed in the sleeve. The roller pressure on the stack of paper in paper tray 20 due to gravity is sufficient to maintain the sheets of paper in position within the tray.

Interposed between rollers 367 and feed rollers 280 and 281 there is provided, as shown in FIGS. 28 and 29, a pair of paper guides 392 and 393 supported at opposite ends by the plates 4 and 5 to guide each sheet of transfer material forwarded by rollers 367 into the bite of rollers 280 and 281.

To permit the rollers 367 to clear a stack of copy sheets in the tray 20 as the tray is moved to its normal operating position as shown in FIG. 35 (or when the tray is removed from its normal operating position), there is provided a cam arm 394 secured to the sleeve 385 and a cam pin 395 secured to the plate 5 for limiting the downward movement of the pivot arm 371 and the rollers 367. As will be described hereinafter, the height of the paper stack 287 is maintained relatively constant, varying only by the thickness of a few sheets of paper. The cam pin 395 is positioned such that if the tray 20 is retracted, the rollers will lower only slightly and, upon movement of the tray to its normal paper feed position, the rollers 367 will ride upward by its engagement with leading edges of the first few topmost sheets.

Forward progress of the tray movement up to its operating position is determined by a margin guide 396 which extends vertically from the forward portion 397 of the support bracket 333 to which it is secured. The guide 396 maintains the forward edges of the sheet of paper in generally vertical alignment and prevents inadvertent slippage of any or all the sheet. The height of the guide 396 is normally below that of the snubbers 357, 358 which, as previously stated, rest upon the corners of the topmost sheet of the stack 287, while the height of the snubbers will vary somewhat, by the thickness of a few sheets of papers. They will always occupy a position no lower than the upper edge of the margin guide 396 which must be cleared for a sheet of paper to be fed to the feed rollers 280, 281.

In operation, as the topmost sheet is advanced by the rollers 367, the leading edge corners of the sheet engage the snubbers 357, 358 whereupon the sheet will buckle upwardly and inwardly. As shown in FIGS. 27 and 34, the snubbers are tapered, being formed with an inner edge that is at an acute angle relative to the leading edges of the sheets of paper. As the rollers 367 apply a forward force to the topmost sheet, the two forward corners of the sheet engage the vertical portion of the elements 362 resulting in a lag in the forward movement of the corners as the sheet is continually advanced over the upper edge of the margin guide 397. This lag in cooperation with the angled inner edges of the snubbers will produce slight inward sliding movement of the corners of the sheet of paper with consequent buckling of the sheet at its middle section. This buckling action of the topmost sheet insures its separation from the underlying sheets in the stack.

As previously stated, the tray 20 is adapted for vertical movement in order to maintain the plane or the level top of the stack 287 at a relatively fixed point. This is accomplished by the use of a motor drive and a switching arrangement which will drive the tray 20 upwardly from an initial lower position when the tray supports a stack of paper to an uppermost position of the tray when only a few sheets of paper remain in the tray.

This drive action is provided by a paper level drive motor M13 mounted for sliding movement upon the stationary support bar 344. The motor M13 is provided with a gear reduction device 400 and the output thereof is taken from the output shaft 401 to which is secured a drive gear 402. When the motor M13 is in its forward drive position, as shown in FIG. 28, the drive gear 402 is in mesh with a substantially larger driven gear 403 secured intermediate the ends of a shaft 404 which extends below and transversely of the tray 20, terminating in suitable bearings 405 mounted in the fixed support plates 338, 341.

Secured to the ends of the transverse shaft 404, inwardly of the support plates 338, 341 are gears 406, 407 each of which is in mesh with gear racks 408, 409, respectively. The rack 408 is secured to and depends downwardly from the outer surface of the flange 334, which, as was previously stated, is part of the support bracket 333. The rack 409 is secured to the other flange 335 of the bracket 333 and depends downwardly in the same manner. With the bracket 333 being movable vertically by means of the slides 347, 348, rotation of the gears 406, 407 in a counterclockwise direction, as viewed in FIG. 28, will drive the racks vertically for moving the support bracket 333 upwardly. This movement will carry the tray 20 and, consequently, the stack 287 therewith.

Preferably the motor M13, is of the type which includes an internal braking device which permits rotation of its output shaft 401 when the motor is energized but locks the drive shaft against mechanical rotation when the motor is de-energized. Energization of the motor M13 is under control of a paper level limit switch 11LSB and a paper low limit switch 6LS. The limit switch 11LSB is mounted on the connecting rod 343 which extends across the tray above the level of the stack 287 and is provided with a depending paper level contacting finger 411 for actuating the switch into its open and closed positions. Normally, the switch 11LSB is in its closed condition when no force is placed upon the finger 411, however, when the level of the stack reaches a predetermined height, the top of the stack engages this finger to actuate the switch 11LSB to its open condition.

Figure 51:
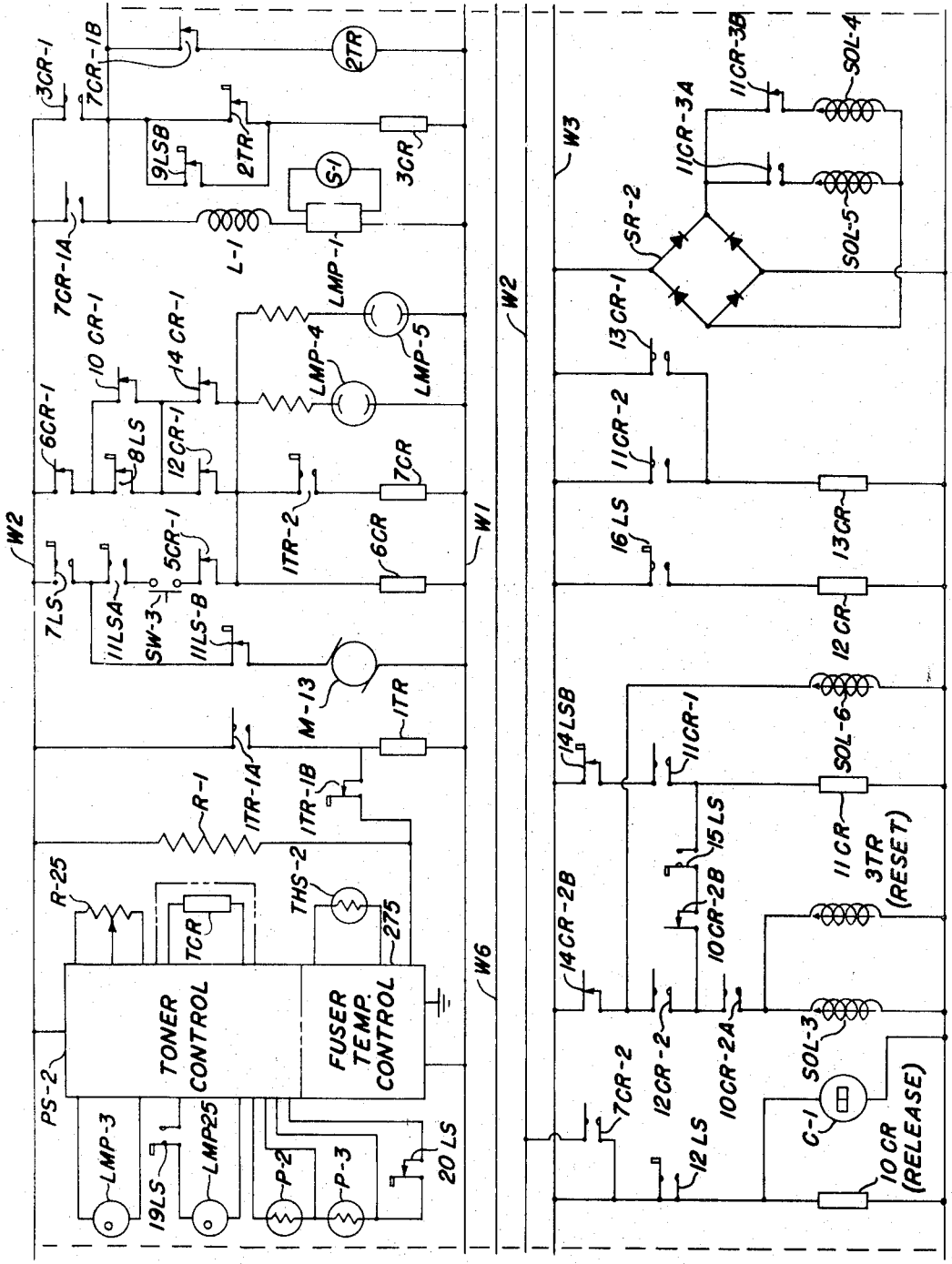

As shown in the circuit diagram in FIG. 51, the switch 11LSB is connected in series with the motor M13 and a suitable door interlock switch 7LS which is in closed condition when a door to the base section 1 for the apparatus is closed. When the top of the stack 287 is below the predetermined level, the motor M13 will be energized until the top of the stack reaches the predetermined level whereupon the switch 11LSB will be actuated to its open position for de-energizing the motor. Preferably, the gear reduction for the motor is such that the gears 406, 407 will rotate approximately at the rate of 2 r.p.m. This slow speed will insure proper orientation of the sheets of paper upon the tray during movement and sudden stopping thereof.

The limit switch 6LS is secured to the fixed support plate 388 and includes an actuating arm 412 having a roller 413 thereon which is adapted to continuously engage one edge 414 of the gear rack 408. The switch 6LS is normally closed when the rack 408 is in the position shown in FIG. 28 thus maintaining the circuit to the low-paper relay 5CR closed. Since the continuous xerographic printing cycle of the apparatus is dependent upon the closed condition of the switch 5CR-1, as will be discussed in detail hereinafter, the program arrangement for the electrical circuit is such that the switch 5CR-1 will open to terminate printing when the relay 5CR is de-energized, which event occurs when the limit switch 6LS is actuated to its open position.

As the tray is moved upwardly when paper is being fed out of the tray 20 under the power produced by the motor M13 and as controlled by the level determining switch 11LSB, the roller 413 on the actuator arm for the paper low switch 6LS approaches a detent 415 formed at the lowermost point of the gear rack 408. This occurs as the paper stack becomes gradually depleted through use of the xerographic apparatus. When the paper tray 20 contains only a few sheets of paper, the roller 413 will roll into the detent 415 causing actuation of the switch 6LS to its open position which, in turn, will open the circuit to the relay 5CR and permit opening of the switch 5CR-1. With the printing mechanism shut down, the operation of the xerographic apparatus terminates until paper is added to the tray 20 in order to cause closing of the paper-low switch 6LS.

As previously stated, the motor M13 is provided with an internal braking device which, when the tray 20 is in its paper-low, uppermost position, to produce opening of the switch 6LS, will prevent mechanical reversal of the motor when de-energized and thus prevent lowering of the tray under the weight of a new stack of sheet material or under any loading condition. In order to produce lowering of the tray 20 for permitting an operator to add paper, the paper feed mechanism also includes a mechanical interlock device between the door T to the base section 1 and the tray drive motor M13.

This mechanical interlock device is associated with the paper level drive motor M13 and is arranged to physically move the motor into or out of engagement with the gear system for the tray raising function. As shown in FIG. 31, the motor is mounted by a bracket 416 to the upper inner race 417 of a drawer slide, having a lower outer race 418 secured to the support bracket 344. The bracket 416 also has secured thereto by vertically positioned bolts 420, the bight portion of a U-shaped member 421 the legs of which extend downwardly to straddle the slide races 417, 418 as well as the bracket 344. The member 421 is formed with a lateral extending tongue 422 having secured thereto one end of a coil spring 423 which has its other end secured to a post 424 on the bracket 344. The spring 423 serves to bias the member 421 to the left as viewed in FIG. 30 and thereby to force the motor M13 and its output drive gear 402 in that same direction. Adjusting screws 425, 426 mounted on the legs of the member 421 and engageable with the edges of the bracket 344 set the limit of movement for the motor in either direction.

Normally, the motor M13 is biased to the left until the front adjusting screw 426 is against the adjacent edge of the bracket 344. This action will result in movement of the drive gear 402 to the left to become disengaged from the gear 403 whereupon, the tray 20 will lower by gravity until the support plate 333 comes to a stop upon the stops 350. In order to maintain the drive gear 402 in mesh with the gear 403, there is provided a door-engaging actuator 427 secured by the bolts 420 to the upper race 417 for actuating the elements 417, 421, 416 and the motor M13 to the right, when the apparatus cabinet door T is in a closed position. This is accomplished by the provision of a push rod 428 at the outer end of the actuator for direct engagement with the door when closed. A coil spring 429 is held within the actuator 427 and serves to force the rod 428 outwardly and to act as an override mechanism in the event that the extreme tips of the teeth of the gear 402 impinge upon the extreme tips of the gear teeth of gear 403. Upon this occurrence, assuming that the door T has been closed, the coil spring 429 will be compressed in order to relieve the mechanical strain upon the rod 427. In the event that there is direct engagement of the gear teeth, any attempt to raise the tray for elevating the stack by rotating the gear 402 will produce meshing with the gear 403 under the force produced by the spring 429. With the spring 429 being stronger than the spring 423, the bracket 416 will be forced to the right against the force produced by the spring 423 in order to permit proper meshing of the gears 402 and 403.

With the gears in mesh, and the limit switch 11LSB closed because of the lower most position of the paper stack 287 the motor M13 will become energized to raise the tray to pass the position it occupied just previous to the time the door T was opened. The mechanical interlock device, as understood from the foregoing description is operable to lower the tray 20 whenever the operator opens the door T. Generally, this is necessary only when paper is to be added to the tray and the ensuing lowering of the tray 20 conditions the same for the addition of paper. The operator need only to retract the tray toward the door T to permit actuation of the plungers 353, 354 upwardly out of the way of the remaining paper stack or the completely empty tray. In this arrangement, the chance that the operator will load the tray, when the same is not in proper condition, is eliminated.

Clutch Mechanism

Both the operation of the paper separator rolls 367 and the paper feed roll 280 is effected by a clutch mechanism 430 having separate clutch drives, the selection of the drives being controlled by means of a duplex clutch shifting armature actuated by a programmer to be discussed hereinafter.

As illustrated in FIG. 23, the clutch mechanism 430 which is supported and housed by the frame plates 5 and 215, includes a horizontal driven shaft SH4 that rotates at one end by means of a pin 431 mounted by a screw in frame plate 5, the end of the shaft being formed with a cavity to receive the end of the pin 431. A thrust washer 432 encircles the shaft on the inside of the plate 5. At its opposite end, the shaft SH4 is journaled in a bearing 433 mounted in the frame plate 215 and extends beyond this plate for supporting programming cams to be described hereinafter.

The clutch mechanism includes two complementary magnet assemblies 434 and 435 which are free to rotate relative to the shaft. A third clutch element 436, which in effect is an armature and adapted to coact with complementary magnet assemblies 434 and 435, is fitted on shaft SH4 in interposed relation to the magnet assemblies and is free for relative movement with respect to the axis of the shaft SH4. However, the armature is connected to the shaft for rotation therewith by means of a series of flexible metallic diaphragms 437 secured along their peripheries to an internal wall of the central portion of the armature and at their center points to an armature hub 438, which in turn is held in place on the shaft SH4 by a key 439. A spacing 440 is provided on both sides of the armature 436 and the adjacent side wall of each clutch element 434, 435 to permit limited sliding movement of the armature along the shaft in either direction. The armature 436 is provided with friction pads 441 on both sides thereof to be engageable with their magnet assembly 434 or 435, depending upon which of these assemblies are electrically energized.

The frictional surfaces of the armature 436 are spaced a distance slightly smaller than the spacing 440 from the opposed surface of the magnet assemblies to permit axial movement of the armature whereby it may be selectively engaged with either magnet assembly. When either magnet assembly is energized, magnetic flux flows from that assembly into the armature and attracts the armature to that assembly. The insuing axial movement of the armature is accomplished by deflection of the flexible diaphragm 437 since the hub 438 is fixed on the shaft. The torque developed on the shaft SH4 is transmitted by the armature hub 438, which rotates with the shaft, to the flexible diaphragm and by friction from the friction facings 441 to the assembly 434. The magnet assembly 434 is, in effect, a driven element and is secured to a pulley 442 which in turn serves to drive the pulley 386 by a timing belt 443 for driving the paper feed rollers 367. In a similar manner, the magnet assembly 435 is in effect a driven element secured to a pulley 444 adapted to be connected by timing belt 445 to driven pulley 284 mounted on the shaft SH6 to drive the paper register roller 280.

In order to impart rotation to the shaft SH4 to effect rotation of either the paper feed roller drive shaft SH3 or the paper register roller drive shaft SH6, the shaft SH4 has secured thereto a driven pulley 446 connected to a pulley 447 secured to the drum drive shaft SH7 by a timing belt 448 which also encircles an adler pulley 450 rotatable on shaft SH9. With this arrangement the shaft SH4 is continually rotated along with the drum 14 while the machine is in operation.

The magnet assemblies 434 and 435 are each provided with a pair of commutator rings 451 and 452, respectively, which are adapted to continuously engage suitable brushes 453 and 454. The brushes are part of the electrical circuit for the machine and, as shown in FIG. 50, the brushes 453 connect the coil of the magnet assembly 434, illustrated as a solenoid SOL-1, across the output terminals of a D.C. rectifier SR-3 while the brushes 454 connect the coil of the magnet assembly 435, illustrated as a solenoid SOL-7, across the output terminals of the D.C. rectifier SR-4.

Energization of either the magnet assembly 434 or the magnet assembly 435 is under control of a rotatable cam 455 secured on the shaft SH4 as shown in FIG. 23. The periphery of the cam 455 is formed with a cam lobe 456 which periodically engages and actuates a cam follower 457 mounted to a frame structure 458 secured on the rear frame plate 215. When actuated, the cam follower 457 in turn actuates a paper feed limit switch 17LS, also mounted on the frame structure 458 and comprising two switches 17LSA and 17LSB, one of which will close while the other opens during actuation of the switch 17LS. As shown in FIG. 50, the switch 17LSB is normally closed so that the register roller 280 is normally rotating while the cam 455 is rotating out of engagement with the follower 456. During this cycle of operation, the switch 17LSA is open and magnet asssembly 434 is de-energized. When the lobe 456 is rotated around to engage the follower 457, the switch 17LSB is opened and the switch 17LSA closed. Opening of switch 17LSB will cause de-energization of the magnet assembly 435 which releases the armature 436 therefrom to terminate the drive connection to the register roller. Closing of the switch 17LSA will produce energization of the magnet assembly 434 resulting in the attraction thereto of the armature for producing a drive connection the shaft SH4 and the feed roller shaft SH3.

Referring back to the operation of the paper feed rollers 367 and the paper register rollers 280 and 281, when the paper feed rollers 367 are driven by the energized magnetic assembly 434, the magnet assembly 435 for driving the roller 280 is de-energized since at this stage of the operation the switch 17LSA is closed. As the rollers 367 are driven they forward a sheet of transfer material into the bite of rollers 280 and 281 where its forward motion is momentarily stopped. As the movement of a sheet of transfer material under the rollers 467 continues after the leading edge of the sheet has been stopped by rollers 280 and 281, the sheet is buckled as the rollers continue to rotate. The rotation of rollers 367 is continued just sufficiently to bow the paper whereby the resiliency of the paper forces the leading edge of the sheet into transverse alignment with the rollers 280 and 281, irrespective of its original alignment thereto, so that the paper is forwarded by said rollers in correct alignment with the drum 14 as the roller 280 is activated by movement of the cam lobe 456 to close the switch 17LSB, permitting the armature 436 to become magnetically coupled to the magnet assembly 434.

Pick-off mechanism

In the image transfer station the powder images previously formed on the xerographic drum are electrostatically transferred to a sheet of transfer material, the electrostatic charge being applied to the transfer material by means of the corona transfer device 21. The electrostatic charge applied to the transfer material during the transfer process is sufficient to cause the transfer material to adhere to said drum even after the material has passed out of the corona emission area. It is therefore apparent that there must be provided some means for removing the transfer material from said drum.

Although mechanical means, such as strip fingers common in the printing art, may be used to remove the transfer material from the drum, mechanical means of this type may injure the photoconductive surface of the drum or destroy the powder images on the transfer material. To prevent destruction of the powder images on the transfer material and to prevent damaging the drum, there is provided a preferred form of pick-off mechanism 22 of the type disclosed in copending Rutkus et al. application Ser. No. 824,658, filed on July 2, 1959.

One such form of pick-off mechanism 22 is illustrated in FIGS. 2, 36, 37 and employs a manifold having multiple outlet conduits or nozzles directed against the surfaces of the xerographic drum so that jets of compressed aeriform fluid from said nozzles are directed against the leading edge of a sheet of transfer material to blow said edge of the material off of the drum, the remainder of the transfer material then peeling off from the drum due to its own weight and the pulling force exerted on the paper by the vacuum system in the horizontal transport to be described hereinafter. The manifold may be supplied with compressed aeriform fluid by means of a pulsator or similar source of compressed aeriform fluid.

Specifically in the arrangement disclosed there is provided a discharge manifold 460 suitably mounted adjacent the drum 14 and parallel to the axis thereof by means of suitable clamps which may be secured to a structural element of the machine, as for example, the manifold mounts may be connected to the drum cleaning device 27. Multiple, parallel spaced outlet conduits or nozzles 461 secured to the manifold, as by welding, are positioned so that streams of compressed aeriform fluid emerging from said nozzle are directed to stroke the surface of the xerographic drum at an angle approximately tangent to the surface of said drum.

The manifold 460 comprises a tube 462 counterbored at opposite ends to receive a plug 463 and the tube coupling 464, each of which is press fitted into place. Each outlet conduit or nozzle 461 is passed through a hole in the wall of the tube 462 so that the inner end of each of said conduits is in communication with the interior of the tube.

Compressed aeriform fluid is delivered to the manifold by means of a flexible tube 465 connected at one end to the manifold tube coupling 464 and at its other end to the male hose connector 466 threaded into a pulsator 467.

Although any suitable pulsator may be used to supply compressed aeriform fluid to the manifold, the pulsator illustrated in FIGS. 36 and 37 comprises a closed cylinder 468 adapted to receive the connector 466 which functions as both an inlet and discharge conduit for the cylinder. At the other end of the cylinder, the cylinder head is bored concentric with its center to slidably support a piston rod 470.

Mounted within the cylinder 468 on the reduced end of piston rod 470 is a piston 471, and a spring 472 is positioned to bias said piston toward the right on its return stroke. For supporting both the pulsator and its prime mover, solenoid SOL-2, there is provided a pulsator base 473 mounted by shock mounts 474 to the base of the machine.

The normally de-energized solenoid SOL-2 secured to the side walls of the pulsator base 473 is adapted to actuate the compression or forward stroke of the piston rod 470 of the pulsator by means of an actuator block 475 fastened to the forked left-hand end of the plunger of said solenoid, as seen in FIG. 37.

As the solenoid SOL-2, which is connected to a circuit described hereinafter, and controlled by a switch 2LS on programmer arrangement as described herein is energized, the magnetic field created by the coil of the solenoid results in the pushing of the piston rod 470 in the same direction, left as seen in FIG. 36 to effect a compression or forward stroke of the piston. As a result, the compression aeriform fluid passes from the manifold 460 out through the nozzles 461 and into contact with the drum 14. The operation of the solenoid SOL-2 is so timed that the multiple jets of aeriform fluid are directed against an area of the surface of the xerographic drum to coincide with the appearance of the leading edge of a sheet of transfer material thereon.

The pulsator 467 or other source of compressed aeriform fluid should be so sized or regulated that jets of fluid delivered by said nozzles against the drum are of such a short duration that they are directed toward the drum for a short period of time, just prior to the arrival of the leading edge of a sheet of transfer material in the area of sheet removal until the leading edge of said material has just passed this area to insure the deflection or peeling away from said drum of the leading edge of said material. Once the leading edge of a sheet of transfer material has been separated from the surface of the xerographic drum, the remainder of the sheet will peel off due to its own weight and a pulling force exerted on the paper by the vacuum of the horizontal transport, as previously stated, without distorting the powder images on the sheet which are face up as the sheet leaves said drum. Contributing to the short duration of fluid blasts is the fact that as the solenoid SOL-2 is de-energized, the return stroke of the piston effected by spring 472 reverses the fluid flow in the nozzles 461 since, on the return stroke, air is drawn into the pulsator through these nozzles then acting as inlet conduits to supply air to the pulsator.

*Programmer*

The operation of the card handling apparatus, the sheet feeding mechanism 18 and the paper pick-off mechanism 22 must be coordinated in timed sequence with the formation of an image on a xerographic drum 14, that is, in time relation to the start of scan of the leading edge of the data area of an opaque card.

To control the operation of the card handling apparatus, the paper feed system and the paper pick-off mechanism and to coordinate the initiation of these actions with other specific operations of the disclosed machine, there is provided a programmer means generally indicated by the reference numeral 480 that is actuated in timed sequence with the scanning mechanism and preferably actuated by the scanning mechanism itself, each time the scanning cycle is initiated, the actual timing starting at the moment the leading edge of the data area of an opaque is scanned. The programmer means is adapted to permit the making of a maximum number of reproductions per unit of time.

In reproducing reproductions or copy in the machine disclosed, it is also possible to initiate scanning of a second copy before the machine is finished making the reproduction of the first copy. In other words, transfer material or copy sheet may still be in the process of being forwarded to the drum to receive the developed image of the first copy, or the pick-off mechanism may still be required to be actuated to strip the copy sheet bearing the powder image of the first opaque card from the xerographic drum, when the scan mechanism is ready to start scanning a second opaque card.

The programmer 480 comprises a rotatable bank of cam elements having cam risers to activate the card handling devices the paper feed mechanism and the pick-off mechanism of the xero graphic machine and other components of the machine. As one cam element is rotating and programming the various steps still required to produce the finished reproduction of a first copy, the machine is free to start on a second cycle using a second cam element to activate the processes required to complete the reproduction of a second copy. By the time the machine is set to scan a third copy, another cam element has completed its programming operation and is ready to control the cycling program for a third copy.

It should be pointed out at this time that the terms first, second and third copy refer figuratively to any sequence of copies of the same or different original copies. Specifically, the programmer comprises a microswitch assembly and a set of cams mounted on the shaft SH4 as shown in detail in FIG. 23.

Figure 24:
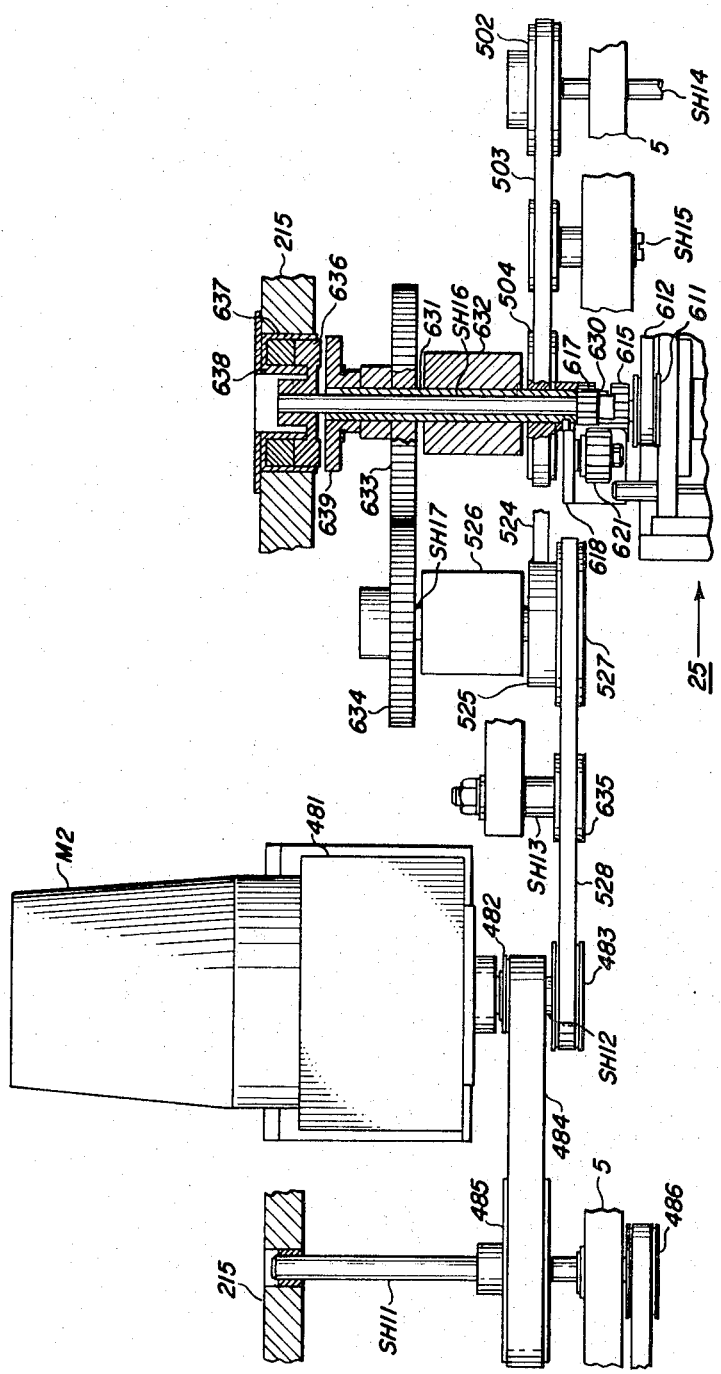
Figure 26:
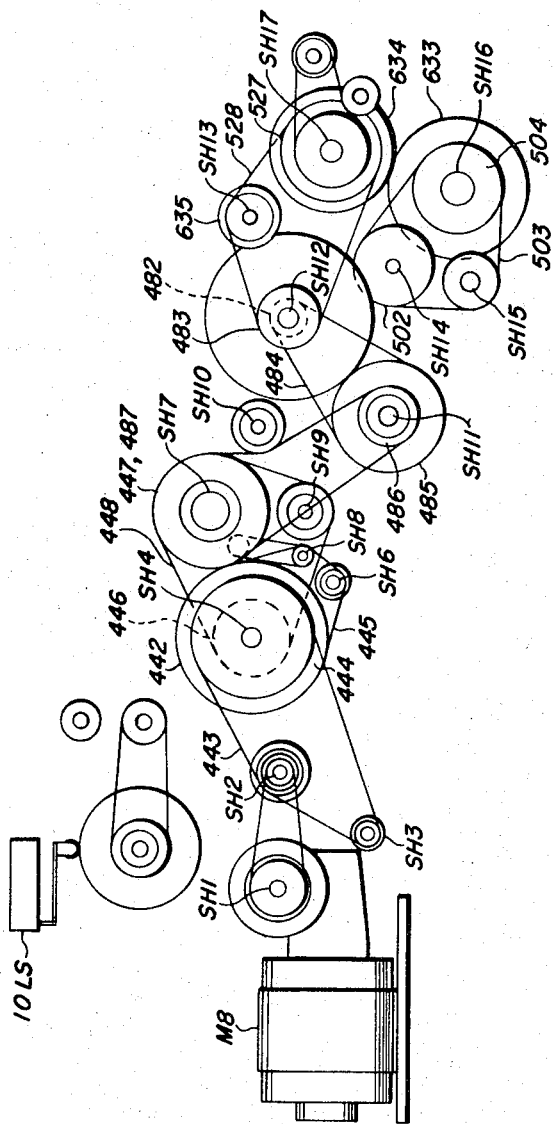
FIG. 26 is a schematic illustration of the drive system.

The microswitch assembly is supported by the frame structure 458 while the cams are secured and axially spaced along the shaft SH4 for rotation in synchronism with the rotational speed of the xerographic drum 14 and this shaft is driven by the main drive motor M2. As shown in FIGS. 22, 23 and 24, the main drive motor M2 is mounted on the frame 215 and includes a gear reduction box 481 for driving a main drive shaft SH12 upon which are secured two pulleys 482, 483. The pulley 482 is connected by a belt 484 to an intermediate pulley 485 secured to a shaft SH11 journaled for free rotation by suitable bearings mounted on the frames 215 and 5. At one end of the shaft SH11, there is secured for rotation therewith a pulley 486 for driving a pulley 487 secured to one end of the drum drive shaft SH7 upon which the drum 14 is mounted. In this manner, the shaft SH4 is adapted for rotation by the main drive motor M2 by way of the shaft SH7. The cooperating pulleys in this arrangement are such that the shaft SH4 will rotate one revolution for every scan of the data area on each card exposed to the drum 14.

Other functions of the machine are energized in timed sequence along with paper feeding and paper pick-off from the bank of cam actuated limit switches in the programmer 480 which consists of a pick-off solenoid actuated by limit switch 5LS, a shutdown cycling switch 9LS, the purpose of which will be described hereinafter, the paper feed switch 17LS, the start of scan switch 15LS, a stripe light switch 19LS for energizing the stripe lamp LMP-25 and a sensing head limit switch 20LS for energizing the stripe exposure circuit 250. These switches are mounted in alignment on the frame structure 458 and cooperate with cams fixed on the shaft SH4, as previously described. For purposes of illustration, the pointer O in FIG. 25 will correspond to the bank of aligned switches on the frame 458. As the shaft SH4 is rotated to rotate the actuating cams, the first switch actuated past the pointer O is the start of scan switch 15LS which closes the circuit to a relay 11CR to close its normally open contact switch 11CR-2 for energizing a relay 13CR. Energization of the relay 13CR closes its normally open contact switch 13CR2 for permitting energization of the paper feed solenoid SOL-1 when the switch 17LSA closes actuating the clutch assembly 434 to permit feeding of a sheet of paper into the register rollers 280. As the shaft SH4 continues into rotation, the limit switch 5LS is actuated momentarily by the cam 488 which has a detent 490 formed on the periphery thereof for permitting closing of this switch when the detent is in coincidence with the switch actuator. Closing of the switch 5LS energizes the solenoid SOL-2 to produce a paper pick-off function in the pick-off mechanism 22.

The next switch to be actuated in the programmer 480 is the switch 9LS which is a cycling switch having a normally closed contact 9LSB electrically connected in parallel with the normally closed timer switch 2TR. When either of these two switches are closed, the relay 3CR remains energized for maintaining continuous operation of the machine. The timer switch remains closed for approximately 35 milliseconds after the shutdown cycle for the machine is initiated, as will be described hereinafter in the section entitled "Machine Operation." In that period of time the timer switch is open and the switch 9LS cycles to an open condition, the machine will continue in its shutdown sequence.

Continued rotation of the shaft SH4 will actuate the switches 19LS and 20LS simultaneously resulting in the formation of the stripe 256 on the xerographic drum as the scanning of the data area of an opaque card commences and, the energization of the sensing lamp LMP-3 for sensing the density of a previously formed stripe.

The last cycling switch to be actuated by the programmer 480 during one complete revolution of the shaft SH4 is the paper feed limit switch 17LS which is used to complete the circuit to energize the paper feed magnetic assembly 434 with a predetermined time interval pulse of energy. The paper feed magnetic assembly 434 as previously described, effects a drive connection between the shaft SH4 and the feed roller shaft SH3 resulting in the feeding of a sheet of copy paper into eventual engagement with the xerographic drum.

From the foregoing, it will be apparent that the paper pick-off mechanism 22 and the sheet feeding mechanism 18 are operated in timed sequence relative to the start of scan of an opaque card. This time sequence also applies to the operation of the toner density sensing apparatus which senses the density for each opaque card being scanned and developed upon the drum.

*Reproduction conveyor system*

The transfer material with the powder image transferred thereon, an enlarged reproduction copy of the data area of a card, after being removed from the drum by the paper pick-off mechanism 22 is attracted by vacuum onto a horizontal conveyor 23 which carries the copy into the heat fuser 25 and then onto a copy guide which directs the copy into the first of a series of feed rollers in the vertical conveyor 26 for delivery of the finished reproduction to a collecting tray 495 mounted in the upper portion of the machine.

The horizontal conveyor 23, suitably mounted on the machine, comprises a plurality of endless conveyor belts 24 supported on movable rollers and, the vertical conveyor 26 comprises a vertical transport 496 mounted on the frame of the machine, the transport including a series of cooperating feed rollers mounted in side channels and guides spaced between the feed rollers for guiding copy delivered by one set of feed rollers to the next subsequent set of feed rollers.

Figure 38:
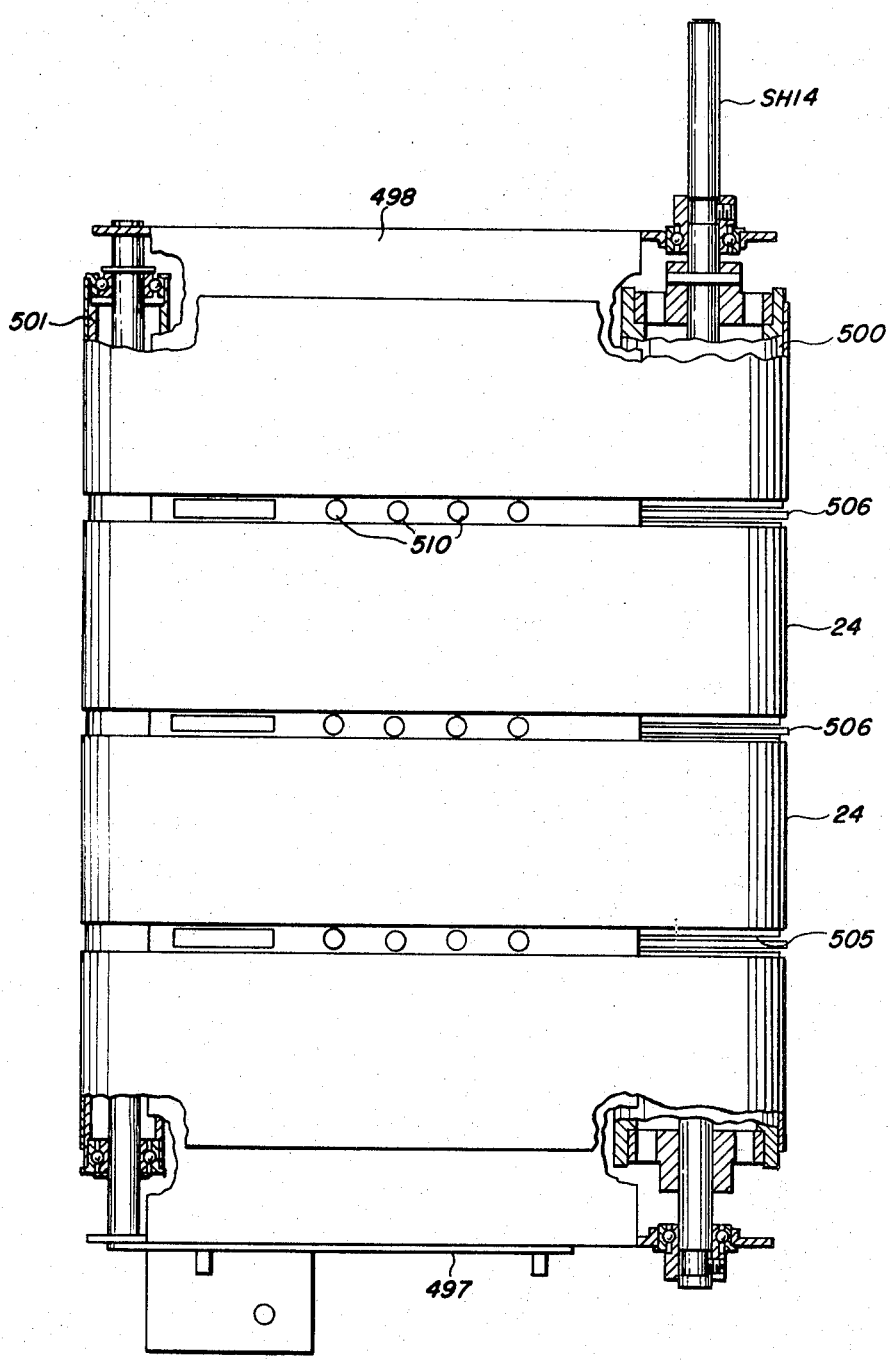
FIG. 38 is a top view of the horizontal conveyor with parts broken away to show structural details.
Figure 39:
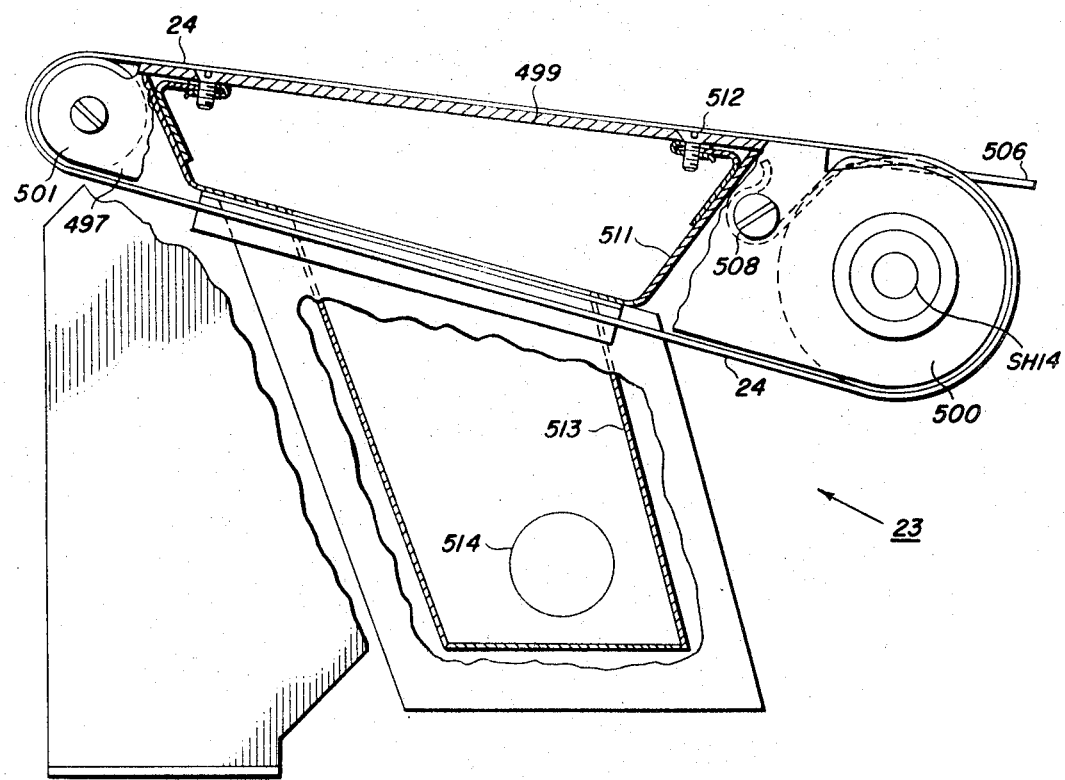
FIG. 39 is a side view of the horizontal conveyor with parts broken away to show structural details.
Figures 40, 41:
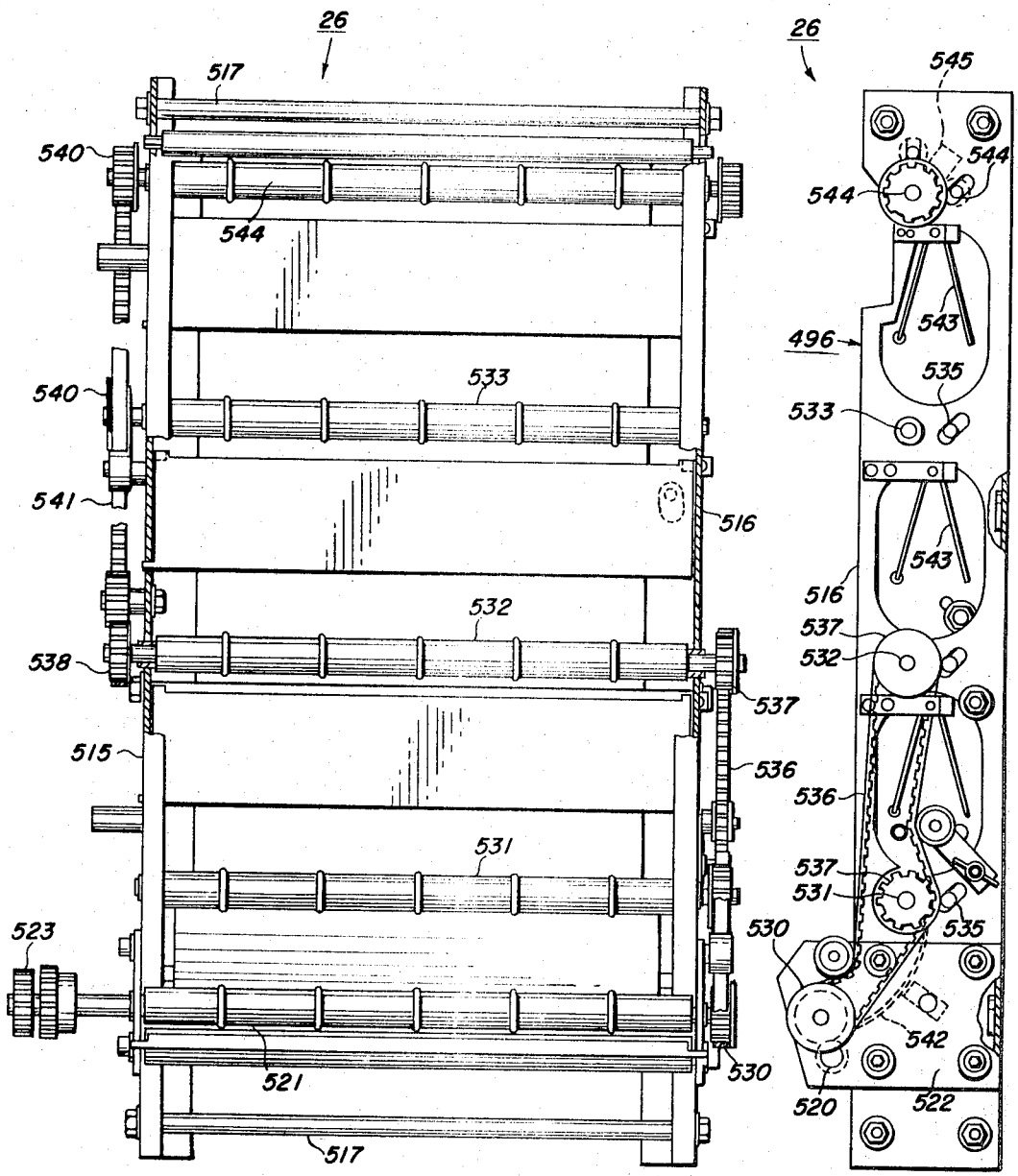
FIG. 40 is a front view of the vertical transport.
FIG. 41 is a right hand view of the vertical transport.

Specifically, as shown in FIGS. 38 and 39, the horizontal conveyor generally designated 23 consists of side plates 497 and 498 and a top plate 499 secured to each other as by welding, the side plates 497 and 498 rotatably supporting a drive roller 500, a terminal roller 501 for a plurality of endless conveyor belt 24. As shown, the belts 24 pass from the drive roller 500 over top plate 499, down over terminal roller 501 and back to drive roller 500.

The drive roller 500 secured to a shaft SH14 journaled in suitable bearings in the side plates 497, 498 is driven by a pulley 502 mounted on one end of the shaft SH14. As shown in FIG. 24, the shaft projects through the main frame 5 and the pulley 502 is connected by a belt 503 to a pulley 504 which forms part of the driving system for the fuser 25, to be described hereinafter. The drive roller 500 is formed with peripheral grooves 505 between the belts 24 for accommodating narrow fingers 506 which project outwardly toward the fuser assembly 25. These fingers are secured to a spacer bar (not shown) mounted to the side plates 497, 498 by screws 508. The top plate 499 is formed with a series of apertures 510 between the belts 24 and these apertures serve as openings into a vacuum chamber 511 secured to and below the top plate by screws 512. The chamber 511 is connected by way of ducts 513, 514, to the exhaust fan (not shown) for the exhaust fan motor M1 thereby resulting in a reduced pressure within the chamber. This reduced pressure creates a pressure differential between the chambers and the space immediately above the belts 24 causing the gradual flow of air inwardly of the chamber. In this manner a sheet of copy paper being conveyed by the transport 23 is held upon the belts 24 during movement thereof until the leading edge of the sheet is directed by the fingers 506 into the fuser assembly 25.

The vertical transport assembly consists of side channels 515 and 516 held in spaced parallel relation to each other by spacer rods 517 to form a frame member to which the various elements of the lower vertical transport may be attached. This assembly is mounted to the machine frame by any suitable means.

Since the transfer sheet material to be transported to the collecting tray 495 is delivered to the vertical transport 26 by way of the horizontal conveyor 23 and the fuser assembly 25, suitable guides 518 secured to the fuser assembly 26 (see FIG. 2) are positioned to direct the transfer material from the fuser assembly to a feed roller 520 mounted in parallel interengaging relationship with respect to a driven feed roller 521, both feed rollers being journaled in extension plates 522 secured to the side plates 515, 516.

A pulley 523 is provided on the outer left end of the driven feed roller 521 and, is connected by a belt 524 to a drive pulley 525 mounted at one end of a shaft SH17 (see FIG. 24). The shaft SH17 is mounted for rotation on a vertical post 526 secured to the base of the machine and also supports a pulley 527 which is connected by a belt 528 to the pulley 583 for supplying drive for the vertical transport 26 from the main motor M2. A driving timing pulley 530 is mounted on the opposite end of the feed roller 521 for transmitting the drive power to various transport rollers in the vertical transport.

To further feed copy through the system, there is provided driven feed rollers 531, 532, 533, and 534, journaled in suitable bearings and positioned in spaced vertical alignment in the side channels 515 and 516, to cooperate with rollers 535 movably mounted in slots formed at an angle of approximately 45 degrees to the vertical in the side channels, whereby the rollers 535 will be forced by gravity into the peripheral contact with their respective mating driven feed rollers. All of the driven feed rollers are provided with suitable rubber O-rings equally spaced thereon to insure frictional engagement of the feed rollers with the copy to also provide a degree of resiliency adequate to accommodate varying thicknesses of transfer material.

To supply power to the upper vertical transport, the timing pulley 530 on the driven feed roller 521 is connected by a belt 536 to pulleys 537 on the driven rollers 531 and 532. A second timing pulley 538 on the opposite end of driven feed roller 532 drives timing pulleys 540 on driven feed rollers 533 and 534 by means of a belt 541.

Transfer material leaving the bottom pair of feed rollers is guided by curved guides 542, secured to the side channels 515 and 516, into the first of the series of vertical feed rollers, the material thereafter being directed in their ascent through the vertical transport by a series of guides 543. These guides formed in the shape of an inverted V have an elongated slot at the apex of the V and a lip extending from one tip thereof. When a sheet of copy paper reaches the topmost guide 543, it is fed between two rollers 544 and guided by a curved guide 545 to be deflected into the copy receiving tray 495.

Fuser assembly

The developing materials used to form the powder images are specifically designed to permit them to be fixed to the support material by heat fixing, that is, the individual particles of resin (toner) soften and coalesce when heated so that they become sticky and readily adhere to the support material.

As shown in FIGS. 42–49, the fuser apparatus 25 is of the heated roller type and includes a frame for supporting the upper roller of the fuser and apparatus formed by spaced apart end plates 550, 551 held in spaced relation by two lower braces 552, 553 and two upper braces 554, 555. The four braces, more or less are secured to the four corners of each of the end plates thereby forming a generally rectangular frame for the fuser structure. The lower fuser roller is supported in a position parallel to the upper roller by this frame.

Direct contact fusing of a powder image on a support material is achieved by forwarding a sheet of support material bearing the powder image to be fused between a heated upper roller, generally designated 556, and an unheated lower roller, generally designated 557, rotating in intimate contact under pressure during a fusing operation. The support material, carrying the unfused toner images, is advanced between these two rollers with the toner images facing the heated roller so that fusing occurs when contact is made.

As shown in FIG. 44, the upper roller 556 includes a cylinder 558 partly closed at opposite ends by right-hand and left-hand fuser roller caps 560 and 561, respectively, which are secured to the cylinder, as by a press fit. The caps 560, 561, are formed with tubular shanks 562, 563, respectively, which extend outwardly from the cylinder 558. The roller is journaled for rotation by bearings 564 and 565 which encircle the shanks 562, 563 and are positioned in the frame plates 550 and 551, respectively.

The inner race of the bearing 564 is secured between a shoulder on the shank 562 and a thrust washer 566 held against this race by a retaining ring 567. The outer race is secured to the plate 550 by means of the ring 567 and an inner ring 570 which are held to the plate 550 by screws 568. The grooved races closely encompassing portions of the bearing balls maintain the axial relationship between the races and thus locate the roller 556 relative to the fuser assembly frame.

On the opposite end of the roller, the inner race of the bearing 565 is locked against inward movement by a thrust washer 571 secured in a suitable groove formed inwardly on the shank 563. The inner and outer races of the bearing 565 are free to move slightly during expansion of the roller 556 when heated but are prevented from removal from the frame plate 551 by a retaining ring 572 secured by screws 573 to the outer surface of frame plate.

Each of the fuser roller caps is provided with a suitable aperture to receive a quartz tube 574 which supports a resistance heating element R–1. The ends of the resistance element R–1 project through the shanks 562, 563 and terminate in terminals 575 which may be connected by suitable conductors to a source of power. Insulating caps 576, secured to the plates 550, 551 by the rings 567, 572, respectively, are provided between the terminals and the frame plates to prevent dust or dirt from entering the bearings 564, 565 and to prevent inadvertent electrical arcing. The caps 576 are formed with cavities for accommodating and supporting the ends of the quartz tube 574, which is stationary while the roller 556 rotates. A thermistor THS–2, part of an electrical control system for controlling power to the resistance element R–1, is suitably positioned in thermal relation to the fuser roller 556. Details concerning the electrical control circuit for the fuser will be described hereinafter.

To prevent toner offset onto the heated roller contacting the unfused toner image on the support material, an offset preventing material 577 covers the outer surface of cylinder 558 of the roller 556. A suitable material may be a coating of a product of tetrafluoroethylene resin sold under the trademark of Teflon by the Du Pont Corporation.

The upper roller 556 is driven in direct relation by the lower roller 557 by means of gears, one secured to each of these rollers. Between the bearing 565 and the left-hand cap 561 for the upper roller, a gear 578 is secured by suitable screws 579 to the cap, and this gear is operatively engaged with a gear 581 secured to the support shaft 582 for the lower roller 557.

The lower roller 557 includes a rigid core 583 covered with a suitable resiliently deformable material 584, such as silicone rubber, which, in turn, is covered by a Teflon coating 585. The Teflon coating deforms with the rubber 583 in relation to the amount of pressure between heated roller 556 and the roller 557 to form an arc of contact for proper fusing of the thermoplastic resin on the support material. The coating provides a protective covering on the material 574 to prevent deterioration of the rubber due to heat and/or contact with offset preventing liquid, the application of which is to be hereinafter discussed.

The roller 557 is rotatably supported on the support shaft 582 by left-hand and right-hand bearings 586 and 587, respectively. The inner race of right-hand bearings 587 is held against outward axial movement relative to the shaft 582 by a ring 588 while the outer race is held against movement by a retaining ring 590 secured in a suitable groove provided in the outer race and secured by suitable screws to an upright plate 591. The inner race of left-hand bearing 586 is held against outward movement relative to the shaft by a retaining ring 592 secured in a groove provided in the shaft, and its outer race is held by an upright plate 593 but is allowed to move axially due to expansion of metal parts when heated. The gear 581 for rotating the roller 557 is secured to the left-hand side of the shaft 582 by a suitable set screw (not shown) to enable the roll to be driven in a manner to be described.

The upright plates 591, 593, as shown in FIG. 48, are triangular in shape with one apex being formed with an aperture for accommodating bearings 586, 588 and through which the shaft 582 extends. Another aperture is formed on each of these plates at a second apex arranged horizontally relative to the shaft 582 and through these apertures a shaft 594 projects. The shaft 594 is mounted in the frame plates 550, 551 for support thereat and permits limited rotative movement of the plates 591, 593 about its axis.

The plates 591, 593 which support the shaft 582 for the lower roller 557 are formed at their lower apexes with apertures through which extend bushings 597, 598 secured therein and which rotatably support pins 600, only one of which is shown in FIG. 44. At the inner end of the pins 600, but on the other side of the plates 591, 593, are secured circular rollers 601, 602 which cooperate with cam rollers 603, 604, respectively, mounted on a cam shaft 605 which is rotatably mounted on the frame for the fuser assembly. The cam rollers 603, 604 are arranged eccentrically relative to the axis of the cam shaft 605 and when rotated by this shaft force the coacting follower rollers 601, 602, respectively, upwardly slightly to rotate each of the plates 591, 593 about the axis of the support shaft 594 for these plates. This action serves to raise the lower roller 557 into a cooperating position with the heated roller 556 once for each partial revolution of the shaft 605 for fusing toner particles onto a sheet of copy paper as it travels between the rollers 556, 557 or to lower the lower roller out of contact with the heater roller when there is no sheet therebetween. The rollers 601, 602 are described as circular; however, these may be arranged eccentrically relative to their respective pins 600 for the purpose of presetting the maximum spacing between the rollers 556, 557. A screw 606 may be provided in each of the pins 600 to effect this adjustment.

The roller 557 is raised into pressure contact with the heater roller 556 by operation of a differential drive mechanism generally indicated by the reference numeral 610 which serves to drive the lower roller and consequently, the heater roller. To this end, the mechanism 610 is provided with a timing gear 611 rotatably mounted at one end of the shaft 605. A timing belt 612 is arranged around the gear 611, an idler gear 613 and, a driven gear 614 secured to the extreme end of the lower roller shaft 582. Also rotatably mounted on the shaft 605 in axial alignment with the gear 611 is a drive gear 615 which is secured to the timing gear 611 by a set screw 616. With this arrangement it will be apparent that rotation of the drive gear 615 about the shaft 605 will impart rotation of the lower roller 557.

Another gear 617 is also rotatably mounted on the shaft 605 and is located toward the extreme end thereof in relation to the drive gear 615. The extreme end of the shaft terminates in an aperture formed in a support plate 618 and is fixed thereto by a set screw 620. A first planetary gear 621 is supported for rotation inwardly and upwardly of the support plate 618 by a pivot pin 622 and is in mesh with the gear 617. A second planetary gear 623 is supported for rotation inwardly and downwardly of the support plate by a pivot pin 624 and is in mesh with the gear 621 immediately above it and with the drive gear 615.

In the arrangement of the differential mechanism 610, thus far described, the drive gear 615 and the gear 617 serve as the sun gears for the planetary gears 621 and 623. Means are provided for rotating the gear 617, as will be described hereinafter, in order to initiate action and coaction in the fuser assembly. In utilizing the differential characteristics of the gear assembly, it is required that the total of the frictional forces developed between the rollers 556 and 557 and their respective bearing supports, the inertia these elements produce together with the inertia and friction encountered with the timing belt 612 and the timing gears 611, 613 and 614 is greater than the total frictional forces produced by the rotation of the gears 621, 623 upon their respective pivots combined with the friction developed by the rotation of the gear 617 upon the shaft 605 and the interaction between all the gear teeth involved. With this condition, rotating the gear 617 by an external device will cause rotation of the gear 621 to mesh therewith which will cause rotation of the gear 623. This latter gear being in mesh with the drive gear 615 will cause the plate 618 and the two gears 621, 623 to orbit about relatively fixed sun gears 615 and 617 since the force necessary to produce this orbiting action is less than the force required to rotate the gear 615, as pointed out above. This orbiting motion about the axis of the shaft 605 will start from the position shown in FIG. 45 and will result in movement of the plate 618 and gears 621, 623 in the direction of the arrow until the edge of the plate 618 is stopped by a screw stop 625.

This movement of the plate 618, in turn, produces corresponding rotation of the shaft 605 which, for the arrangement shown, may rotate for approximately 100°. With the stop 625 being in the form of an adjusting screw, the amount of rotation can be varied. As the shaft 605 rotates, it rotates the eccentric surfaces 603, 604 which action forces the cam followers 601, 602 upwardly for raising the lower roller 557 into contact with the heater roller 556. The degree of force can be varied by the positioning of the adjusting screw stop 625 which limits the amount of camming provided by the cams 603, 604.

With the rollers 556, 557 forced into contact and with the plate 618 now held against further rotation, continued rotation of the gear 617 will impart rotation to the drive gear 615 through the planetary gears 621, 623. Rotation of the gear 615 will impart the same motion to the timing driven gear 611 for driving the lower roller 557 which drive will produce rotation of the roller 556 by means of the gears 578, 581. After the external drive means is no longer effective to rotate and hold the gear 617, the shaft 605 is rotated in the opposite direction to bring the parts of the differential mechanism into their positions, as shown in FIG. 45 by a helical spring 626 secured at one end to the other end of the shaft 605 and at its other end to an anchor 627 mounted on the frame plate. During rotation of the shaft 605 for imparting upward movement of the lower roller 557, the spring 626 will wind up slightly to produce spring tension on the shaft which tension is released to rotate the shaft in an opposite direction to bring the parts of the differential mechanism to their original positions.

The external drive means for imparting the rotative force to the gear 617 is derived from a drive mechanism illustrated in FIG. 24. Immediately above the gear 617 and in mesh therewith is a drive gear 630 secured to the drive shaft SH16 and encircled by a drive sleeve 631. The shaft and sleeve are mounted on a post 632 which is part of the main machine frame and which may extend upwardly from the base thereof. As will be described hereinafter, the fuser assembly 25 is movable as a unit into and out of the machine frame and, when moved into its operating position, will permit the meshing engagement of the gear 630 with the gear 617.

On the end of the sleeve 631, remote from the drive gear 630, there is secured a large gear 633 which is in operative engagement with another large gear 634 attached to one end of the shaft SH17. This shaft is mounted for rotation on the upwardly extending post 526 and has secured thereto at its other end the pulley 527. As previously stated, the drive belt 528 is arranged around the pulley 527, the main drive pulley 483 and an idler 635 rotatably mounted on a shaft SH13 which is suitably mounted on the machine frame. The main drive motor M2 serves to impart continuous rotation to the large gear 633 and thereby maintain continuous rotation of the drive sleeve 631. As shown in FIG. 24, the sleeve 631 is open adjacent the gear 617 and may be suitably supported at this end by a bearing (not shown).

The end of the shaft SH16, remote from the gear 630, has secured thereto a magnetic clutch member 636 in the form of a disc which is rotatably mounted with an annular groove 637 formed in the rear frame plate 215 for the machine. Within the groove 637 and lining the walls thereof is an annular channel member 638 in which the clutch member rotates. Preferably, the clutch member and the channel member are made of highly magnetizable material in order to produce strong magnetic lines when energized with D.C. potential. Suitable conductors may be provided for connecting the channel to a source of D.C. potential, such as a rectifier, and be arranged so that the clutch member 636 will be energized whenever the main drive motor M2 is energized.

A second clutch member 639 in the form of a disc, serving as an armature, is secured to one end of the drive sleeve 631 in close face-to-face relationship to the clutch member 636. When energized by D.C. potential, the clutch member 636 will produce magnetic lines of force and be attracted to the clutch member 639. Normally, the member 636 and the shaft SH16 are stationary while the disc 639 continuously rotates. With magnetic lines of force existing between the members 636 and 639, the member 636 will rotate in unison with the member 639 for establishing movement of the lower roller 557 into forced engagement with the upper roller 556 and rotation of these rollers for fusing images on sheets of copy material.

As shown in FIG. 51, energization of the clutch member 636 for producing magnetic lines of force therearound is produced by full-wave rectifier circuit SR–5, the output of which is connected by conductors W122 to the channel member 638. The input for the rectifier is suitably connected between conductors W8 and W10 which are connected to a source of electrical energy when a relay switch is closed to energize the main drive motor M2. In actual practice, during operation of the xerographic machine when the main motor is continuously in operation, the clutch member 639 continuously drives the clutch member 636 resulting in the continuous rotation of the rollers 556, 557. When the machine is not in running condition or is in "standby" condition, the circuit to the clutch mechanism is open and the fuser assembly is not operating. In addition, during "Standby" condition, when the fuser is not operating, the rollers 556 and 557 are automatically separated. This separation, when the rollers are not rotating, prevents thermal set of the rubber in these rollers.

A supply of silicone oil to be applied to roller 557 is maintained in an oil pan 640 having fastened to opposite ends thereof bracket means 642 by which the oil pan is mounted on the frame plates. An applicator roll 643 is used to convey a thin film of oil as the applicator roll is rotated in the silicone oil, to wick 644, such as a felt pad secured as by staples (not shown) to a wick support plate 645 in a manner whereby the pad rests on the peripheral surface of the roller 556 and the applicator roll 643. The wiper plate is curved at one end to conform to the peripheral surface of the roller 557.

The applicator roll 643 consists of a hollow cylindrical oil drum supported at opposite ends by caps 646 and 647. At one end, the oil drum is secured by the cap 647 on a hollow shaft 648, which is journaled for rotation in a bracket 650 supported in the fuser assembly and is supported at the other end by a bearing 651 mounted for rotation in a bracket 652. A compression spring, not shown, is axially supported within the shaft 648 between bracket 650 and the cap 647 to facilitate replacement of applicator roll 643, the spring normally biasing the applicator roll to the left as shown in FIG. 43.

To effect rotation of the applicator roller in one direction, the roller is driven by a one-way clutch (not shown), enclosed within the hollow shaft 648. A control arm 653 is secured to the shaft 648 for intermittently rotating the heated roller 643 a few degrees for every rotation of the heated roller 556. The control arm 653, driving the one-way clutch mechanism within the shaft 648, is provided with a depending cam surface portion adapted to be engaged when each of a plurality of an actuator studs 654 extending outward from the gear 578 for the upper roller 556 is rotated into contact therewith. A tab 655 formed on the control arm 653 is biased into contact with an adjustable screw 656 fastened to frame plate 550 of the fuser assembly, by a spring 657 secured to the control arm 653.

The amount of intermittent rotation of the applicator roller may be regulated by adjustment of the positioning of the screw 656 in a slot 658 which controls the arc of travel of the control arm governing the one-way clutch mechanism within the shaft 648. With this arrangement, as the upper heated roller 556 is rotated by means of the drive mechanism previously described, the actuator studs 654 will successively strike the cam surface portion of the control arm to cause the control arm to oscillate about the axis of applicator roller during rotation of the upper roller 556. In this manner, the applicator roll is indexed, a portion of a revolution during each oscillating cycle of the control arm 653 through the one-way clutch drive between the applicator roller and the control arm.

During operation of the fuser assembly, the rollers 556 and 557 must maintain identical velocity at their point of contact at all times when a powdered image is being fused on a sheet of copy paper. This is necessary to prevent tearing the copy sheet or distorting the image on the support material. As shown in FIG. 49, the outer diameters of the rollers, when not in contact are equal and since both of the rollers are driven by gears having equal diameters, the lineal speed is the same when these rollers are merely in touch contact or out of contact. However, when pressure is applied to the lower roller 557 forcing it into contact with heated roller 556, the distance between the centers of these rollers decreases. The radius R from the center of roller 556 to its point of contact with roll 557 remains fairly constant owing to the metallic cylinder 558 for which the roller is provided to facilitate the radiation of heat from the heater element R–1 to the covering 577. The radius R' of the roller 557, from its center to point of contact with roll 556, is decreased due to the pressure upon the resilient material 584 to provide an arc M of contact to assure proper fusing.

If the angular velocities of the rollers are the same, this difference in radii would result in a differential lineal velocity at the point of contact with the periphery of the upper roller 556 traveling faster than the periphery of the lower roller with a resultant smearing of the tackified image and the possible tearing of the copy sheets.

In order to prevent any differential in lineal velocity at the point of contact of the rollers, an overriding clutch 660 is provided on the shaft 582 for the lower roller 557. The driven portion of this clutch is fixed to the core 583, and the driving portion is secured to the shaft 582 which is driven at a constant speed by the differential mechanism 610. By the use of overriding clutch or one way clutch 660 to drive the roller 557, the roller is free wheeling in one direction relative to the driving shaft 582 for the roller; that is, the one-way clutch allows the lower roller to run at a greater speed than its driving member, the shaft 582. This increase in speed is caused by the upper roller 556 which, when there is a sheet of papers between the rollers, produces sufficient friction between the rollers to drive the lower surface while these rollers are in contact. During this phase of operation, the shaft 582 continues to drive the gears 581 and 578 at its original constant velocity and the heater roller 556 maintains constant velocity. With the slight compression of the coating 585 and the resilient material 584 in the lower roller existing at this time, the lower roller will experience a slight increase in speed in order to maintain the constant lineal speed at the point of contact for the rollers. This action will cause a slight overriding of the lower fuser upon its shaft 582 made possible by the one-way clutch mechanism provided between the driving shaft and the driven lower roller.

As a sheet of copy paper is advanced between the rollers 556, 557, the powder image on the copy sheet will contact the peripheral heated surface of the roller 556 whereby the powder image becomes tackified. The application of the silicone oil from the oil pan 640 upon the Teflon coating 577 will prevent the offset of the toner material onto the heated contact surface of the heated roller.

After the powder image has been fused upon the sheet of copy paper, the sheet is transported by action of the rollers 556, 557 out of the fuser assembly, through the guide plates 518 and into engagement with the feed rollers 520 of the vertical transport system 26 to be conveyed out of the machine as previously described.

The fuser assembly 25 is also provided with means for permitting easy and complete removal of the assembly as a unit from the machine. To this end, each of the lower braces 552, 553 has secured thereto the inner race 662 of a commercial type file cabinet drawer slides. Each of the outer races 663 for the slides are attached to a support member 664 which extend across the entire length of the fuser assembly and are secured in parallel arrangement to the base of the machine. Suitable ball-bearings mounted between the races 662, 663 permit slidable action between the fuser assembly and the machine and removal of the assembly therefrom. Means (not shown) may be provided for locking the assembly in its operating position wherein the driven gear 617 on the assembly is in mesh with the driving gear 630.

The drum cleaning assembly 28 comprises the rotatable brush 30 of such construction as to apply extremely light pressure to the photoconductive surface of the xerographic plate and dislodge any powder particles that may adhere thereto. This brush, in turn, is cleaned by the flicking bar 32 that is mounted to contact the end brush bristles as they rotate to detach powder particles adhering thereto. The detached powder particles are removed from the vicinity of the brush cleaner by a suitable vacuum system (not shown). A floodlight (not shown) may be used to flood the portion of the xerographic plate cleaned by the brush to cause dissipation of any residual electrical charge on the xerographic plate. Any suitable drum cleaning device and discharge lamp (see lamp LMP–1 in FIG. 50) may be utilized but it is preferred that such a device be of the type disclosed in the United States patent to C. R. Mayo et al. No. 3,062,109.

The drum cleaning device 28 is provided with a motor M5 (not shown but is included in the electrical circuit described hereinafter) and the vacuum system utilized with the cleaning device is provided with a motor fan M6 for producing a flow of air through the brush cleaning casing, drawing air through the area surrounding the xerographic drum 14 with the air entraining powder particles removed from the xerographic drum by the brush as it passes through the brush casing. The discharge lamp LMP–1 that may be used to flood a portion of the xerographic drum as it passes this assembly to dissipate the residual charge on the drum 14 may consist of a suitable lamp housing supporting a lamp.

Machine operation

Figure 52:
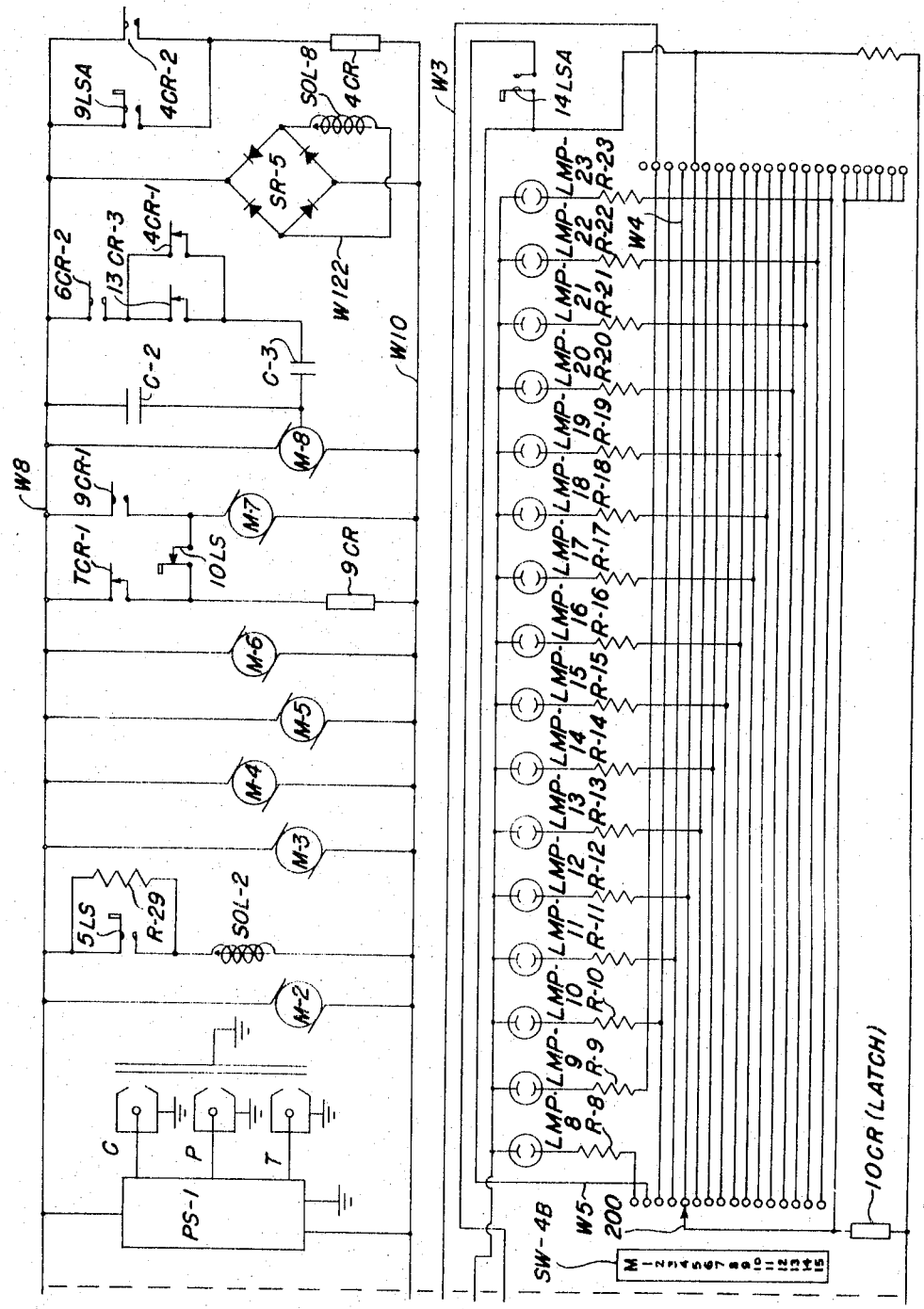

A clearer understanding of the operation of the xerographic machine and of the electrical circuit controlling the various elements can best be obtained by reference to the schematic wiring diagrams of FIGS. 50, 51 and 52 and the main operator actuated switches and signal lights of the electrical circuit being illustrated in the drawing of the control panel shown in FIG. 1.

On the control panel, the "On" control SW–1 is used initially to start and ready the machine for automatic printing operation. Once actuated, the machine is in "Standby" condition wherein all the functions of the machine are off except that the fuser heater and an exhaust fan will continue to operate. The "Print" control switch SW–3 is used to feed cards initially and to start the scanning operation. It can be actuated at any time when the machine is in the "Standby" condition. The "Print Stop" control switch SW–5 is used to shut off the projector lamp, the card feeder, the carriage travel mechanisms and also to initiate shutdown of the xerographic processing components. When actuated, the machine will scan and print the card already in the carriage and deliver the last print. The carriage will then return to its initial position and the machine will revert to the "Standby" condition. The "Off" control SW–2 (not shown in FIG. 1) is used to stop the entire machine immediately in the event that an emergency requires this action or, from the "Standby" condition at the end of a day. The "Copy Selector" control SW–4 is a rotary selector knob for preselecting the number of copies to be made for each card for a range of 1 to 15 copies or, for multiple copies when the position "M" is utilized. This control is also used to shut down the machine when the preselected number has been attained.

The "Reload" lamps LMP–4 and LMP–5 will be illuminated when the paper supply drops below a predetermined number, such for example, 20 sheets. When this occurs, the machine will automatically revert to the "Standby" condition and cannot be started until the paper supply is replenished. For single copies of each card in the card magazine, the operator turns the selector knob SW–4 to the numeral "1" and depresses the "Print" control SW–3. The card handling mechanism will scan and print each card in the magazine 8 and deliver collated prints to the output tray. At the completion of the final scan cycle, the card feeder, scan mechanism and projector will automatically shut down when the last print is delivered. The machine will then revert to "Standby" condition ready for more cards to be reproduced. To make multiple copies of each card, the selector switch is rotated to the desired number and the "Print" control switch actuated to commence operation of the machine. Each card will be scanned and printed the desired number of times.

Before the xerographic machine may be actuated, all of the cabinet doors must be closed in order to close the door actuated interlock switches 2LS, 3LS, 18LS, 21LS. This provision is made, not only from a standpoint of safety, but also to cause proper circulation of air through the machine by means of a pair of fans, not shown, driven by fan motors M1. In addition to these interlock switches, a drum interlock switch, 1LS which may be located behind the drum 14, should be closed by installing the drum. A developer housing interlock switch 4LS is also closed by securing the developer housing in its proper operating position. An over temperature thermostat THS–1, located on the fuser assembly 25, is also closed as long as the fuser temperature is below a predetermined value. A miss-detector relay 2CR is provided with a normally closed contact 2CR–1 which remains closed as long as there is no "miss-puff" condition in the machine.

Assuming that the paper tray is provided with sufficient paper, that a stack of cards have been properly placed in the card magazine and the proper number of copies have been preselected by the selector switch, the first operation on starting the machine is for the operator to press the "On" button SW–1. This will supply 115 volts at 60 cycles to the wires W1 and W2 and will energize the relay 1CR through the closed contacts SW–1, 1LS, 2LS, 3LS, 4LS, 21LS, 18LS, 2CR–1, THS–1. This pulls in the relay 1CR which closes its own holding contacts 1CR–1 and 1CR–3. The closing of the contact 1CR–3 retains energization of the relay 1CR through the normally closed "Off" switch SW–2 and the "On" swicth SW–1, which is held in only momentarily, may be released. All of the functioning devices in the machine are now energized through the closed contact 1CR–1 which operation may be interrupted in the event that the "Off" switch SW–2 or, any of the switches in series therewith, are opened.

The miss-detector apparatus, which is not shown in the drawings except schematically in the electrical diagram of FIG. 50, includes a photocell P–1 located adjacent the pick-off mechanism 22. The photocell P–1 is adapted to sense the presence or absence of a sheet of paper at some point during rotation of the drum 14 which point is located after a sheet should have been picked off the drum. The presence of a sheet on the drum causes an increase in the light falling on the photocell thereby decreasing the resistance of the photocell and causing an increase in the current through a relay 8CR. With this increased current, the relay 8CR is energized to cause opening of the normally closed contact 8CR–1 which opens the short circuit around the relay 2CR, and allows the relay 2CR to energize through the resistor R–2. With the relay 2CR energized, the normally closed relay contact 2CR–1 is opened, thus de-energizing the relay 1CR. In addition, the contact 2CR–2A closes to lock the coil of the relay 2CR through the drum interlock switch 1LS and also causes the opening of the contact 2CR–2B for preventing the renewal of the short circuit around the coil of the relay 2CR when the contact 2CR–1 again closes. The miss-detector mechanism is reset by removing the drum to release the switch 1LS for removing power from the coil of the relay 2CR.

With the main relay contact 1CR–1 closed, power is applied to the exhaust fan motor M–1, the miss-detector lamp LMP–24 through the auto transformer T–1 and the fuser temperature control and toner control PS–2.

The fuser temperature control circuit may be of any suitable type which will energize the heater element R–1 in the fuser heater roller 556 and maintain a preset temperature within very narrow limits. A typical circuit is disclosed and claimed in the patent application to Tayeb Bernous, Ser. No. 400,476, filed on Sept. 30, 1964. This circuit consists of a thermistor temperature probe THS–2 which, as shown in FIGURE 42, is held against the heated roller 556 for sensing the temperature thereof. This thermistor provides a signal in accordance with the roller temperature and controls the powder applied to the heater element R–1 for maintaining the roll at the required temperature. As shown, in FIGURE 51, a warmup relay 1TR is connected between the controlled terminal of the heater element R–1 and the conductor W1. When the heated roller 556 reaches its predetermined temperature, the fuser temperature control circuit decreases the voltage across the resistor R–1 and increases the voltage across the relay 1TR. This increase of voltage energizes the relay 1TR causing the opening of the contact 1TR–1A; the breaking of the connection to the control circuit; the closing of the contact 1TR–1B for maintaining the current to the coil of the relay 1TR and the closing of the contact 1TR–2 for energizing the relay 7CR, thereby conditioning the xerographic machine for the printing cycle.

As previously described, the toner control circuit comprises a stripe light LMP–25, a sensing light LMP–3, a relay, a density control bridge and an electronic circuit 275. The stripe light switch 19LS, as shown in FIGURE 25, is operated by a cam for two seconds of each print cycle for energizing the stripe light LMP–25. The stripe light projects a narrow stripe just outside the outboard edge of the copy path of an image on the drum 14 and is developed along with the image. The sensing head switch 20LS opens for approximately 1½ seconds, just as the stripe passes under the sensing head comprising the photocell P–2, the compensating photocell P–3 and the sensing head lamp LMP–3. Since the details of this apparatus have been previously described, no further description is necessary.

The paper tray motor M13 is energized through the paper tray door interlock switch 7LS and the normally closed paper level switch 11LSB. The paper tray motor raises the paper tray until it reaches its operating level whereupon the paper level switch 11LS will be actuated to an open position by the uppermost sheets of paper in the tray. When the level switch 11LS is actuated, the contact 11LSB opens to de-energize the paper tray motor M13. When approximately ten sheets of paper have been fed from the tray, the paper level switch 11LS will again be released for closing the contact 11LSB and energizing the motor M13. This energization and de-energization of the paper tray motor will maintain the level of the paper stack within relatively close limits.

In the event that the paper level is low in the paper tray 20, the normally open limit switch 6LS will close for energizing the low paper relay 5CR and the reload indicator lamps LMP–2 and LMP–6. With the relay 5CR energized, the contact 5CR–1 will open thereby preventing the starting of a new print cycle. In addition, the contact 5CR–2 closes to initiate a shutdown cycle which will be discussed hereinafter.

After completion of the warmup cycle, indicated by closing of warmup relay contact 1TR–2, the print cycle can be started by pressing the "Print" button switch SW–3. Momentarily closing the contact in the switch SW–3 energizes the print lamps LMP–4 and LMP–5 through the closed door interlock switch 7LS, the paper level switch 11LSA, the print switch SW–3 and the normally closed relay contact 5CR–1. The print relays 6CR and 7CR are also energized through this same circuit. With the relay 6CR energized, the contact 6CR–1 closes, thereby locking in the coils of the relays 6CR and 7CR through the closed contacts 8LS or 10CR–1, 12CR–1 or 14CR–1 and 1TR–2.

With the relay 7CR energized, the contact 7CR–1A closes which provides power to the main drive motor M2, the discharge lamp LMP–1 and its ballast L–1, the shutdown relay 3CR through the contacts 9LSB or 2TR, the xerographic power supply PS–1 for the charge corotron C, the transfer corotron T and the preclean corotron P, the intake blower motors M3 and M4, the brush drive motor M5, the brush exhaust motor M6, the fuser engaged solenoid SOL–8, the start relay 4CR through the now closed contact 9LSA and the closed contact 4CR–2, the developer drive motor M8 with the capacitor C–3 and, the start capacitor C–3 through the closed contacts 13CR–3 or 4CR–1 and 6CR–2. After a few seconds the contacts 13CR–3 and 4CR–1 open to de-energize the start capacitor C–3.

Assuming for the moment that the toner dispensing control circuit calls for more toner, the toner dispenser relay TCR will be de-energized by a short duration pulse closing the contact TCR–1 for energizing a relay 9CR thus closing the contact 9CR–1 for energizing the toner motor M7. With the toner dispenser motor energized, the motor drives a cam actuating switch 10LS, closing this switch for locking in the coil of the relay 9CR through the contact 9CR–1 as the pulse actuating the contact TCR–1 terminates. The motor continues rotating for dispensing toner by providing a single revolution to the wobble plate 245 until the switch 10LS is again released for de-energizing the relay 9CR and motor M7.

In the meantime, the energization of the relay 3CR closes the contact 3CR–2 for providing the electrical power to the document lamp blower M14, the scan motor M9, the card feed motor M10, the return motor M11, document lamp LMP–7 through a power supply and control PS–3 and, the register roll clutch SOL–7 through the normally closed contact 17LSB. The originally described energization of the relay 7CR also closes the normally open contact 7CR–2 for providing electrical power to the conductor W3 which, in turn, energizes all of the machine control logic. Before starting the "Start" cycle for the machine, it will be assumed that the card magazine 8 is loaded witht a stack of cards, the card carriage is empty, the paper tray 20 contains an adequate supply of paper and the copy selector switch SW–4 is set to provide more than one copy of each card. Upon the closing of the contacts 7CR–2 for energizing the wire W3, the lamp corresponding to the number of copies selected (lamps LMP–8 through LMP–23) is energized through one of the 33k ohm series resistors R–8 to R–24, respectively, contact SW–4A and the coil of the relay 10CR (latch). The 33k ohm series resistor limits the current to a value well below that required to energize the latching relay 10CR. The return solenoid SOL–5 is energized through the normally closed contact 11CR–3B and causes the return rod 154 to be forced against the return drive wheel 152 whereby the drive wheel provides the power to drive the carriage assembly 55 to its home position and to hold it there.

When the carriage reaches its home position it actuates the carriage home switch 16LS for energizing the home relay 12CR through this switch. The card feed solenoid SOL–3 and the stepper reset coil 3TR, as shown in FIG. 51 are energized through the normally closed contact 14CR–2B and the contacts 12CR–2 and 10CR–2A which are closed by the energization of their respective relays 12CR and 10CR. The card feed solenoid releases the one revolution clutch which drives the card change mechanism wherein the picker-knife drives the bottom card in the card magazine 8 forward until it is picked up by the card feed rollers 52, 53. As previously described, the series of cams on the shaft 50 open the window on the carriage, drop the card restraining block and operate the ejector pins to eject the card in the carriage if one is present. While feed rollers drive the card into the carriage, these cams continue to rotate for raising the restraining block to keep the card from rebounding and closing the window thereby clamping the card in position on the carriage.

As the card passes through the feed rollers, it momentarily actuates the card feed switch 12LS, thereby momentarily energizing the card feed relay 10CR (release) and the card counter C-1 which advances the card count by one. As previously stated, the relay 10CR is a latching type relay with two coils. When one coil is energized, the relay contacts switch and remain switched even upon removal or power until the other coil is energized. Momentarily energizing 10CR (release) closes the contact 10CR-2B and opens the contact 10CR-2A to place the machine in condition for scanning. The scanning cycle commences when the scan start switch 15LS is actuated by the appropriate cam on the main programmer shaft SH4. Upon this occurrence, the scan relay 11CR is energized, through the contacts 15LS, 10CR-2B, 12CR-2 and 14CR-2B. With the energization of relay 11CR, the contact 11CR-1 closes for locking the relay 11CR through the contacts 11CR-1 and 14LS-B. In addition, the normally open contact 11CR-2 closes for energizing the relay 13CR, which when energized closes contact 13CR-1A for locking in the coil for the relay 13CR.

The energization of the relay 11CR also opens the contact 11CR-3B for de-energizing the return solenoid SOL-5 and the carriage return mechanism. The normally open contact 11CR-3A closes to energize the scan solenoid SOL-4 to initiate scanning by pressing the scan bar 142 against the scan drive wheel. As the carriage leaves its home position, the switch 16LS is released or opened to de-energize the relay 12CR for opening the contact 12CR-2 thereby blocking any further operation of the card change mechanism until the carriage again returns home.

During scanning, the paper feed switch 17LS is closed by its appropriate cam on the programmer shaft SH4. This action opens contact 17LS-B for causing the de-energization of the register roll clutch 435 (SOL-7) causing the register rolls 280, 281 to stop. With the closing of the switch 17LS, the normallly open contact 17LS-A is closed for energizing the paper feed clutch 434 (SOL-1), copy and billing counters C-2 and C-3, respectively, through the closed contact 13CR-3 and the count stepper 3TR through the contact 13CR-3 and SW-4A. With the paper feed clutch SOL-1 energized, the paper feed roller 367 is actuated and drives a single sheet of paper forward until it buckles against the nip of the stationary register rollers 280, 281.

The energization of the copy and billing counters causes the total of each to advance one count. The count stepper switch 3TR advances one step and its contact 3TR (SW) energizes the lamp corresponding to the copy being made (LMP8–LMP23). As the switch 17LS is released by its cam on the programmer shaft SH-4, the contact 17LSB opens to de-energize the register roll clutch SOL-7 which de-activates the paper feed roller. In the meantime, the contact 17LSA closes to energize the register roll clutch SOL-1 for actuating the register rollers, thereby driving the sheet of paper previously buckled against them into contact with the drum at the proper instant to properly locate the copy sheet thereon.

As the carriage reaches the end of scan, it activates the end of scan switch 14LS to de-energize the relay 11CR when the contact 14LSB is opened. The contact 11CR3B opens to deenergize the scan solenoid SOL-4 and the attended scan mechanism. In addition, the contact 11CR-3A closes to energize the return mechanism through the solenoid SOL-5. During the return of the card carriage, the cam 488 on the shaft SH-4 is momentarily operated to actuate the pick-off switch 5LS to a close position for energizing the pick-off solenoid SOL-2. This provides a short puff up air through the nozzle to strip the copy sheet from the drum 14. The copy sheet will then continue across the horizontal transport 23, through the pressure roller fuser assembly 25 up the vertical transport 26 and into the output tray 495.

Since it was originally intended that a plurality of copies are to be made for the card presently in the card carriage, the recycle operation is provided in this manner; as the carriage reaches the home position to actuate the switch 16LS to a closed position the home relay 12CR is energized to close the contact 12CR-2. The card carriage dwells in its home position until the scan start switch 15LS closes. This occurs while the relay 10CR is still released with the contact 10CR-2A opened and the contact 10CR-2B closed. The machine then cycles through the scan cycle and return cycle until the required number of copies are obtained.

As shown, the selector switch SW-4B has been arbitrarily shown at position number "4" to set the circuit into condition for the machine to make 4 reproductions or copies of a document. As shown in FIG. 50, the count stepper 3TR is shown in conjunction with a series of stepper contacts number 1 to 15 and in association with the selector switch SW-4A which is also set to the number "4." As each copy is reproduced of a document, the stepper contacts have been progressively stepping up each time from the number "0." On the last cycle, the number "4" step contact will be interconnected by a conductor to the number "4" switch contact on the switch SW-4B. In the meantime the paper feed switch 17LS energizes the count stepper which advances the contact 3TRSW to the position corresponding to the required number of copies. At the end of the scan, the switch 14LS is actuated to close the contact 14LSA. This closes the circuit to the relay 10CR (latch) through the contacts 14LSA 3TRSW and SW-4. This produces energization of the relay 10CR (latch) and a card change will take place when the carriage reaches home as the relay 10CR is latched closing the contact 10CR-2A and opening the contact 10CR-2B. The machine will then cycle again as it did from the initial start for producing the preset number of copies for the second card set into the card carriage.

In the event that the selector switch SW-4 is rotated to the "1" position for producing a single copy of each card, the count stepper 3TR is never energized since the switch SW-4A breaks the only circuit to it. The relay 10CR (latch) is energized at the end of each scan through the contacts 14LS and SW-4 resulting in a card change each time that the card carriage returns to its home position.

The xerographic machine will shut down during a printing operation and revert to a "Standby" condition if the "Print Stop" button SW-5 is pushed, the paper level becomes too low or the card feeder empties or jams.

For manual shutdown of the xerographic machine during a printing operation, the momentary actuation of the "Print Stop" button SW-5 closes the contact in this switch. Closing of this switch energizes the print stop relay 14CR through this switch for closing the contact 14CR-2A thus locking in the coil of the relay 14CR and opening the contact 14CR-2B for preventing any further scan or card change. The contact 14CR-1 opens to shut off the "Print" light.

In the normal cycling out of the machine after the preset number of copies has been produced the operator need not manipulate any switch on the machine. As previously stated when the last scan is made, the carriage returns to its home position and the switch 16LS is actuated for energizing the relay 12CR. With the relay 12CR energized, the contact 12CR-1 which parallels the now open contact 14CR-1 opens to de-energize the relays 6CR and 7CR. This action will open the contact 7CR-2 to open the line W3 and the contact 7CR-1A opens. It is to be noted that the contact 3CR-1 continues to maintain electrical power to the wire W8. The energization of the relay 7CR also closes the contact 7CR–1B which completes the circuit to the shutdown timer 2TR. The timer 2TR provides a 35 second interval, during which all copies in the machine when the shutdown cycle was initiated, to reach the output tray 495. After the 35 second interval, the contact for the relay 2TR opens and when the cam in the programmer reaches the cycling switch 9LS, this switch is closed. The closing of this contact, which parallels the contact for the relay 2TR opens the circuit to the relay 3CR to de-energize the same. This causes the opening of the contact 3CR–1 to de-energize the conductor W8 and to open the contact 3CR–2 to de-energize the conductor W3. The machine is now in "Standby" condition and ready for further use by the operator.

In the event that there is insufficient copy paper in the paper tray 20 whereupon the paper level reaches the low level, the switch 6LS is released which closes the same for energizing the relay 5CR and the "reload" lamps LMP–2 and LMP–6. The contact 5CR–1 will open to prevent initiation of a new print cycle until the paper tray is refilled. Also with the energization of the relay 5CR, the contact 5CR–2 closes to energize the relay 14CR which closes the contact 14CR–2 to lock in the coil of the relay 14CR and the machine shuts down, as previously described.

In the event that the card tray is emptied or jammed, a card will not trip the card feed switch 17LS. When this switch fails to be tripped, the relay 10CR remains in a latched position and the contact 10CR–1 remains open. At the end of the card change cycle, the card change switch 8LS which parallels the contact 10CR–1 is actuated by a cam on the programmer shaft SH–4. This action opens the contact 8LS for de-energizing the relays 6CR and 7CR, and the machine will enter its normal shutdown cycle.

While the invention has been described with reference to the structures disclosed herein, it is not confined to the details set forth; and this application is intended to cover such modifications or changes as may come within the purposes of the improvements or the scope of the following claims.

What is claimed is:

1. In a xerographic apparatus for forming reproductions of the data area on data processing cards the combination of:
   a xerographic plate,
   means for moving the plate at a predetermined rate,
   a scanning system for producing and projecting image light rays of the data area onto the xerographic plate,
   a card transport system,
   said card transport system including a card carriage movable between a start-of-scan position and an end-of-scan position for supporting and transporting individual cards,
   a card feed mechanism adapted to automatically convey a card to-be-projected into said card carriage and to remove a previously projected card therefrom while said carriage is adjacent said start-of-scan position,
   means for moving said card carriage reciprocally in a path extending between said positions for transporting each card therebetween,
   said last named means including a first motor drive for driving said carriage from said start-of-scan position to said end-of-scan position when said first motor drive is activated and a second motor drive for driving said carriage from said end-of-scan position of said start-of-scan position when said second drive is activated,
   said second drive including a one-way clutch for permitting continuous operation of said second drive upon said carriage after the same has reached said end-of-scan position thereby maintaining said carriage in that position until said second drive is deactivated,
   means to move the card carriage from said start-of-scan position to said end-of-scan position at a rate to effect synchronous motion of the scanned image relative to the xerographic plate.

2. In a xerographic apparatus for forming reproductions of the data area on data processing cards the combination of:
   a xerographic plate,
   means for moving the plate at a predetermined rate,
   a scanning system for producing and projecting image light rays of the data area onto the xerographic plate,
   a card transport system,
   said card transport system including a card carriage movable between a start-of-scan position and an end-of-scan position for supporting and transporting individual cards,
   a card feed mechanism adapted to automatically convey a card to-be-projected into said card carriage and to remove a previously projected card therefrom while said carriage is adjacent said start-of-scan position,
   means for moving said card carriage reciprocally in a path extending between said positions for transporting each card therebetween,
   said last named means including a first motor drive for driving said carriage from said start-of-scan position to said end-of-scan position when said first motor drive is activated and a second motor drive for driving said carriage from said end-of-scan position to said start-of-scan position when said second drive is activated,
   a control circuit for activating said motor drives in sequence,
   means to move the card carriage from said start-of-scan position to said end-of-scan position at a rate to effect synchronous motion of the scanned image relative to the xerographic plate.

3. In a xerographic apparatus for forming reproductions of the data area on data processing cards the combination of:
   a xerographic plate,
   means for moving the plate at a predetermined rate,
   a scanning system for producing and projecting image light rays of the data area onto the xerographic plate,
   a card transport system,
   said card transport system including a card carriage movable between a start-of-scan position and an end-fo-scan position for supporting and transporting individual cards,
   a card feed mechanism adapted to automatically convey a card to-be-projected into said card carriage and to remove a previously projected card therefrom while said carriage is adjacent said start-of-scan position,
   means for moving said card carriage reciprocally in a path extending between said positions for transporting each card therebetween,
   said last named means including a first motor drive for driving said carriage from said start-of-scan position to said end-of-scan position when said first drive is de-energized and a second motor drive for driving said carriage from said end-of-scan position to said start-of-scan position,
   a circuit including a relay having a normally closed switch for continuously energizing said second drive and a normally open switch for normally maintaining said first drive de-energized,
   means for energizing said relay for opening said normally closed switch and closing said normally open switch when the carriage is moved to its start-of-scan position and to de-energize said relay to energize said second motor drive and de-energize said first drive when said carriage reaches said end-of-scan position, means to move the card carriage from said start-of-scan position to said end-of-scan position at a rate to effect synchronous motion of the scanned image relative to the xerographic plate.

References Cited

UNITED STATES PATENTS 3,182,549  5/1965  Thompson et al. _____ 88—24

NORTON ANSHER, *Primary Examiner.*

R. A. WINTERCORN, *Assistant Examiner.*